US012224169B2

(12) United States Patent
Kil et al.

(10) Patent No.: US 12,224,169 B2
(45) **Date of Patent: *Feb. 11, 2025**

(54) INTERACTIVE ANALYSIS OF MASS SPECTROMETRY DATA

(71) Applicant: Protein Metrics, LLC, Cupertino, CA (US)

(72) Inventors: Yong Joo Kil, Fremont, CA (US); Eric Carlson, Cupertino, CA (US)

(73) Assignee: Protein Metrics, LLC, Boston, MA (US)

( * ) Notice: Subject to any disclaimer, the term of this patent is extended or adjusted under 35 U.S.C. 154(b) by 294 days.

This patent is subject to a terminal disclaimer.

(21) Appl. No.: 17/706,539

(22) Filed: Mar. 28, 2022

(65) Prior Publication Data

US 2022/0301840 A1 Sep. 22, 2022

Related U.S. Application Data

(63) Continuation-in-part of application No. 17/135,963, filed on Dec. 28, 2020, now Pat. No. 11,289,317, which is a continuation of application No. 16/713,556, filed on Dec. 13, 2019, now Pat. No. 10,879,057, which is a continuation of application No. 16/149,026, filed on Oct. 1, 2018, now Pat. No. 10,510,521.

(Continued)

(51) Int. Cl.
*H01J 49/00* (2006.01)
*H01J 49/02* (2006.01)

(52) U.S. Cl.
CPC .......... *H01J 49/0036* (2013.01); *H01J 49/02* (2013.01)

(58) Field of Classification Search
CPC ............... H01J 49/0027; H01J 49/0031; H01J 49/0036; G06T 11/20; G06T 11/206
See application file for complete search history.

(56) References Cited

U.S. PATENT DOCUMENTS 4,464,650 A 8/1984 Eastman et al.
4,558,302 A 12/1985 Welch (Continued)

FOREIGN PATENT DOCUMENTS

GB 2401721 A 11/2004
JP 2004317509 A 11/2004

(Continued)

OTHER PUBLICATIONS

Schreibier and Cox, "Using PeakView™ Software with the XIC Manager for Screening and Identification with High Confidence Based on High Resolution and Accurate Mass LC-MS/MS", AB Sciex; Food & Environmental (Pub. # 2170811-03); 5pgs; Apr. 2, 2011 (Year: 2011).*

(Continued)

*Primary Examiner* — David E Smith
(74) *Attorney, Agent, or Firm* — Shay Glenn LLP

(57) ABSTRACT

This invention relates to graphical user-interactive analysis of data, including in particular, mass spectrographic data analysis, as well as methods and software for generating and using such. One aspect provides user-customizable reports, including methods and apparatuses for generating customizable pivot tables and graphs specific to mass spectrographic data.

21 Claims, 65 Drawing Sheets

Related U.S. Application Data

(60) Provisional application No. 62/566,247, filed on Sep. 29, 2017.

(56) References Cited

U.S. PATENT DOCUMENTS

| | | | | |
|---|---|---|---|---|
| 4,814,764 | A | 3/1989 | Middleton | |
| 5,343,554 | A | 8/1994 | Koza et al. | |
| 5,910,655 | A | 6/1999 | Skilling | |
| 5,995,989 | A | 11/1999 | Gedcke et al. | |
| 6,094,627 | A | 7/2000 | Peck et al. | |
| 6,393,393 | B1 | 5/2002 | Kawahara | |
| 6,535,555 | B1 | 3/2003 | Bordes et al. | |
| 6,798,360 | B1 | 9/2004 | Qian et al. | |
| 6,906,320 | B2 | 6/2005 | Sachs et al. | |
| 7,006,567 | B2 | 2/2006 | Frossard et al. | |
| 7,283,684 | B1 | 10/2007 | Keenan | |
| 7,283,937 | B2 | 10/2007 | Goldberg | |
| 7,297,940 | B2 | 11/2007 | Bern | |
| 7,397,961 | B2 | 7/2008 | Keeney et al. | |
| 7,400,772 | B1 | 7/2008 | Keenan | |
| 7,402,438 | B2 | 7/2008 | Goldberg | |
| 7,429,727 | B2 | 9/2008 | Bern | |
| 7,496,453 | B2 | 2/2009 | Chau | |
| 7,680,670 | B2 | 3/2010 | Lamblin et al. | |
| 7,979,258 | B2 | 7/2011 | Goldberg et al. | |
| 8,004,432 | B2 | 8/2011 | Kawato | |
| 8,023,750 | B2 | 9/2011 | Raveendran et al. | |
| 8,077,988 | B2 | 12/2011 | Donoho | |
| 8,108,153 | B2 | 1/2012 | Bern | |
| 8,428,889 | B2 | 4/2013 | Wright | |
| 8,511,140 | B2 | 8/2013 | Gorenstein et al. | |
| 8,598,516 | B2 | 12/2013 | Sapargaliyev et al. | |
| 8,645,145 | B2 | 2/2014 | Subbaraman et al. | |
| 9,385,751 | B2 | 7/2016 | Kletter | |
| 9,571,122 | B2 | 2/2017 | Kletter | |
| 9,640,376 | B1 * | 5/2017 | Becker | H01J 49/02 |
| 9,859,917 | B2 | 1/2018 | Kletter | |
| 10,199,206 | B2 | 2/2019 | Becker et al. | |
| 10,354,421 | B2 | 7/2019 | Becker et al. | |
| 10,510,521 | B2 * | 12/2019 | Kil | H01J 49/02 |
| 10,546,736 | B2 | 1/2020 | Bern et al. | |
| 10,665,439 | B2 | 5/2020 | Bern | |
| 10,879,057 | B2 * | 12/2020 | Kil | H01J 49/02 |
| 10,991,558 | B2 | 4/2021 | Bern et al. | |
| 11,127,575 | B2 | 9/2021 | Bern | |
| 11,276,204 | B1 | 3/2022 | Kletter | |
| 11,289,317 | B2 * | 3/2022 | Kil | H01J 49/0036 |
| 11,346,844 | B2 | 5/2022 | Nichols et al. | |
| 2002/0068366 | A1 | 6/2002 | LaDine et al. | |
| 2003/0031369 | A1 | 2/2003 | Le Pennec et al. | |
| 2003/0200032 | A1 | 10/2003 | Keating et al. | |
| 2003/0218634 | A1 | 11/2003 | Kuchinsky et al. | |
| 2004/0083063 | A1 * | 4/2004 | McClure | G01N 30/8624 702/22 |
| 2004/0102906 | A1 | 5/2004 | Roder | |
| 2004/0160353 | A1 | 8/2004 | Cirillo et al. | |
| 2005/0047670 | A1 | 3/2005 | Qian et al. | |
| 2005/0063864 | A1 | 3/2005 | Sano et al. | |
| 2005/0276326 | A1 | 12/2005 | Drezner | |
| 2008/0010309 | A1 | 1/2008 | Sugita | |
| 2008/0025394 | A1 | 1/2008 | Francois et al. | |
| 2008/0260269 | A1 | 10/2008 | Thiagarajan | |
| 2009/0012931 | A1 | 1/2009 | Appa et al. | |
| 2009/0052528 | A1 | 2/2009 | Jeon et al. | |
| 2009/0179147 | A1 * | 7/2009 | Milgram | G01N 30/8675 250/281 |
| 2010/0124785 | A1 | 5/2010 | Bern | |
| 2010/0288917 | A1 | 11/2010 | Satulovsky et al. | |
| 2010/0288918 | A1 | 11/2010 | Satulovsky | |
| 2011/0093205 | A1 | 4/2011 | Bern | |
| 2011/0206119 | A1 | 8/2011 | Bivolarsky et al. | |
| 2012/0047098 | A1 | 2/2012 | Reem | |
| 2012/0245857 | A1 | 9/2012 | Lee et al. | |
| 2013/0080073 | A1 | 3/2013 | de Corral | |
| 2013/0144540 | A1 | 6/2013 | Bern et al. | |
| 2013/0226594 | A1 | 8/2013 | Fuchs et al. | |
| 2013/0262809 | A1 | 10/2013 | Wegener | |
| 2013/0266067 | A1 | 10/2013 | Song et al. | |
| 2013/0275399 | A1 | 10/2013 | Amit et al. | |
| 2013/0289892 | A1 | 10/2013 | Satoh | |
| 2014/0045273 | A1 | 2/2014 | Cerda et al. | |
| 2014/0164444 | A1 | 6/2014 | Bowen et al. | |
| 2015/0319268 | A1 | 11/2015 | Callard et al. | |
| 2015/0369782 | A1 * | 12/2015 | Kageyama | H01J 49/0036 250/288 |
| 2016/0077926 | A1 | 3/2016 | Mutalik et al. | |
| 2016/0180555 | A1 * | 6/2016 | Matsuo | G06F 3/0482 345/440 |
| 2016/0215028 | A1 | 7/2016 | Mutharia et al. | |
| 2016/0268112 | A1 | 9/2016 | Yip et al. | |
| 2018/0301326 | A1 | 10/2018 | Bern et al. | |
| 2020/0075300 | A1 | 3/2020 | Bern | |
| 2021/0335589 | A1 | 10/2021 | Bern et al. | |
| 2022/0076936 | A1 | 3/2022 | Bern | |
| 2022/0291229 | A1 | 9/2022 | Nichols et al. | |

FOREIGN PATENT DOCUMENTS

| | | | | |
|---|---|---|---|---|
| WO | WO2011/127544 A1 | 10/2011 | | |
| WO | WO2015/031820 A1 | 3/2015 | | |
| WO | WO2015/148941 A1 | 10/2015 | | |
| WO | WO-2015189255 A1 * | 12/2015 | | G01N 30/7266 |

OTHER PUBLICATIONS

Marty et al.; Bayesian deconvolution of mass and ion mobility spectra: from binary interactions to polydisperse ensembles; Analytical Chemistry; 87(8); pp. 4370-4376; 7 pages; (Author Manuscript); Apr. 2015.

Marty; What can unidec do for you? Mar. 24, 2015I 28 pages; retrieved from the internet (http://unidec.chem.ox.ac.uk/UniDecTutorial.pdf) on Oct. 25, 2022.

Bern et al.; U.S. Appl. No. 18/298,327 entitled "Interactive analysis of mass spectrometry data including peak selection and dynamic labeling," filed Apr. 10, 2023.

Bern et al.; U.S. Appl. No. 18/309,727 entitled "Methods and apparatuses for deconvolution of mass spectrometry data," filed Apr. 28, 2023.

Klammer et al.; Peptide charge state determination for low-resolution tandem mass spectra; In2005 IEEE Computational Systems Bioinformatics Conference (CSB'05); pp. 175-185; Aug. 8, 2005.

Krokhin et al.; An improved model for prediction of retention times of tryptics peptides in ion pair reversed-phase HPLC: its application to protein peptide mapping by off-line HPLC-MALDI MS; Molecular and Cellular Proteomics; 3(9); pp. 908-919; Sep. 2004.

Lu et al.; Improved peak detection and deconvolution of native electrospray mass spectra from large protein complexes; Journal of the American Society for Mass Spectrometry; 26(12); pp. 2141-2151; Dec. 2015.

Schreiber et al.; Using PeakView(TM) software with the XIC manager for screening and identification with high confidence based on high resolution and accurate mass LC-MS/MS: AB Sciex, Food & Environmental; (Pub. # 2170811-03); 5 pgs.; Apr. 2, 2011.

Shi et al.; Feature-based image set compression; 2013 IEEE International Conference on Multimedia and Expo (ICME); IEEE; pp. 1-6; Jul. 15, 2013.

Shi et al.; Multi-model prediction for image set compression; 2013 Visual Communications and Image Processing (VCIP); IEEE; pp. 1-6; Nov. 17, 2013.

Thermo Fisher Scientific, Inc.; Thermo Xcaliber: Qualitative Analysis (User Guide); Revision B; 290 pgs.; Sep. 2010.

Valot et al.; MassChroQ: A versatile tool for mass spectrometry quantification; Proteomics; 11(17); 23 pgs.; Sep. 2011.

VanBramer; An Introduction to Mass Spectrometry; Wider University; 38 pgs.; © 1997; (revised) Sep. 2, 1998.

Waters Corporation; Biopharmalynx: A new bioinformatics tool for automated LC/MS peptide mapping assignment; 6 pages retrived

(56) References Cited

OTHER PUBLICATIONS

May 17, 2018 from the internet (http://www.waters.com/webassets/cms/library/docs/720002754en.pdf); Sep. 2008.
Waters Corporation; MassLynx 4.1 Getting started guide; 71500113203/RevisionA; 96 pages; retrieved May 17, 2018 from the internet (http://turroserver.chem.columbia.edu/group/instrument/HPLC/HPLC%20Getting%20Started.pdf) ; 2005.
Waters Corporation; QuanLynx User's Guide; Version 4.0; 125 pages; retrived May 17, 2018 from the internet ( http://www.waters.com/webassets/cms/support/docs/quanlynx_40.pdf); Feb. 15, 2002.
Wehofsky et al.; Isotopic deconvolution of matrix-assisted laser desorption/ionization mass spectra for substance-class specific analysis of complex samples; European Journal of Mass Spectrometry; 7(1); pp. 39-46; Feb. 1, 2001.
Xu et al.; Deconvolution in mass spectrometry based proteomics; Rapid Communications in Mass Spectrometry; 32(10); pp. 763-774; May 30, 2018.
Yang et al.; Detecting low level sequence variants in recombinant monoclonal antibodies; mAbs 2 (3); pp. 285-298; May/Jun. 2010.
Yang et al.; Hybrid mass spectrometry approaches in glycoprotein analysis and their usage in scoring biosimilarity; Nature Communications; 7(1); pp. 1-10; Nov. 8, 2016.
Ziv et al.; A universal algorithm for sequential data compression; IEEE Trans. on Information Theory; IT-23(3); pp. 337-343; May 1977.
Ziv et al.; Compression of individual sequences via variable-rate coding; IEEE Trans. on Information Theory; IT-24(5); pp. 530-536; Sep. 1978.
Kletter; U.S. Appl. No. 17/694,474 entitled "Data compression for multidimensional time series data," filed Mar. 14, 2022.
ZNova Decorivolutiori; retrieved from the internet (https://web.archive.org/web/20141106214830/http://www.enovatia.com:80/downloads/manuals/promass/Help/html/prom2cdq.htm); 1 page; on Oct. 6, 2023.
Kletter et al.; U.S. Appl. No. 18/460,028 entitled "Data Compression for multidimensional time series data," filed Sep. 1, 2023.
Bern et al.; Parsimonious charge deconvolution for native mass spectrometry. Journal of proteome research; 17(3); pp. 1216-1226; Jan. 29, 2018.
Kim et al.; Comparative analysis of mass spectral similarity measures on peak alignment for comprehensive two? dimensional gas chromatography mass spectrometry; Computational and mathematical methods in medicine; 2013(1); 509761; 12 pages; doi.org/10.1155/2013/509761; Sep. 16, 2013.
Wikipedia; Intra-Frame Coding; Sep. 19, 2019; 2 pages; retrieved from the internet (https://en.wikipedia.org/w/index.php?title=Intra-frame_coding&oldid=916815985) on Aug. 20, 2024.
Zhao et al.; An efficient macroblock-based diverse and flexible prediction modes selection for hyperspectral images coding; Signal Processing: Image Communication; 25(9); pp. 697-708; Oct. 1, 2010.
Nichols et al.; U.S. Appl. No. 18/737,836 entitled "Psuedo-electropherogram construction from peptide level mass spectrometry data," filed Jun. 7, 2024.

* cited by examiner

FIG. 7
PTM Summary Tab
Protein Coverage Tab
HCP - XIC % Protein per sample
HCP - XIC per Sample
Bar Chart Summary - HCP
PROTEIN METRICS

FIG. 32
Attach pivot report to document
During project creation
Advanced
Advanced configurations

INTERACTIVE ANALYSIS OF MASS SPECTROMETRY DATA

CROSS REFERENCE TO RELATED APPLICATION

This application is a continuation-in-part of U.S. patent application Ser. No. 17/135,963, titled "INTERACTIVE ANALYSIS OF MASS SPECTROMETRY DATA," filed on Dec. 28, 2020, now U.S. Pat. No. 11,289,317, which is a continuation of U.S. patent application Ser. No. 16/713,556, filed Dec. 13, 2019, titled "INTERACTIVE ANALYSIS OF MASS SPECTROMETRY DATA," now U.S. Pat. No. 10,879,057, which is a continuation application from U.S. patent application Ser. No. 16/149,026, filed Oct. 1, 2018, and titled "INTERACTIVE ANALYSIS OF MASS SPECTROMETRY DATA," now U.S. Pat. No. 10,510,521, which claims priority to U.S. Provisional Patent Application No. 62/566,247, filed Sep. 29, 2017, and titled "INTERACTIVE ANALYSIS OF MASS SPECTROMETRY DATA," each of which is incorporated herein by reference in its entirety.

INCORPORATION BY REFERENCE

All publications and patent applications mentioned in this specification are herein incorporated by reference in their entirety to the same extent as if each individual publication or patent application was specifically and individually indicated to be incorporated by reference.

FIELD

This invention relates to graphical user-interactive reports for use in mass spectrometery (MS) based analysis of proteins, as well as methods and software for generating and using such.

BACKGROUND

Due to the complexity of proteins and their biological production, characterization of protein pharmaceuticals ("biologics") poses much more demanding analytical challenges than do small molecule drugs. Biologics are prone to production problems such as sequence variation, misfolding, variant glycosylation, and post-production degradation including aggregation and modifications such as oxidation and deamidation. These problems can lead to loss of safety and efficacy, so the biopharmaceutical industry would like to identify and quantify variant and degraded forms of the product down to low concentrations, plus obtain tertiary structure information. Because of the rapidly increasing power of mass spectrometry (MS), an MS-based platform for comprehensive measurement of almost all the relevant drug's physical characteristics is now conceivable. A crucial piece of such a platform is data analysis software focused to address the needs of the biopharmaceutical industry.

At every stage in the development and manufacture of a protein pharmaceutical, there is a need to characterize recombinantly produced protein molecules. This need arises in new product development, biosimilar (generic) product development, and in quality assurance for existing products. With the first generation of protein drugs just emerging from patent protection, and generic manufacturers rushing to enter the marketplace, assays and regulatory guidelines for biosimilarity have become a matter of some urgency. Over 30 branded biologics with worldwide sales >$50B will come off patent in 2011-2015, and the biosimilars markets is expected to grow to about $4B by 2015.

Quality assurance for monoclonal antibodies, as an example, must consider primary structure, higher order structure, glycosylation and heterogeneity. Primary structure analyses can include total mass (as measured by MS), amino acid sequence (as measured by orthogonal peptide mapping with high resolution MS and MS/MS sequencing), disulfide bridging (as measured by non-reducing peptide mapping), free cysteines (as measured by Ellman's or peptide mapping), and thioether bridging (as measured by peptide mapping, SDS-PAGE, or CGE). Higher order structure can be analyzed using CD spectroscopy, DSC, H-D-exchange, and FT-IR. Glycosylation requires identification of glycan isoforms (by NP-HPLC-ESI-MS, exoglycosidase digestion, and/or MALDI TOF/TOF), sialic acid (by NP-HPLC, WAX, HPAEC, RP-HPLC) and aglycolsylation (by CGE and peptide mapping). Heterogeneity analyses must take into consideration C- and N-terminal modifications, glycation of lysine, oxidation, deamidation, aggregation, disulfide bond shuffling, and amino acid substitutions, insertions and deletions. The large variety of assays and techniques gives some idea of the daunting analytical challenge. As early as 1994, Russell Middaugh of Merck Research Laboratories (Middaugh, 1994) called for a single comparative analysis in which "a number of critical parameters are essentially simultaneously determined". Mass spectrometry (MS) may largely answer this call, because it may cover most of the physicochemical properties for molecular analysis.

One of the problems with MS-based assays, however, is the lack of high-quality data analysis software, and in particular, the ability to dynamically interpret and display reports on the often complex results. Unlike slow gel-based peptide mapping, which allows human visual comparison, MS generally relies on automatic data analysis, due to the huge numbers of spectra (often >10,000/hour), the high accuracy of the measurements (often in the 1-10 ppm range), and the complexity of spectra (100 s of peaks spanning a dynamic range >1000). There are a large number of programs for "easy" MS-based proteomics, for example, SEQUEST, Mascot, X!Tandem, etc., but these programs were not designed for deep analysis of single proteins, and are incapable of difficult analytical tasks such as characterizing mutations, glycopeptides, or metabolically altered peptides. Moreover, the programs just named are all identification tools and must be coupled with other programs such as Rosetta Elucidator (now discontinued), Scaffold, or Thermo Sieve for differential quantification. There are also specialized tools such as PEAKS for de novo sequencing, along with a host of academic tools. The confusing array of software tools poses an obstacle to biotech companies adopting MS-based assays.

SUMMARY OF THE DISCLOSURE

Described herein are user-interactive apparatuses for the interpretation of MS-based analysis of proteins, as well as methods and software for generating and using reports, including pivot tables on such information. In particular, described herein are interactive apparatuses and methods for generating useful, simplified reports from highly complex MS data, and in particular, data from multiple MS datasets. It is common to run multiple trials of the same protein, but it has proven difficult to analyze, and in particular, to concurrently analyze, such multiple trials. The methods and apparatuses described herein allow the use of multiple initial data sets (MS based data sets) into a single data flow (e.g., a data flow module, which may be implement in hardware, software or some combination thereof), from which one or more reports may be generated.

Described herein are apparatuses and methods that may receive as initial input one or more “flat tables” (e.g., flat files) of MS-based data. Each flat table may correspond to a set of MS based data and may include information specific to the MS of the protein. When multiple flat tables are received, the data may be combined into a single flat table (e.g., as opposed to pivot table) and pre-processed prior to being rendered as a pivot table. For example, as shown in FIG. 1, the pre-pivot processing may include extraction of metadata from the flat table. This pre-pivot processing may be performed using a scripting language or toolset that allows virtually any, including non-linear, analysis, to be performed on the MS data in the flat table. This new metadata may be added to the flat table and the flat table with the new metadata may be processed through the pivot table engine to generate a pivot table. Following the generation of the pivot table a second processing step, post-pivot metadata extraction, may be performed to determine data from the pivot table (e.g., averages, etc.) and this new set of data may be added to the pivot table output from the pivot table engine. Optionally, the post-pivot table data may be added to the flat table and re-run. These processes may be dynamically repeated anytime the flat table is modified by the user, which may be done on the fly.

In FIG. 1, the dashed box may refer to a configuration file, including the pre- and post-pivot metadata extraction. The metadata extraction may refer to the data extracted or determined from the flat table, without requiring additional data. This new data (manipulated/extracted from the flat table) may be added to the flat table (e.g., the summed flat table).

An apparatus including a user interface for controlling the pivot table engine, including the selection and display of components (including the pre- and/or post-pivot metadata) may be manipulated, in real time, by the user, who may adjust the resulting pivot table and other reports (e.g., graphical output). This is illustrated in the figures (FIGS. 2A-38U) herein.

According to some embodiments, a computer-implemented method for dynamically preparing reports from a mass spectrometry data set associated with a molecule of interest is described. The method can include displaying an inspection view component of a user interface, the inspection view component comprising a table window and a spectrum window, the table window comprising a table of values comprising a plurality of mass-to-charge ratio values associated with the molecule of interest, the spectrum window comprising a graph indicating one or more peaks corresponding to mass-to-charge ratios of at least one molecular species associated with the molecule of interest. The method can also include receiving, from a user, one or more selections modifying one or more of the table of values and the graph indicating the one or more peaks. The method can further include displaying, in response to a user’s export command, a report view component of the user interface comprising pivot tabs selectable by the user, each of the pivot tabs configured to display all or a subset of the information from the modified one or more of the table of values and the graph indicating the one or more peaks of the inspection view component of the user interface. The method can additionally include selecting, in response to a user’s tab selection, one of the pivot tabs to display within the report view component of the user interface, wherein the selected pivot tab comprises an active element window configured to display a first subset of pivot functions, a display window configured to display one or more of a report table and a report graph based on the first subset of pivot functions, and a storage window configured to display a second subset of pivot functions that is not displayed in the display window. The method can also include moving, in response to a user-input move command, one or more pivot functions between the active element window and the storage window to adjust the one or more of the report table and the report graph displayed in the display window. The method can further include saving the pivot functions contained in the active element window as the first subset of pivot functions associated with the selected pivot tab.

According to some embodiments, a computer-implemented method for dynamically preparing reports from a mass spectrometry data set associated with a molecule of interest is described. The method can include displaying an inspection view component of a user interface, the inspection view component comprising a table window and a spectrum window, the table window comprising a table of values comprising a plurality of mass-to-charge ratio values associated with the molecule of interest, the spectrum window comprising a graph indicating one or more peaks corresponding to mass-to-charge ratios of at least one molecular species associated with the molecule of interest. The method can also include receiving, from a user, one or more selections modifying one or more of the table of values and the graph indicating the one or more peaks. The method can further include displaying, in response to a user’s export command, a report view component of the user interface comprising pivot tabs selectable by the user, each of the pivot tabs configured to display all or a subset of the information from the modified one or more of the table of values and the graph indicating the one or more peaks from the inspection view component of the user interface. The method can additionally include selecting, in response to a user’s tab selection, one of the pivot tabs to display within the report view component of the user interface, wherein the selected pivot tab comprises an active element window configured to display a first subset of pivot functions, a display window configured to display one or more of a report table and a report graph based on the first subset of pivot functions, and a storage window configured to display a second subset of pivot functions that is not displayed in the display window. The method can also include toggling between the inspection view component and the report view component based on user input, and dynamically modifying the pivot tabs in response to a user further modifying one or more of the table of values and the graph in the inspection view component. The method can further include generating a report from one or more of the pivot tabs.

For example, a computer-implemented method for dynamically preparing reports associated with a molecule of interest may include: displaying an inspection view component of a user interface including mass spectrometry (MS) data, the inspection view component further comprising: a window including values associated with the molecule of interest, wherein the values associated with the molecule of interest are one or more of: mass values, mass-over-charge ratio (m/z) values, or values derived from mass-to-charge ratios, and data from one or more analytical techniques specific to the molecule of interest; and a spectrum window including a graph indicating peaks corresponding to the values associated with the molecule of interest; displaying a report view on a user interface dashboard, the report view comprising one or more selectable pivot tabs, each of the one or more selectable pivot tabs including all or a subset of information from one or both of the values associated with the molecule of interest and the graph having peaks corresponding to the values associated with the molecule of interest; and dynamically modifying a selected pivot tab in response to a user modifying one or both of the values associated with the molecule of interest and the graph indicating peaks corresponding to the values associated with the molecule of interest. The one or more analytical techniques specific to the molecule of interest may be chromatography data (e.g., liquid chromatography (LC), gas chromatography, ion mobility, gel electrophoresis and/or capillary electrophoresis). The one or more analytical techniques specific to the molecule of interest may comprise pH and/or $O_2$ levels, bioreactor sample data, clinical data, or charge variant data.

In general, the apparatuses and method described herein (e.g., the computer-implemented methods) may include the ability to compare an analyze data over time (e.g., new datasets, pivot tables, etc.). Thus in general, these reports (e.g., report views) may be dynamic reports.

In general, the output may be a dashboard (e.g., a user interface report) that shows data but may be updated as data is added. This is a dynamic and in some examples interactive process.

Any of the computer-implemented methods and apparatuses described herein may be performed on a local and/or a remote processor. Thus, in some examples a remote processor may be used to perform many or all of the steps of these methods. In some examples the displays, including the dashboard, may be displayed locally from a remote (e.g., web-driven) system.

In general, these methods and apparatuses may be used with any appropriate types of data, in addition to the MS data, on a molecule (or molecules) of interest. Thus, the displays are not limited to MS data. Virtually any type of process data may be included, including, but not limited to analytical techniques (e.g., chromatography, charge variants, etc.) related to and/or connect to mass-spec species, etc. In some examples the process data may include data on one or more samples from a bioreactor including the molecule(s) of interest. In some examples the data may include sensor data related to the molecule(s) of interest, such as pH/O2 levels, feed information (e.g., in examples include a bioreactor), data specific to particular clones or subsets of the target molecule(s) of interest. In some examples, the data may include one or more additional types of biological data, including (but not limited to clinical data). For example, the data may include data related to the molecule of interest, or data related to one or more instruments used to collect other data about the molecule of interest, and/or to patient-specific data. Virtually any data may be included.

According to some embodiments, a non-transitory computer-readable medium with instructions stored thereon, that when executed by a processor, perform steps comprising: storing a mass spectrometry data set associated with a molecule of interest in a memory location; displaying an inspection view component of a user interface, the inspection view component comprising a table window and a spectrum window, the table window comprising a table of values comprising a plurality of mass-to-charge ratio values associated with the molecule of interest, the spectrum window comprising a graph indicating one or more peaks corresponding to mass-to-charge ratios of at least one molecular species associated with the molecule of interest; receiving, from a user, one or more selections modifying one or more of the table of values and the graph indicating the one or more peaks; displaying, in response to a user's export command, a report view component of the user interface comprising pivot tabs selectable by the user, each of the pivot tabs configured to display all or a subset of the information from the modified one or more of the table of values and the graph indicating the one or more peaks from the inspection view component of the user interface; selecting, in response to a user's tab selection, one of the pivot tabs to display within the report view component of the user interface, wherein the selected pivot tab comprises an active element window configured to display a first subset of pivot functions, a display window configured to display one or more of a report table and a report graph based on the first subset of pivot functions, and a storage window configured to display a second subset of pivot functions that is not displayed in the display window; toggling between the inspection view component and the report view component based on user input, and dynamically modifying the pivot tabs in response to a user further modifying one or more of the table of values and the graph in the inspection view component; and generating a report from one or more of the pivot tabs.

The report view component of the user interface can include default tabs including one or more of: a summary tab that, when selected, is configured to display a description of the molecule of interest and mass spectrometry parameters; a coverage tab that, when selected, is configured to display information related to the molecule of interest; a percent modification tab that, when selected, is configured to display information associated with modifications to the molecule of interest; and an average percent modification tab that, when selected, is configured to display the information associated with modifications averaged among multiple mass spectrometry data sets. The user may be able to toggle between the inspection view component and the report view component based on user input. In some cases, the inspection view component comprises a chromatogram of the mass spectrometry data set. The apparatus may be configured to dynamically modify one or more of the pivot tabs in response to the user further modifying one or more of the table of values and the graph indicating the one or more peaks of the inspection view component of the user interface. The table of values of the table window of the inspection view component can include information associated with the intact molecule of interest and/or one or more fragments of the molecule of interest. For example, the information can include one or more of an occurrence, modifications, isotopes, and date of mass spectrometry associated with the intact molecule of interest and/or the one or more fragments of the molecule of interest. Displaying the inspection view can comprise dynamically adjusting the table window and the spectrum window as the user modifies one or more of the table of values and the graph indicating the one or more peaks. The apparatus may be configured to modify an order or arrangement of information displayed in the report table and/or the report graph of the display window in response to user input. Modifying one or more of the pivot tabs can comprise dynamically adjusting the display window in the report view component of the user interface. In the inspection view component, the user may be able to select one or more peaks and/or be able to select a range of mass-to-charge ratios around one or more peaks. The apparatus may be configured to generate a report from the display window of one or more of the pivot tabs. The apparatus may be configured to apply one or more filters to the first subset of pivot functions in the active element window in response to user input. The user may be able to select one or more additional mass spectrometry data sets, wherein displaying the report view component comprises concatenating the mass spectrometry data set with one or more additional mass spectrometry data sets so that the table window and/or the spectrum window is populated with information from the concatenated mass spectrometry data set.

BRIEF DESCRIPTION OF THE DRAWINGS

The novel features of the invention are set forth with particularity in the claims that follow. A better understanding of the features and advantages of the present invention will be obtained by reference to the following detailed description that sets forth illustrative embodiments, in which the principles of the invention are utilized, and the accompanying drawings of which:

DETAILED DESCRIPTION

Figure 1:
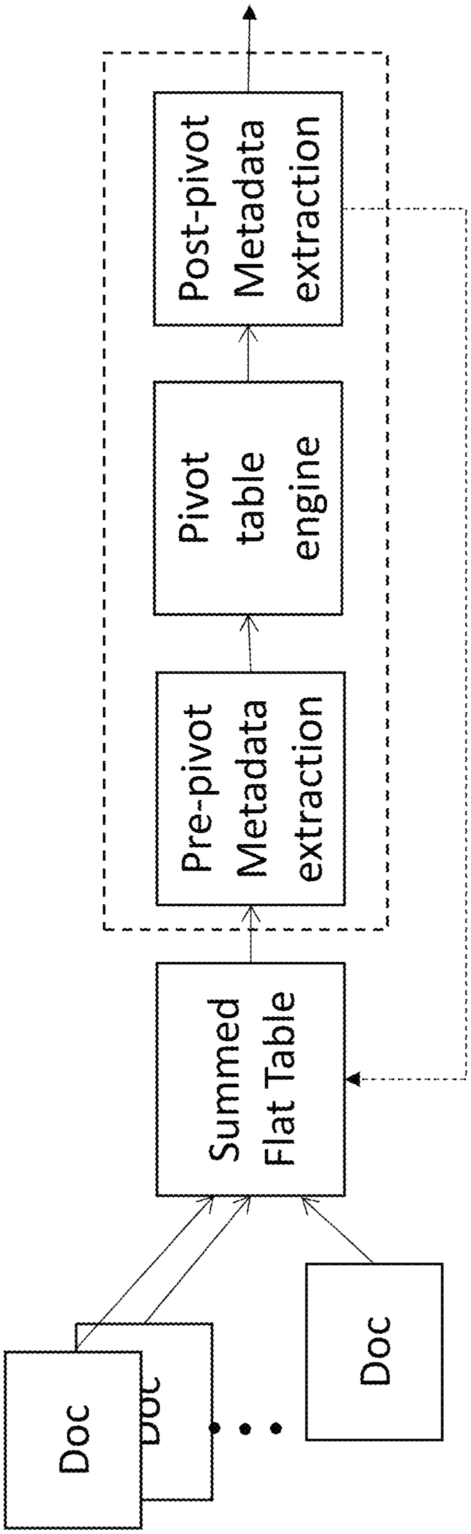
FIG. 1 provides a schematic overview of a method of dynamically determining a pivot table from mass spectrometry data.
Figure 2A:
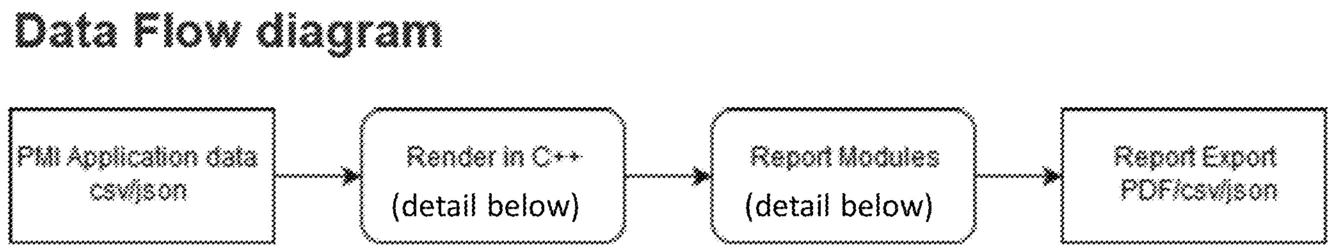
FIG. 2A provides a schematic diagram of a data flow for reporting mass spectrometry data.
Figure 2B:
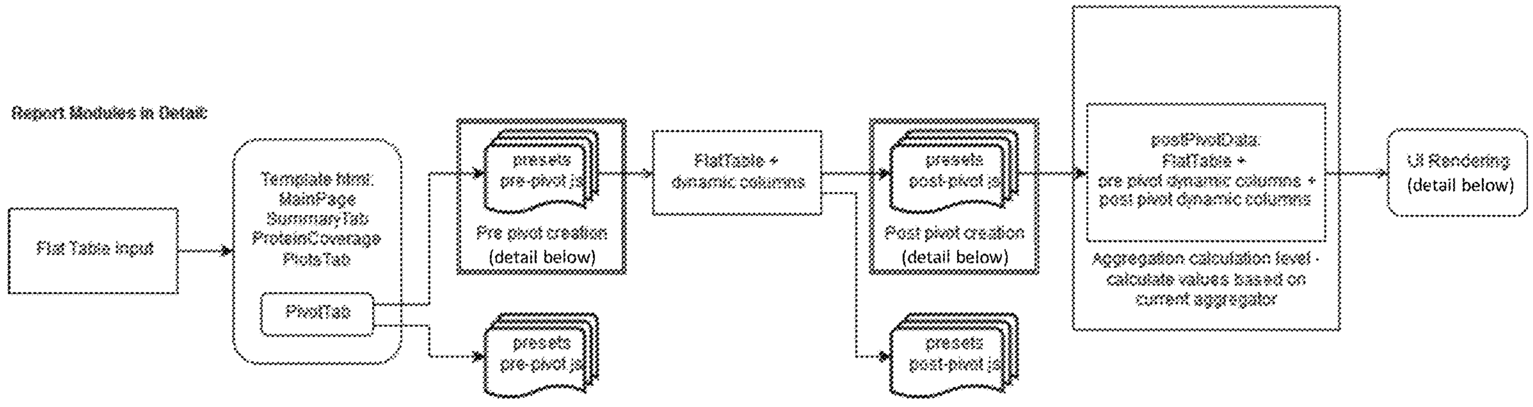
FIG. 2B shows additional detail on the report modules from the overview of FIG. 2A.
Figure 2C:
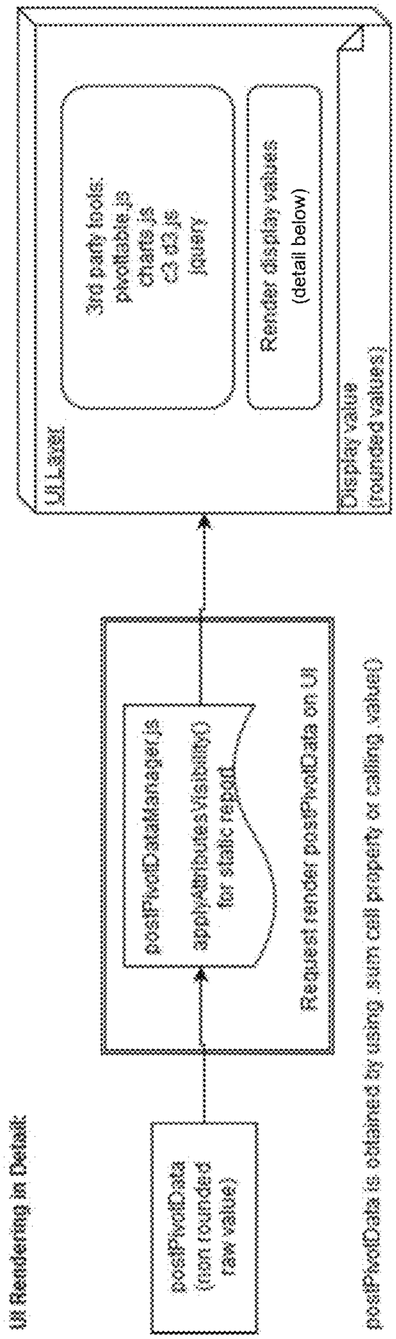
FIG. 2C illustrates additional detail on the user interface (UI) rendering for FIGS. 2A-2B.
Figure 2D:
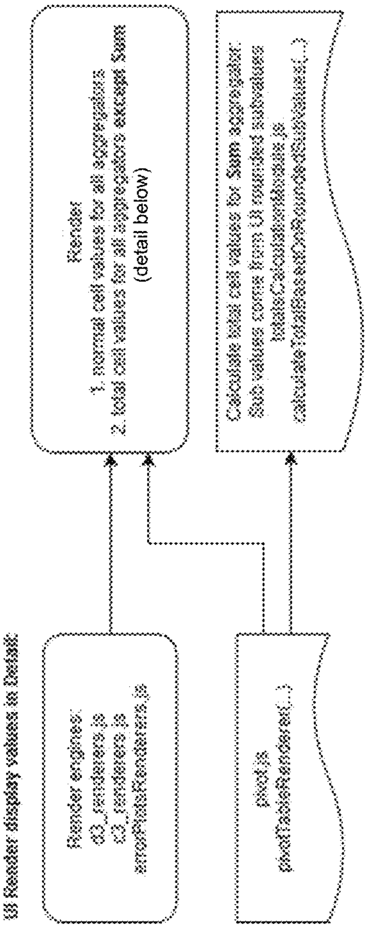
FIG. 2D is a flow for rending reports in detail from FIGS. 2A-2C.

In the following detailed description, for purposes of explanation and not limitation, illustrative embodiments disclosing specific details are set forth in order to provide a thorough understanding of embodiments according to the present teachings. However, it will be apparent to one having had the benefit of the present disclosure that other embodiments according to the present teachings that depart from the specific details disclosed herein remain within the scope of the appended claims. Moreover, descriptions of well-known devices and methods may be omitted so as not to obscure the description of the example embodiments. Such methods and devices are within the scope of the present teachings.

Drug substance analyses can be part of a critical path of drug development, and projects are often gated by the analysis of a production run. Any time saving that leads to earlier commercialization of a drug brings significant monetary benefits to the company, not to mention the therapeutic benefits of bringing novel treatments to the patients as early as possible. Described herein are methods and apparatuses (including systems, devices, user interfaces and/or software). The methods and systems may allow a user to interactively generate configurable, graphical tables to aid in interpreting MS data. The methods and systems described herein may be used to free up the time of technical staff for additional projects while reducing staff frustration with the analysis process. Prior to the present methods and systems, sequence variant analysis (SVA) used a cumbersome combination of several existing software tools, supplemented with the use of spreadsheet macros. In contrast, the methods and system described herein can include an integrated approach providing a single user-friendly dashboard where one can identify false positives and quantify true positives efficiently. This can give greater confidence to the user and drastically reduce the time required to distinguish true from false positive identifications.

A. Definitions

As used herein, "sequence variant" refers to any chemical change in a protein, peptide or peptide fragment relative to its wildtype counterpart. Sequence variants can include single or double amino acid substitutions, single amino acid insertions, single amino acid deletions, truncations, as well as oxidation, deamidation, glycosylation, and the like.

As used herein, the term "Mass Spectrometry" (MS) refers to a technique for measuring and analyzing molecules that involves ionizing or ionizing and fragmenting a target molecule, then analyzing the ions, based on their mass/charge ratios (m/z), to produce a mass spectrum that serves as a "molecular fingerprint". There are several commonly used methods to determine the mass to charge ratio of an ion, some measuring the interaction of the ion trajectory with electromagnetic waves, others measuring the time an ion takes to travel a given distance, or a combination of both.

As used herein, the term "sample" is used in its broadest sense, and may include a specimen or culture, of natural or synthetic origin.

As used herein, "protein" refers to a polymer of amino acids (whether or not naturally occurring) linked via peptide bonds. For the purposes of the present disclosure, a protein is the complete product, prior to any enzymatic digestion or fragmentation that is to be subjected to analysis by mass spectrometry.

A "peptide," as used herein, refers to one or more members of the mixture produced by controlled digestion of a protein. Typically, the peptide mixture is a product of digestion of the protein with a proteolytic enzyme, however other methods of controlled digestion are contemplated. In some cases, the digestion mechanism cleaves the protein at positions in response to the presence of specific amino acids. Due to incomplete digestion by the enzyme or other mechanism, the mixture of digestion products (i.e. peptides) can include the undigested protein, which in this situation would also be a peptide.

Finally, as used herein the term "fragment" or "peptide fragment" refers to the products of fragmentation within a mass spectrometer.

B. Input Data

Described herein are methods and systems for analyzing mass spectrometry data, especially to provide user-generated and customized reports identifying features from one, or preferably more, MS-based data sets. For example, these reports may aid in the detection and identification of molecular variants, wherein the initial sample contains a mixture of the molecule of interest (the reference molecule) and variant molecules, where the variants differ from the reference molecule by some chemical modification. The molecule of interest can be any molecule susceptible to analysis by mass spectroscopy, including but not limited to, polypeptides, oligonucleotides, lipids, organic polymers, pharmaceutical excipients and growth media components. A non-exclusive list of pharmaceutical excipients (polymers, surfactants, dispersants, solubilizers, bulking agents, etc.) includes, but is not limited to, polyvinylpyrrolidone, polyvinyl acetate, polysorbate, polyethylene glycol, polyvinyl alcohol, polyvinyl alcohol-polyethylene glycol, Poloxamer (polyethylene glycol-block-polypropylene glycol-block-polyethylene glycol), hydrogenate castor oils, and Mygliols. Cell growth media components include nutrients, such as protein, peptides, amino acids, and carbohydrates, as well as gelling components, such as agar, gelatin, carrageenans, alginates, and polyacrylamides. Exemplary modifications include oxidation, deoxidation, deamidation, conjugate, glycation, sulfation, glycosylation, alkylation, dealkylation, polymerization and the like. Preferably the methods and systems are useful for analyzing protein modifications, such as sequence substitutions, insertions or deletions, oxidation, deamination, glycosylation and the like.

The mass spectrometry data can be acquired according to conventional methods, which typically consist of i) subjecting the sample to a separation technique, ii) acquiring an MS1 spectrum (prior to fragmentation on a first mass spectrometer), iii) successively selecting each precursor ion observed with an intense signal on the MS1 spectrum, iv) successively fragmenting each precursor ion and acquiring its MS2 spectrum (after fragmentation on a second mass spectrometer), v) interrogating databases through software (i.e. perform a computational search of observed spectra with respect to a database or a library of recorded spectra) to identify one or more molecules having a strong probability of matching the MS2 spectrum observed. In some implementations, the sample is a protein that is first digested using a suitable enzyme to obtain a peptide mixture. Suitable enzymes include, but are not limited to trypsin, endoproteinase Asp-N, endoproteinase Glu-C, and thermolysin. If a protein sample contains wildtype protein and variant protein, the resulting peptide mixture will comprise wildtype peptide and variant peptide. Separation methods suitable for use in conjunction with the methods disclosed herein include, but are not limited to liquid chromatography (LC), gas chromatography, ion mobility, gel electrophoresis and capillary electrophoresis.

More than one type of digestion enzyme may be examined at once, and each may include multiple LC-MS/MS data acquisitions and multiple MS2 searches from any data acquisition. The MS2 data set may be generated using any fragmentation method, including any combination of low-energy CID, beam-type CID, and/or ETD. The quantification of a variant relative to wildtype (WT) is performed by label-free quantification with extracted ion chromatograms (XICs), which, in some implementations, have editable limits of integration.

Typically, the MS data is collected by a tandem mass spectrometer. In other implementations, the MS data is collected as MS1 data prior to fragmentation on a first mass spectrometer and MS2 data after fragmentation on a second mass spectrometer.

The data file(s) containing the MS1 and/or MS2 spectra can be loaded from a storage medium or received (e.g., directly) from another device (e.g. over a wired or wireless connection). The spectral data may be in any suitable format. In some implementations, the data is in a format proprietary to the manufacturer of the acquiring mass spectrometer, e.g. a .RAW file for a Thermo Fisher Scientific Orbitrap™ spectrometer. Alternatively, the data can be stored or transferred in an open format, such as mzML. For implementations comparing variant and wildtype spectra, the wild type and variant data can be obtained from a single data file or from separate wildtype and variant data files.

The list of molecular identifications can be populated from results of a computational search of observed spectra with respect to a database or library of recorded spectra. Optionally, the system described herein can accept a file containing results of an MS2 search based upon the input MS data. The MS2 search can be performed by software such as Byonic, Mascot, SEQUEST, PEAKS DB, X!Tandem, and the like. In some implementations, the search software is capable of identifying variants. For example, a common search performed by the Mascot software, and that would be appropriate as input for the methods described herein, is the "Error-Tolerant Search". While the utility of the current versions of Sequest nor X!Tandem can be limited because these software packages allow any number of instances of each variant per peptide, these programs are appropriate when searches are limited to fewer than approximately 10 types of variants.

In addition to the spectral representations, the method and systems described herein may require a description of the reference molecule. In the case of a protein, the description may include an amino acid sequence for the protein of interest in the sample. One or more chemical formulae, amino acid sequences, and/or oligonucleotide sequences can be entered manually, loaded from a storage medium or received directly from another device (e.g. over wired or wireless connection). In some implementations, the structure and/or sequence(s) can be automatically loaded from a website, upon entry of a URL.

A graphical user interface (GUI) or "dashboard" comprising several interactive views may be used to initially analyze the data for each run, generating MS based data that may be stored/saved as a flat table for each data set. These datasets may then be combined, as shown in FIG. 1, and analyzed in one or more of the examples shown in FIGS. 2A-2D and 3-37.

The reports may be customized and these customizations stored for later re-use, as shown in the figures.

Examples

FIGS. 3-39D graphically and textually illustrate exemplary portions of the user interface of the apparatus and methods described herein. The user interface can be used to generating a configurable pivot table report summarizing all or a portion of the mass spectrometry data.

Figure 39A:
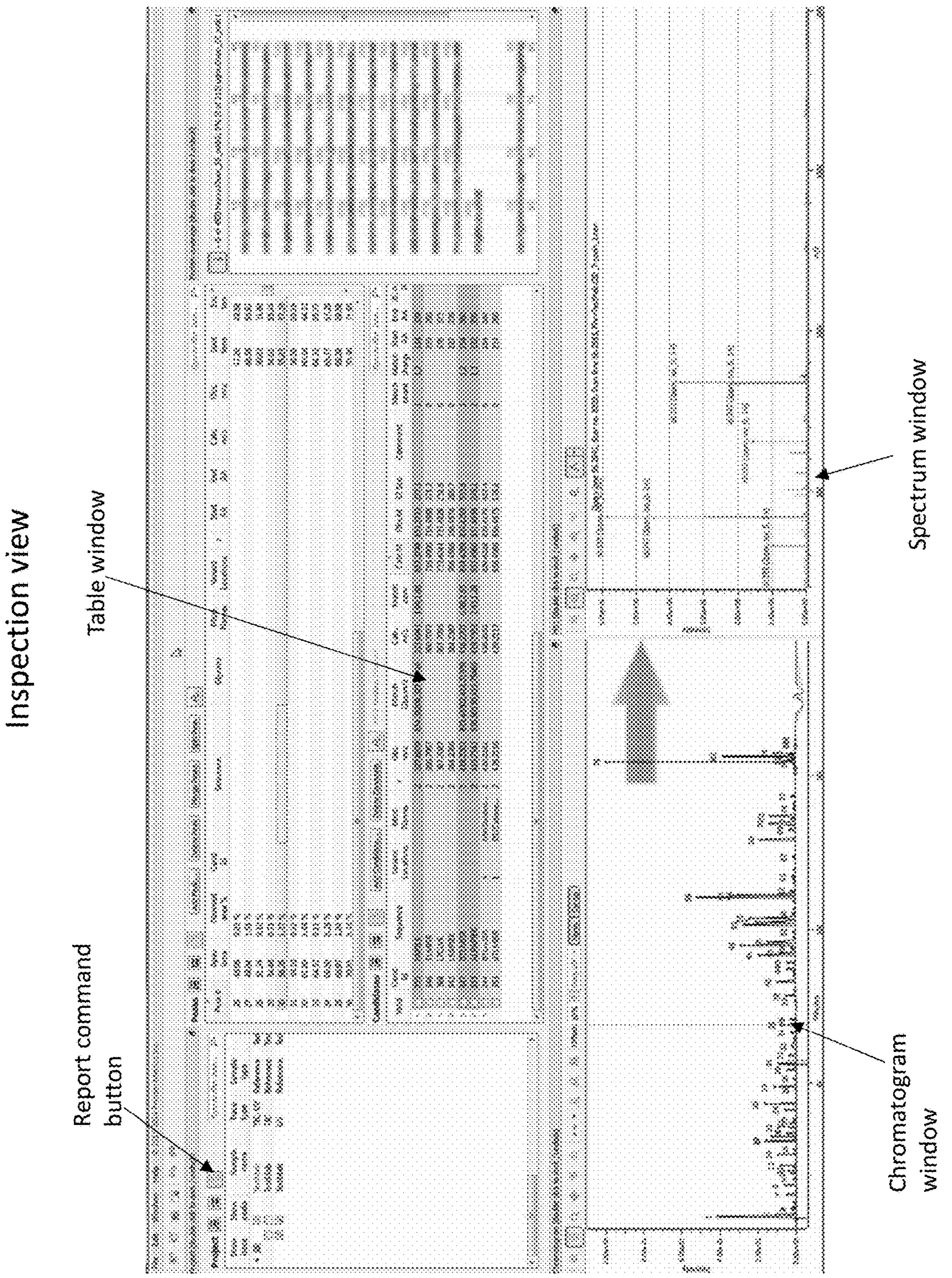
FIGS. 39A-39D illustrate example operations of an apparatus for dynamically analyzing and preparing a report, e.g., a pivot table, summarizing mass spectrometry data.
Figure 39B:
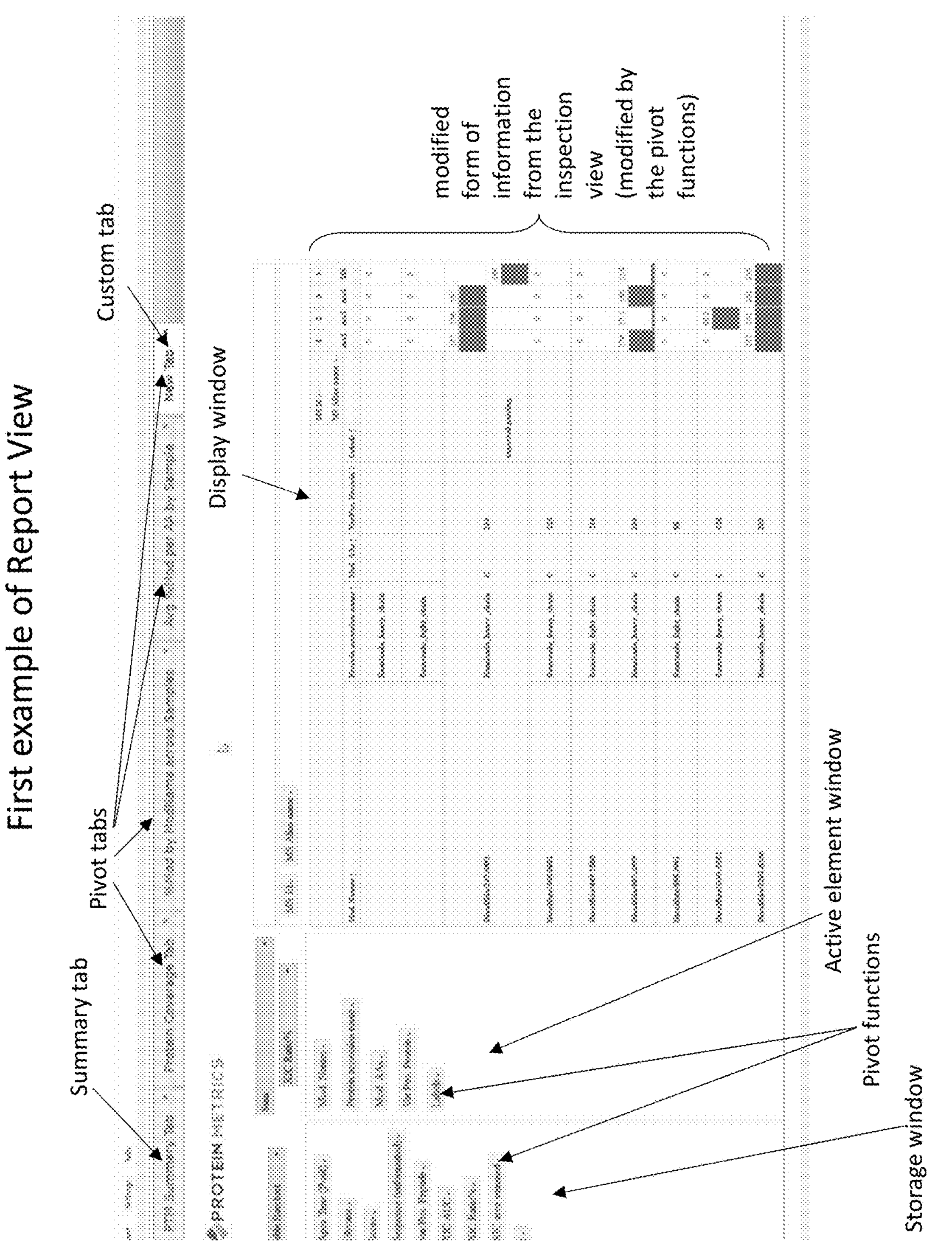
Figure 39C:
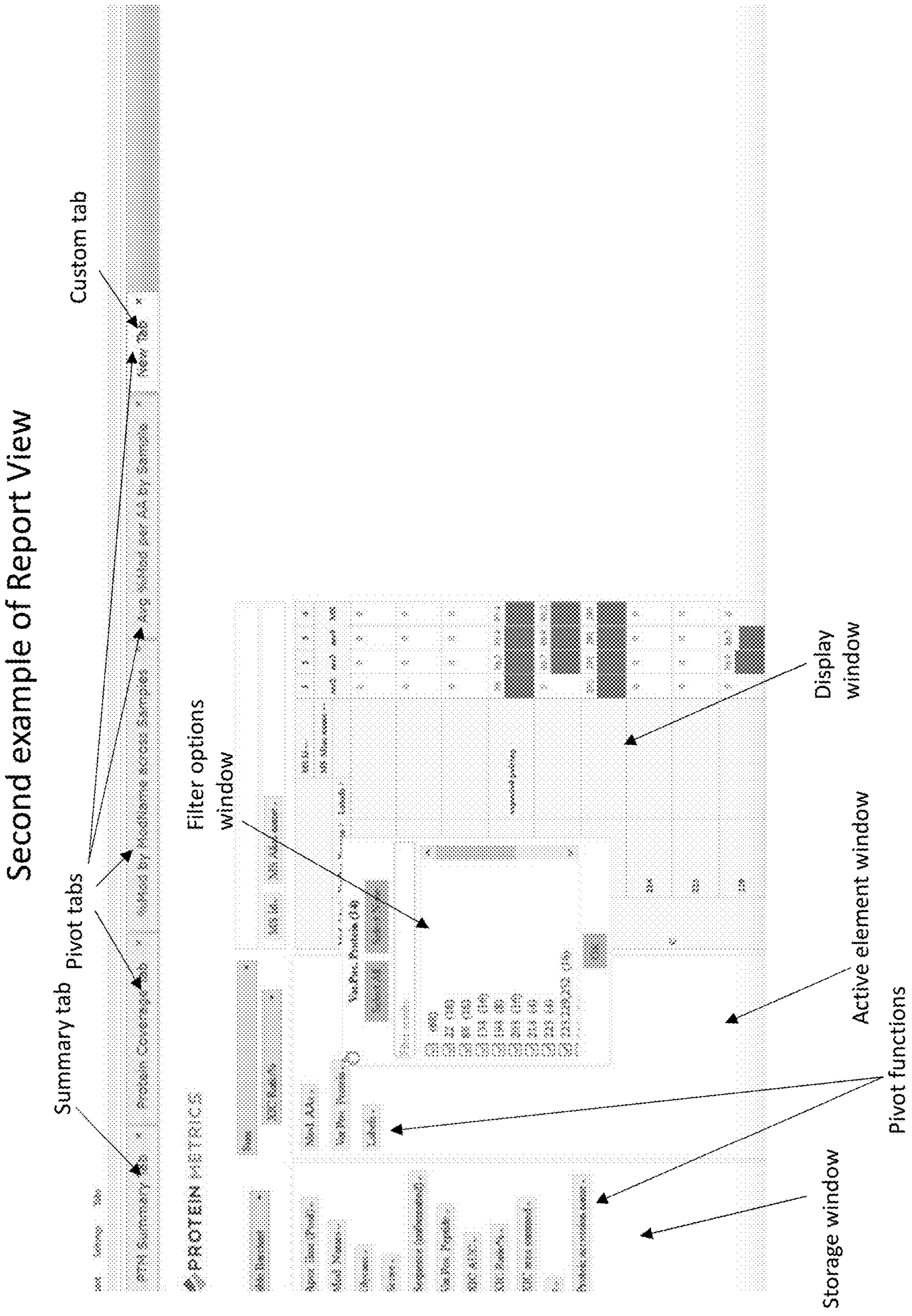
Figure 39D:
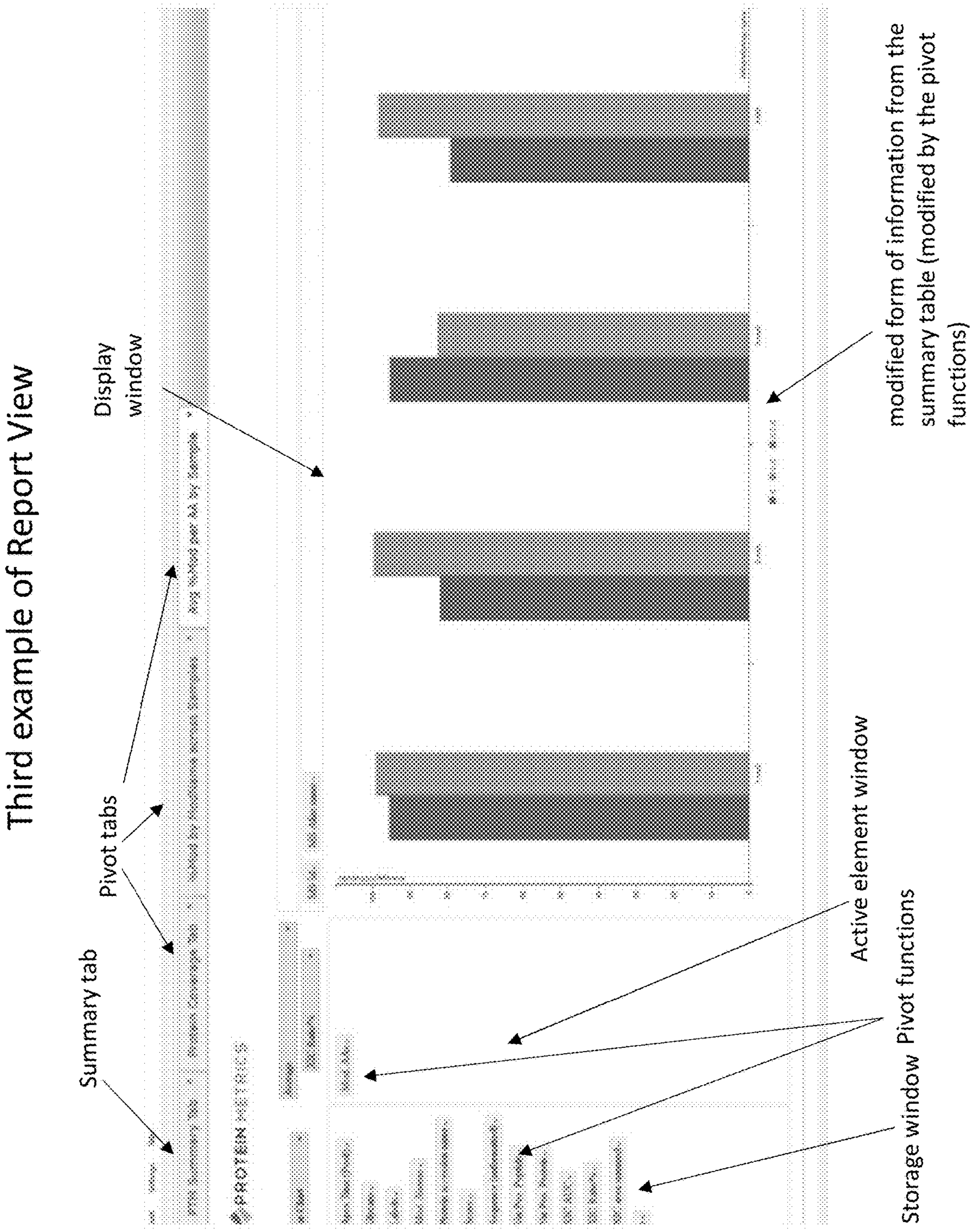

According to some embodiments, the user interface includes an inspection view component and a report view component, which may be viewed in separate windows. FIG. 39A shows an exemplary inspection view component of the user interface, and FIGS. 39B-39D show exemplary report view components of the user interface. The user may be able to dynamically select all or a subset of data in the inspection view component for displaying in a more concise, consolidated or readable form in the report view component. In some embodiments, the user may be able to toggle between the report view component and the inspection view component, e.g., to quickly determine how selected data in the inspection view component effects the data presented in the report view component. In some embodiments, the user may be able to import multiple mass spectrometry data sets (e.g., from different samples) and use the report view component to provide a report summarizing all or some of the multiple data sets.

Referring to FIG. 39A, the inspection view component can include a table window comprising a table of values associated with the molecule of interest, such as mass-to-charge ratio and peak intensity values for various peaks. The inspection view component can include a spectrum window comprising a graph indicating one or more peaks corresponding to mass-to-charge ratios of at least one molecular species (e.g., intact molecule and/or fragments) associated with the molecule of interest. The inspection view component can include a chromatogram window comprising a chromatogram of the mass spectrometry data.

Figure 11:
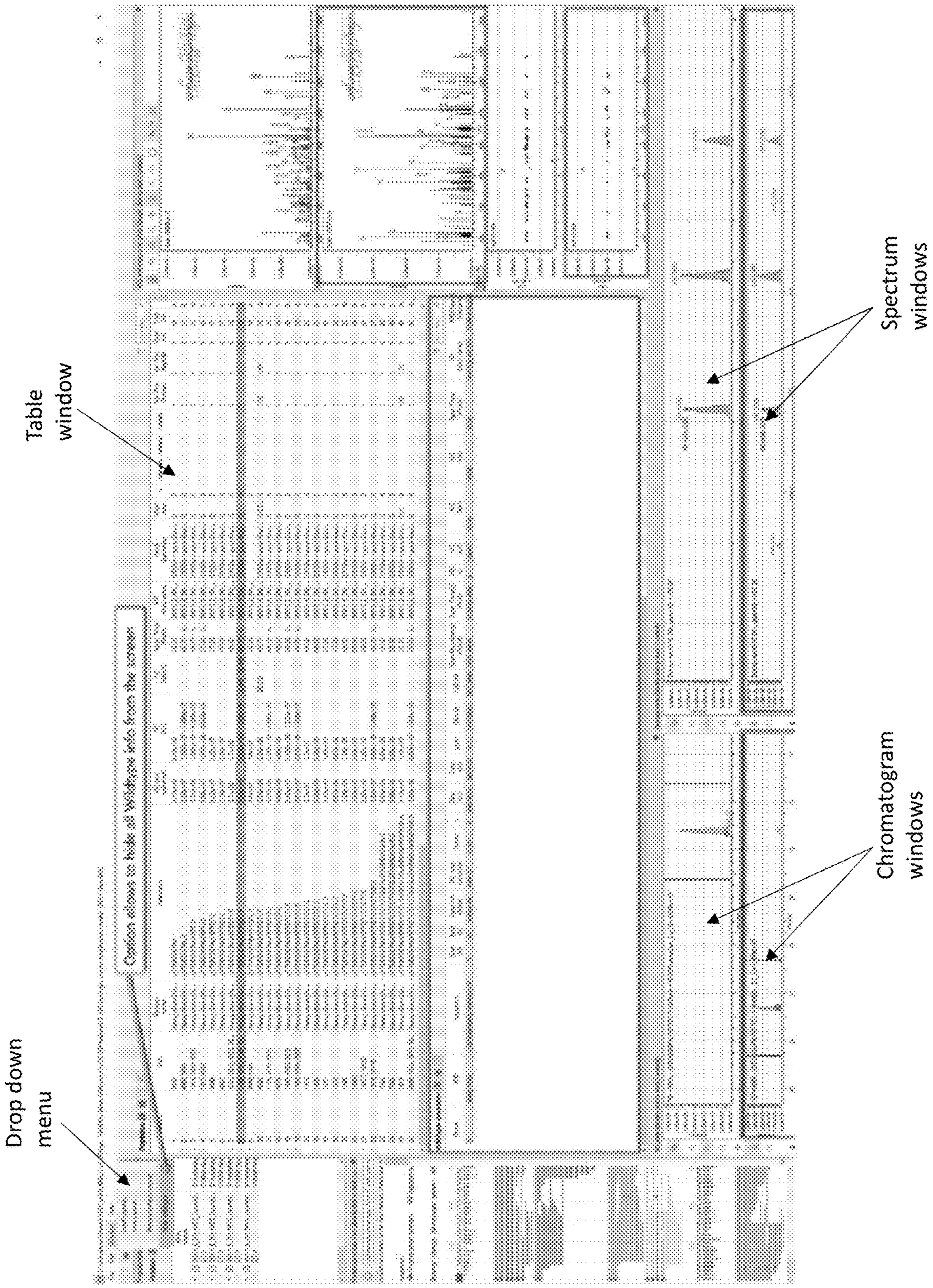
FIGS. 11 and 12 illustrate an inspection view component of a user interface, indicating how to hide wildtype protein data.
Figure 12:
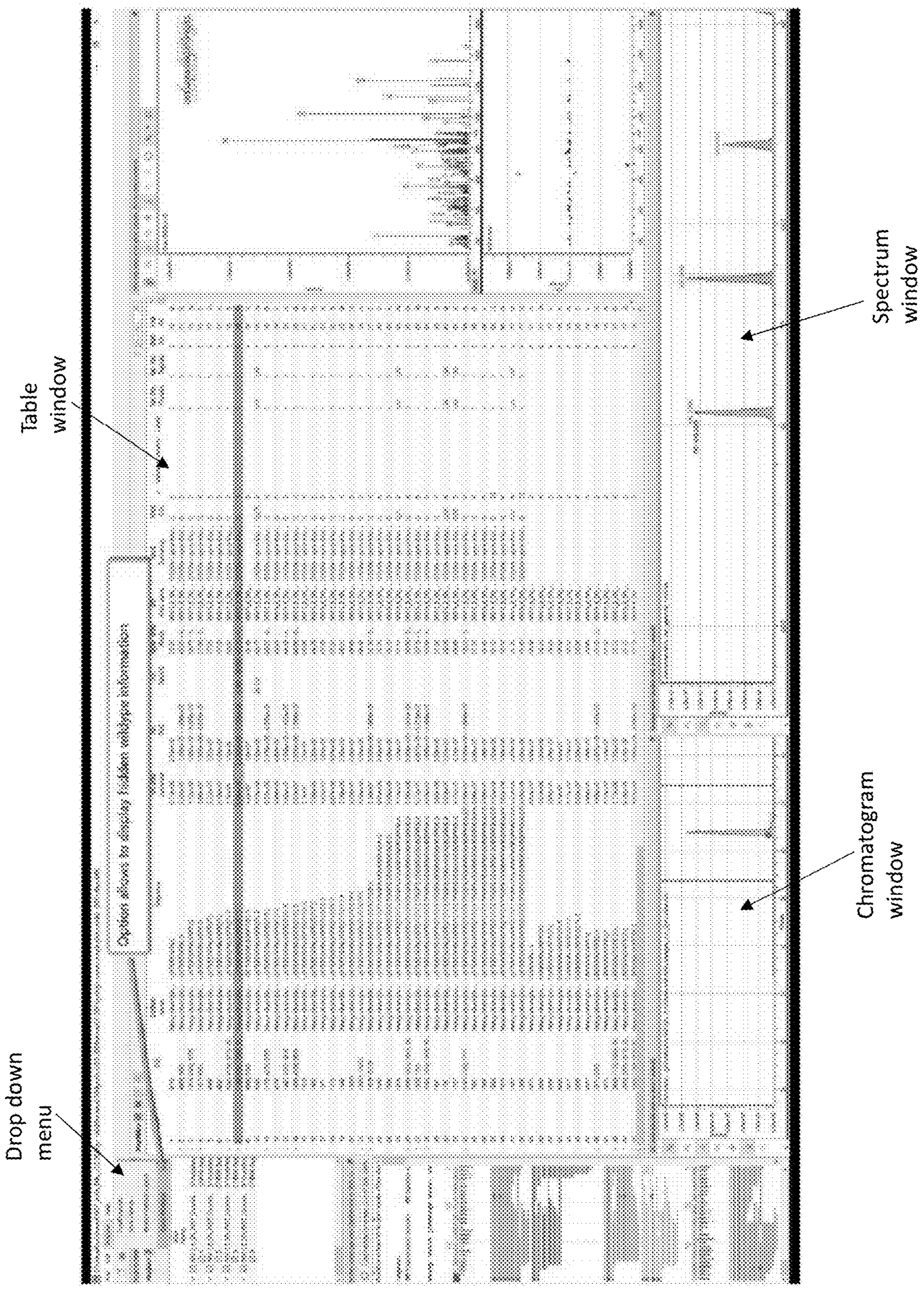

The inspection view component may provide the user the ability to hide certain portions of data. For example, FIGS. 11 and 12 show how a user can hide a data associated with wildtype protein. Referring to FIG. 11, for example, a dropdown menu can be accessed for the user to choose wildtype proteins to be hidden, which data can be highlighted in one or more rows of data within the table window. Hiding certain data this way can filter what is presented within the spectrum window and/or chromatogram window of the inspection view component. Referring to FIG. 12, the dropdown menu can then be access to display the wildtype proteins again.

Figure 13:
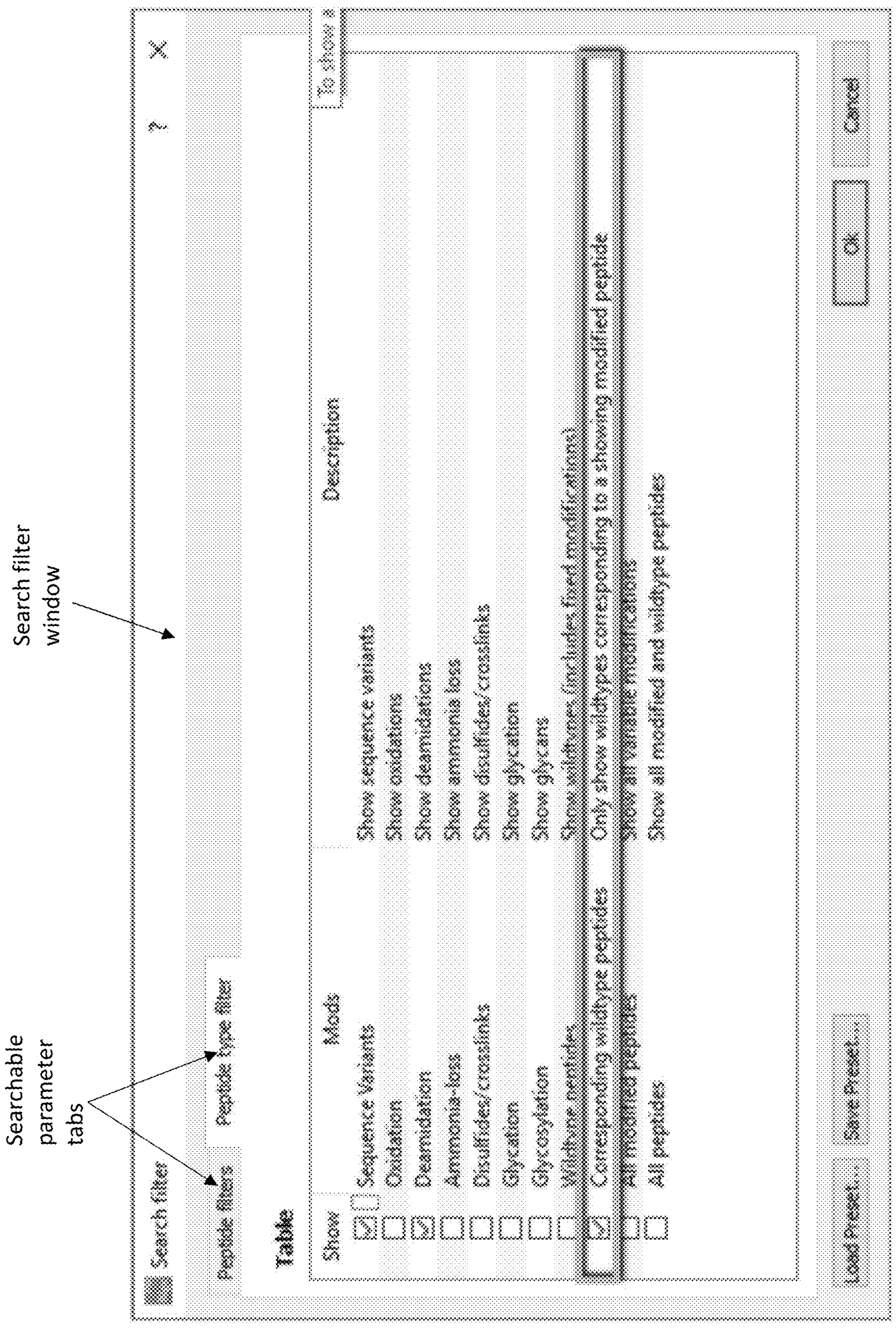
FIG. 13 illustrates a search filter window for filtering data presented in the inspection view module.

In some embodiments, the user can filter the data presented in the inspection view component based on a search. FIG. 13 shows an example of a search filter window that may be accessed by the user in the inspection view component (e.g., via a drop down menu). The search filter window can present a list of searchable parameters, such as types of molecules (e.g., modifications of the molecule of interest) within the sample. The selected parameters can then be used to filter the data presented in inspection view component as selected by the user. In some embodiments, the search filter window has multiple tabs for filtering based on different parameters (e.g., protein or protein type).

Figure 14:
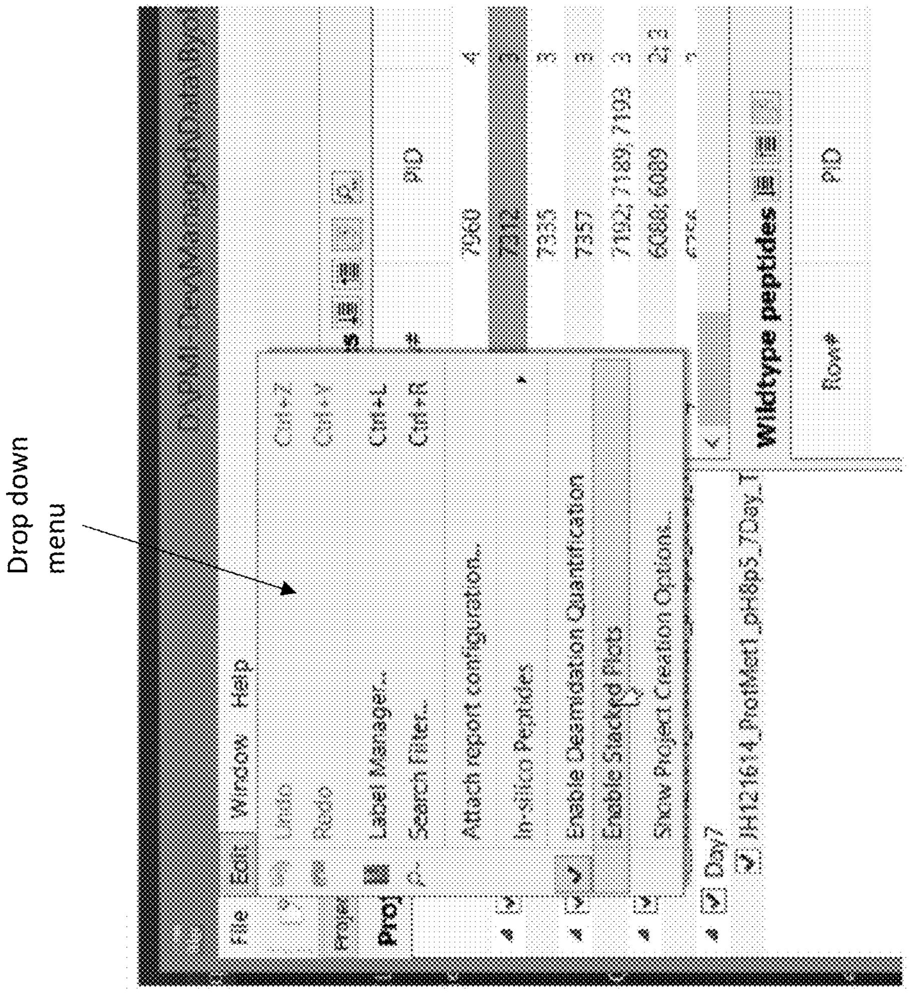
FIGS. 14 and 15 illustrate how to stack peaks in an inspection view component of a user interface.
Figure 15:
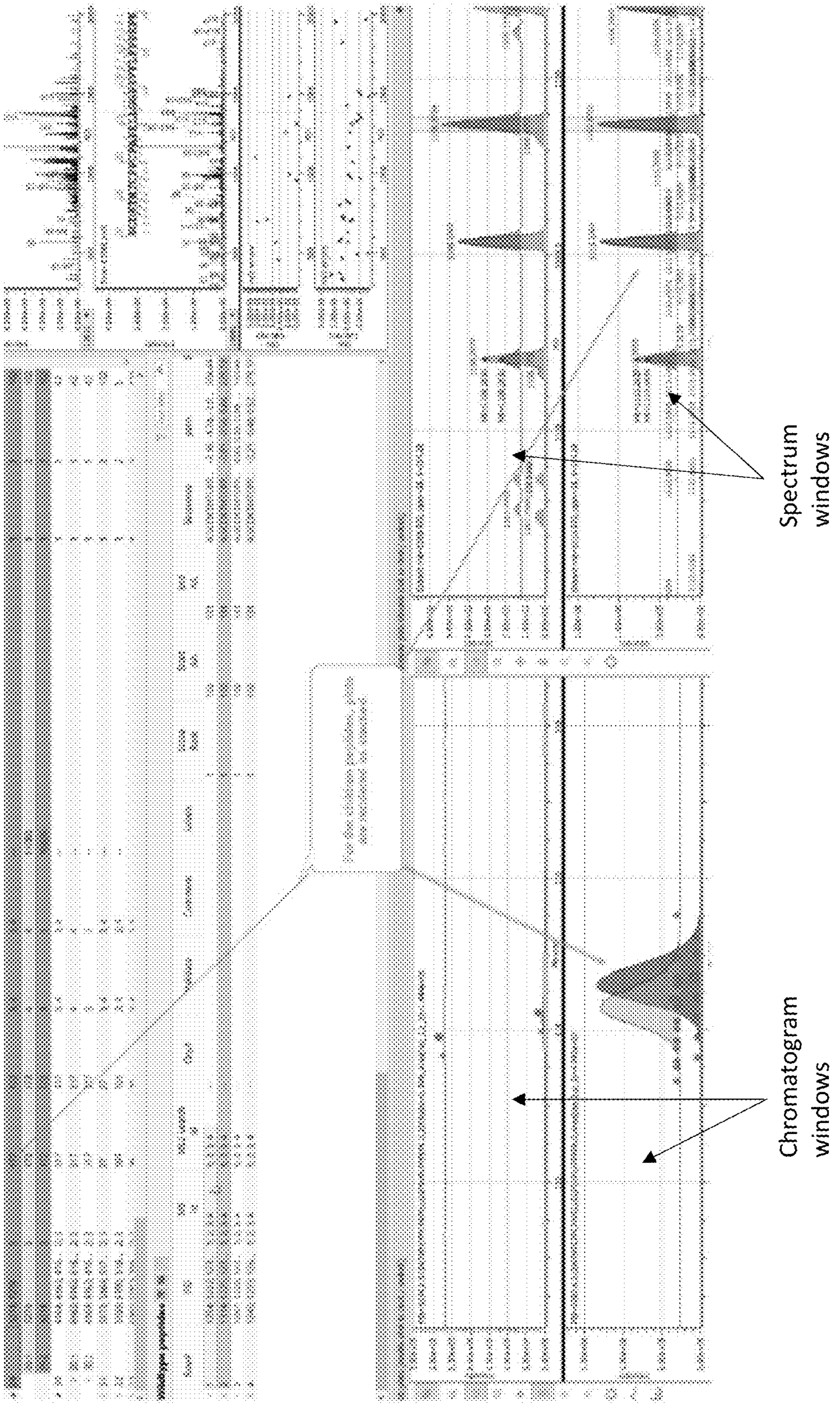

The inspection view component may provide the user the ability to stack peaks within the spectrum window and/or the chromatogram window, such as illustrated in FIGS. 14 and 15. FIG. 14 shows a user accessing a drop down menu from the inspection view component that provides an option for enabling stacked plots. When the user choses this option, FIG. 15 shows how various chosen peaks can be stacked in the spectrum window and/or chromatogram window. In some cases, the various peaks are indicated with different shadings and/or colors. This stacking feature may be useful, for example, if a user is interested in clustering associated peaks, such peaks associated with the intact molecule and/or different isotope. In some applications, peaks associated with parent peptides are stacked with peaks associated with multiple child peptides. This stacking feature may be used to associate other molecule types, such as wildtype, variants, and/or deamidation modifications.

Figure 38A:
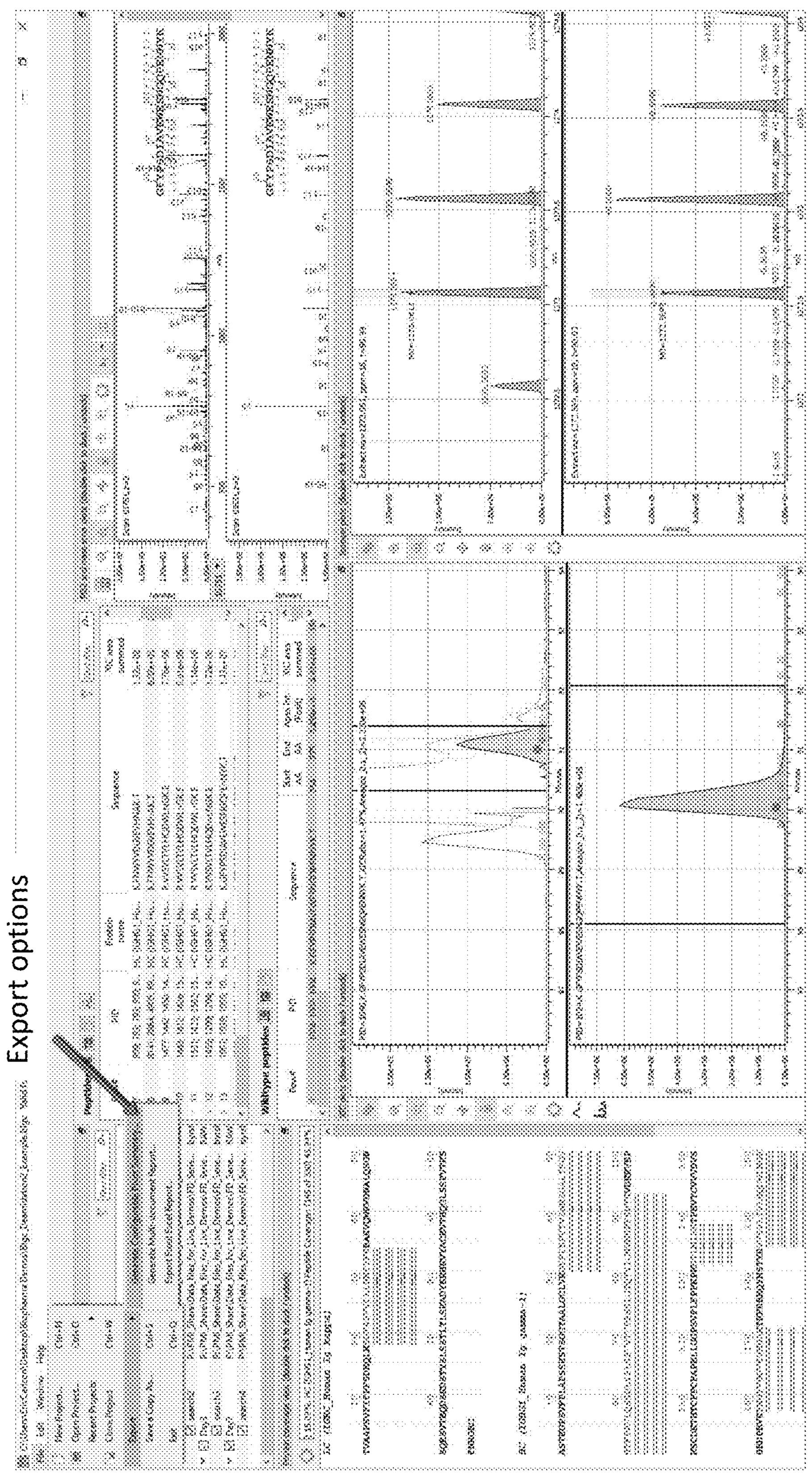
FIGS. 38A-38U illustrate example operations of an apparatus for dynamically analyzing and preparing a report, e.g., a pivot table, summarizing mass spectrometry data.

While in the inspection view component of the user interface, the user may be able to select data that is to be used in the report view component by clicking (e.g., double clicking) one or more values (e.g., one or more row of values) in the table window and/or one or more peaks in the spectrum window and/or chromatogram window. In some cases, the user is able to choose a range of data displayed in the inspection view component. For example, the user may be able to select a range of mass-to-charge ratios around a peak using range lines, such as shown in FIG. 38A. Once a desired set of data is selected in the inspection view component, the user can generate (e.g., export) one or more pivot reports such as shown in FIG. 38A.

Figure 31:
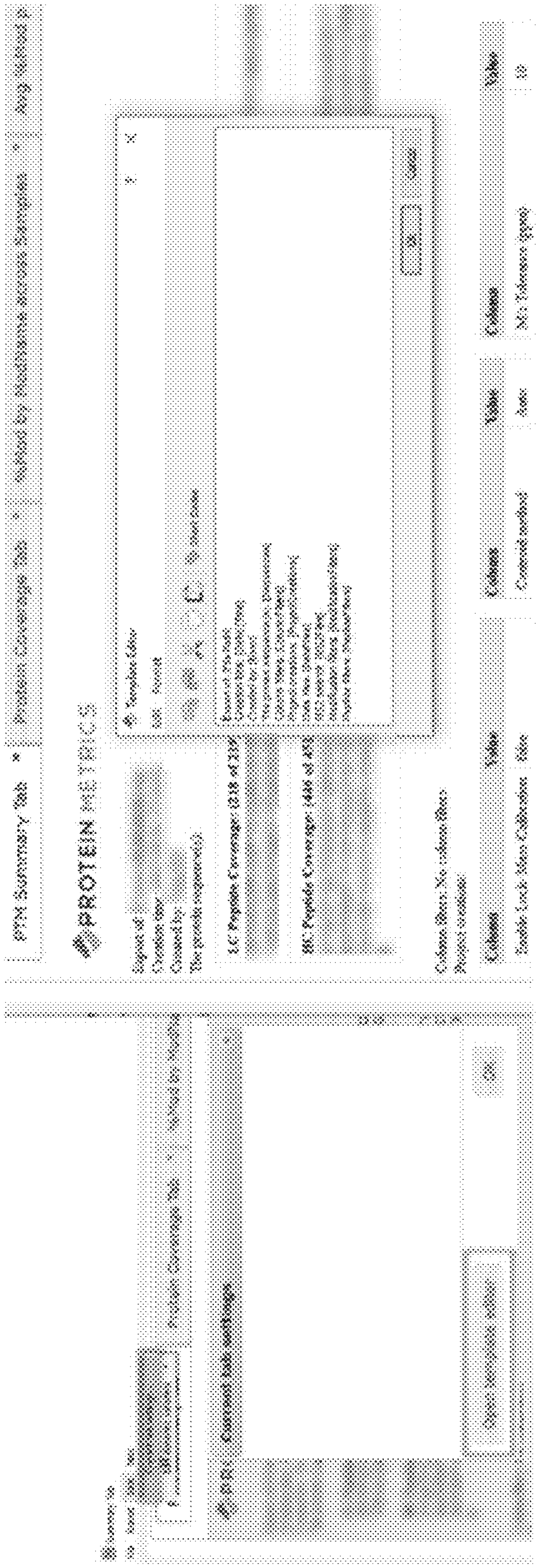
FIG. 31 illustrates how a user can customize a summary tab of the report view component.
Figure 38B:
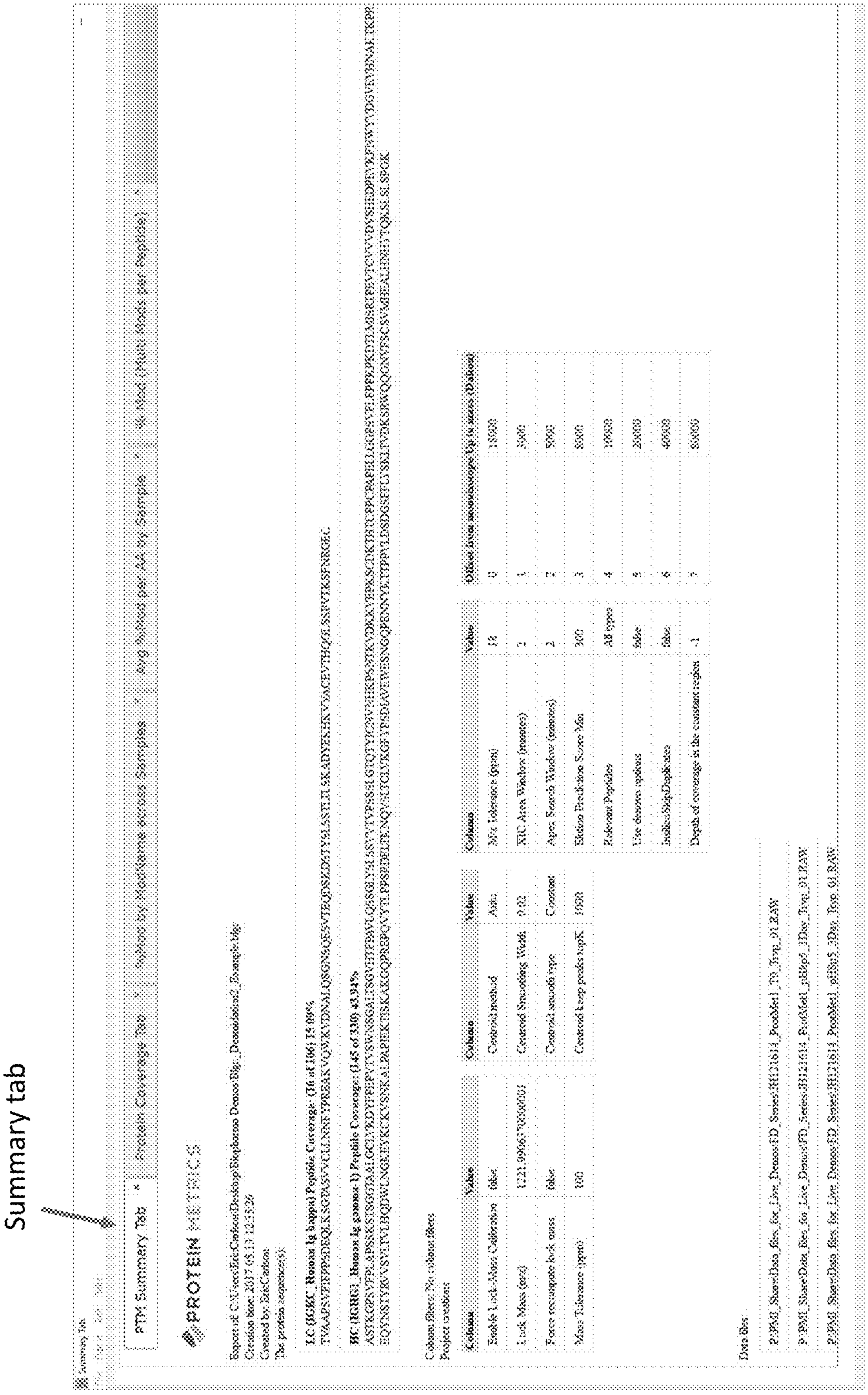
Figure 38C:
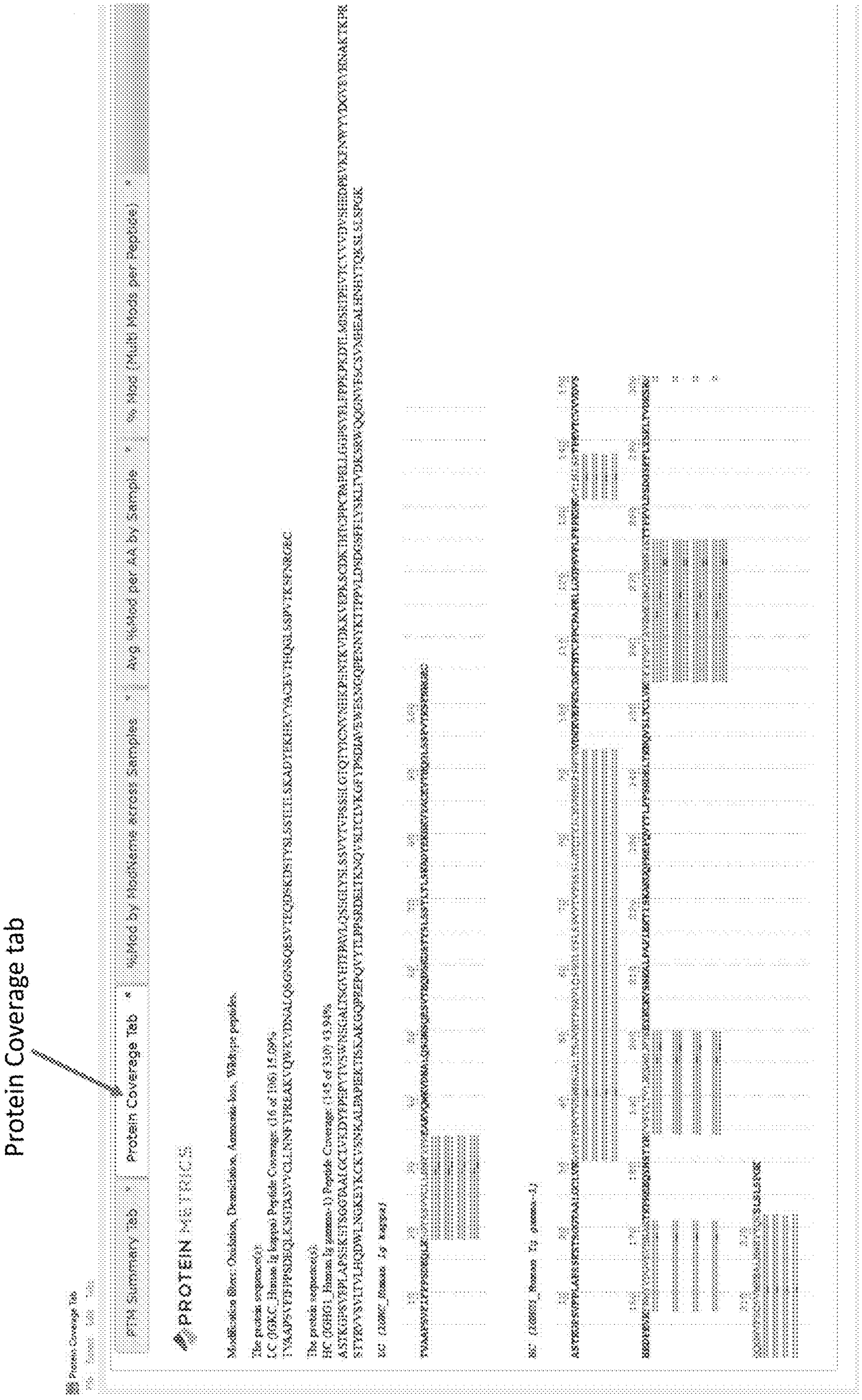
Figure 38D:
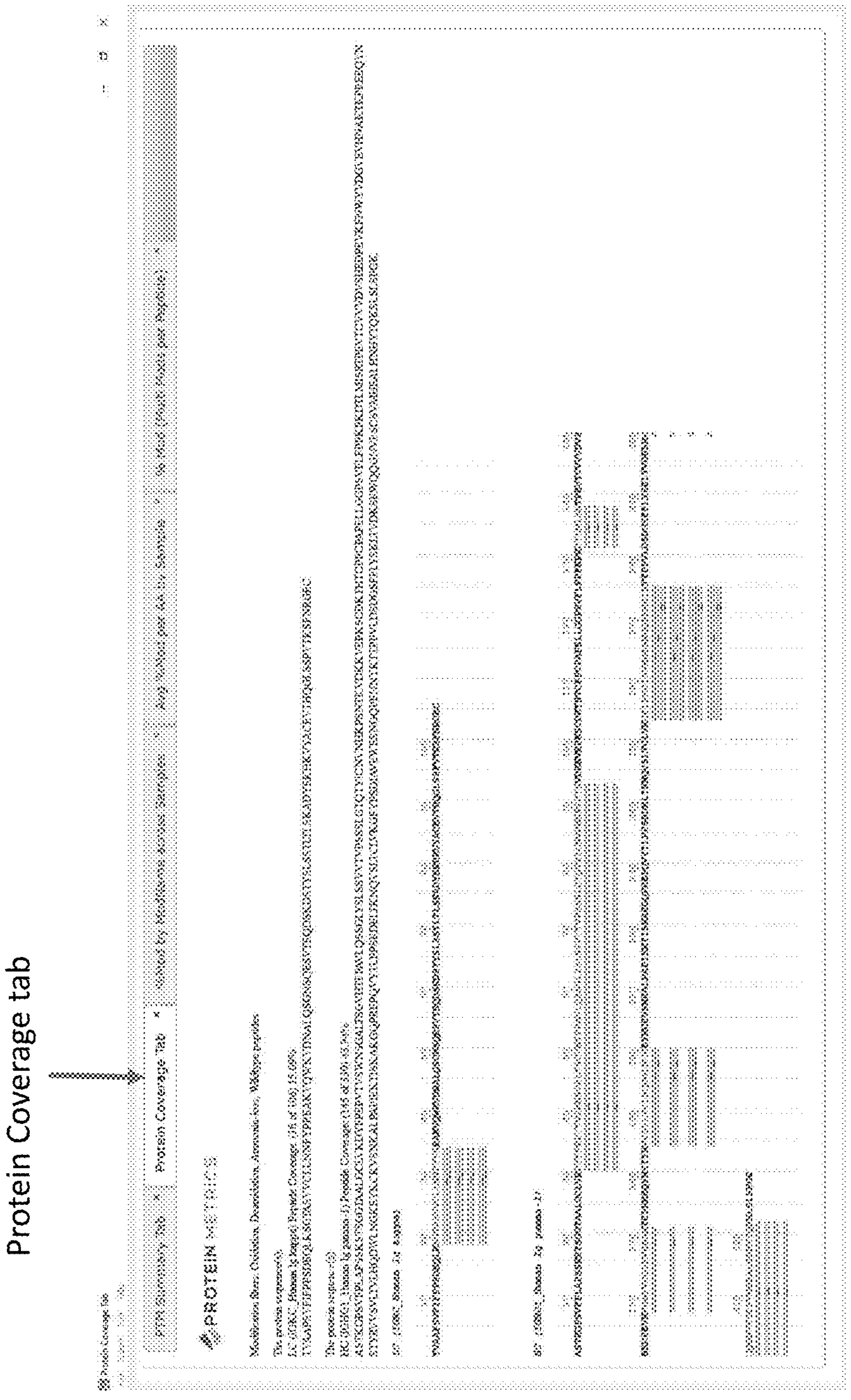
Figure 38E:
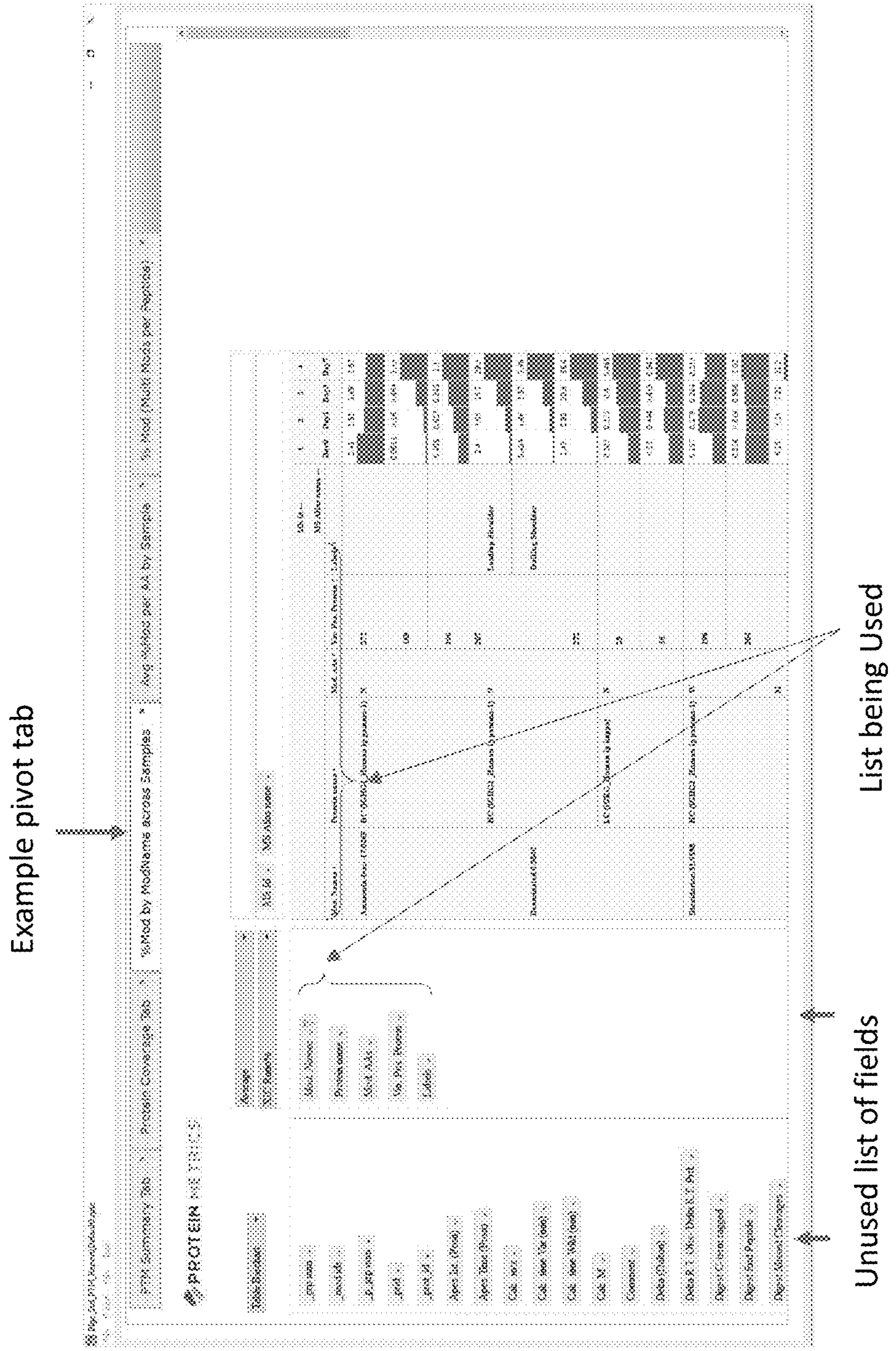
Figure 38F:
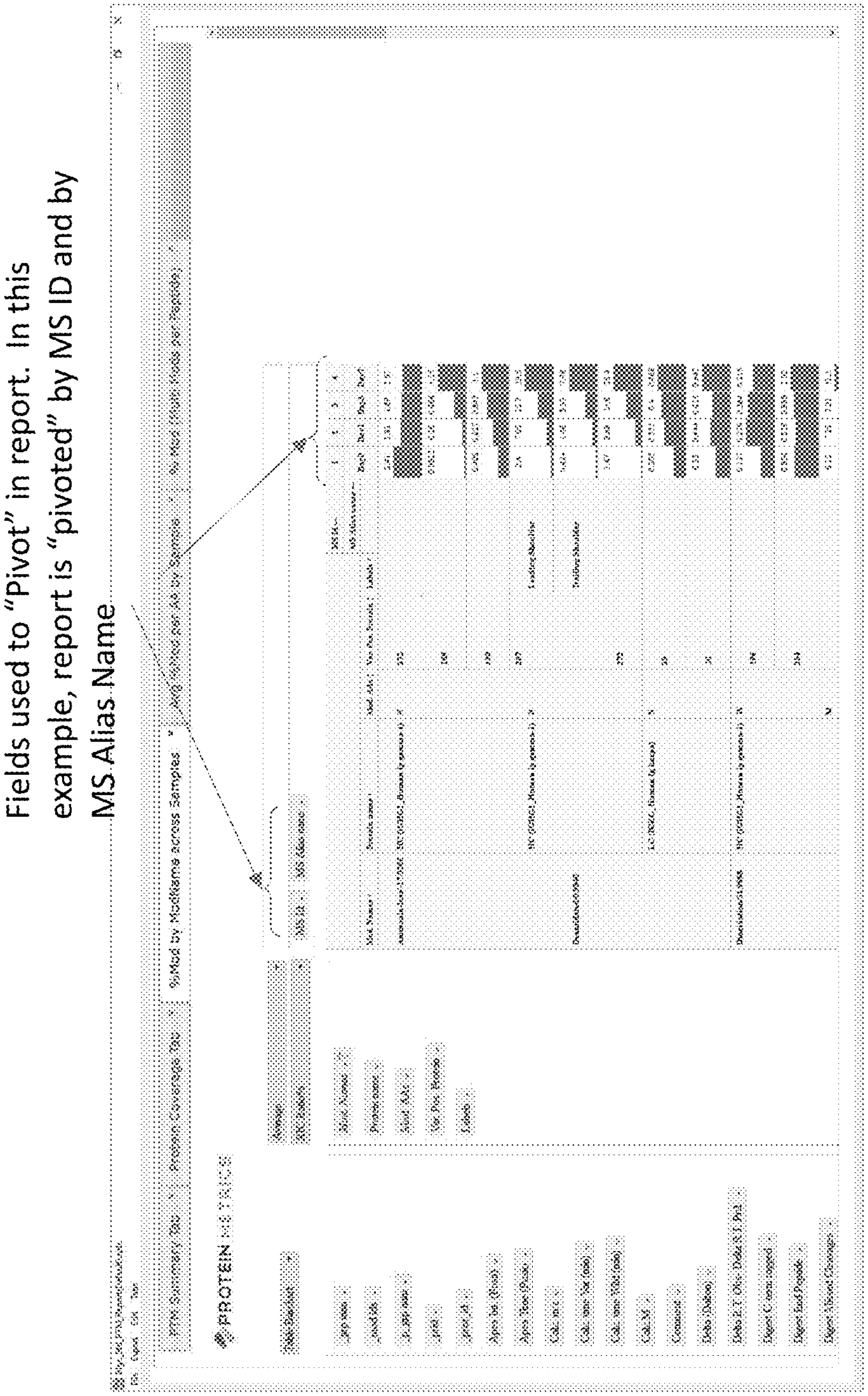
Figure 38G:
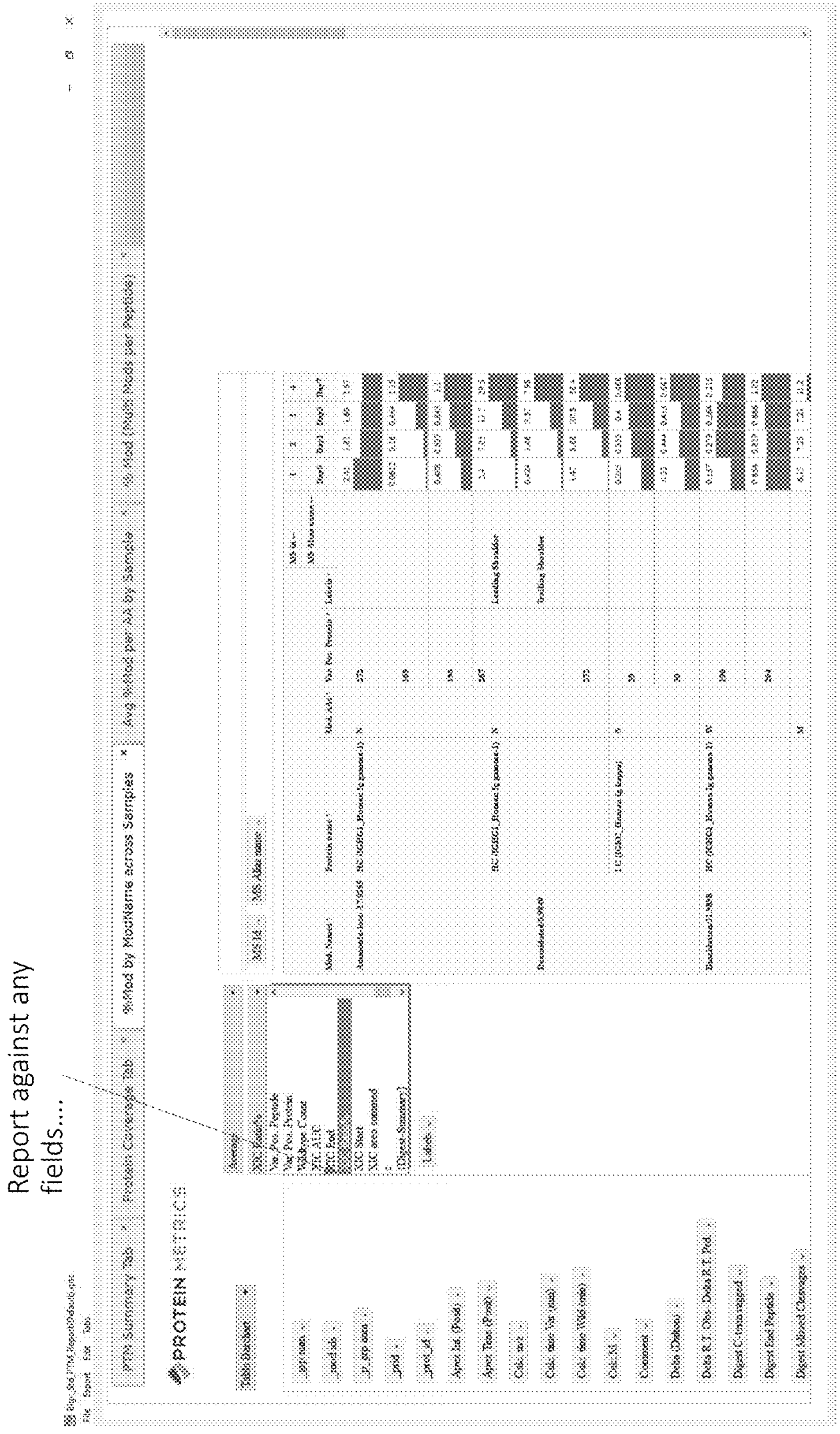
Figure 38H:
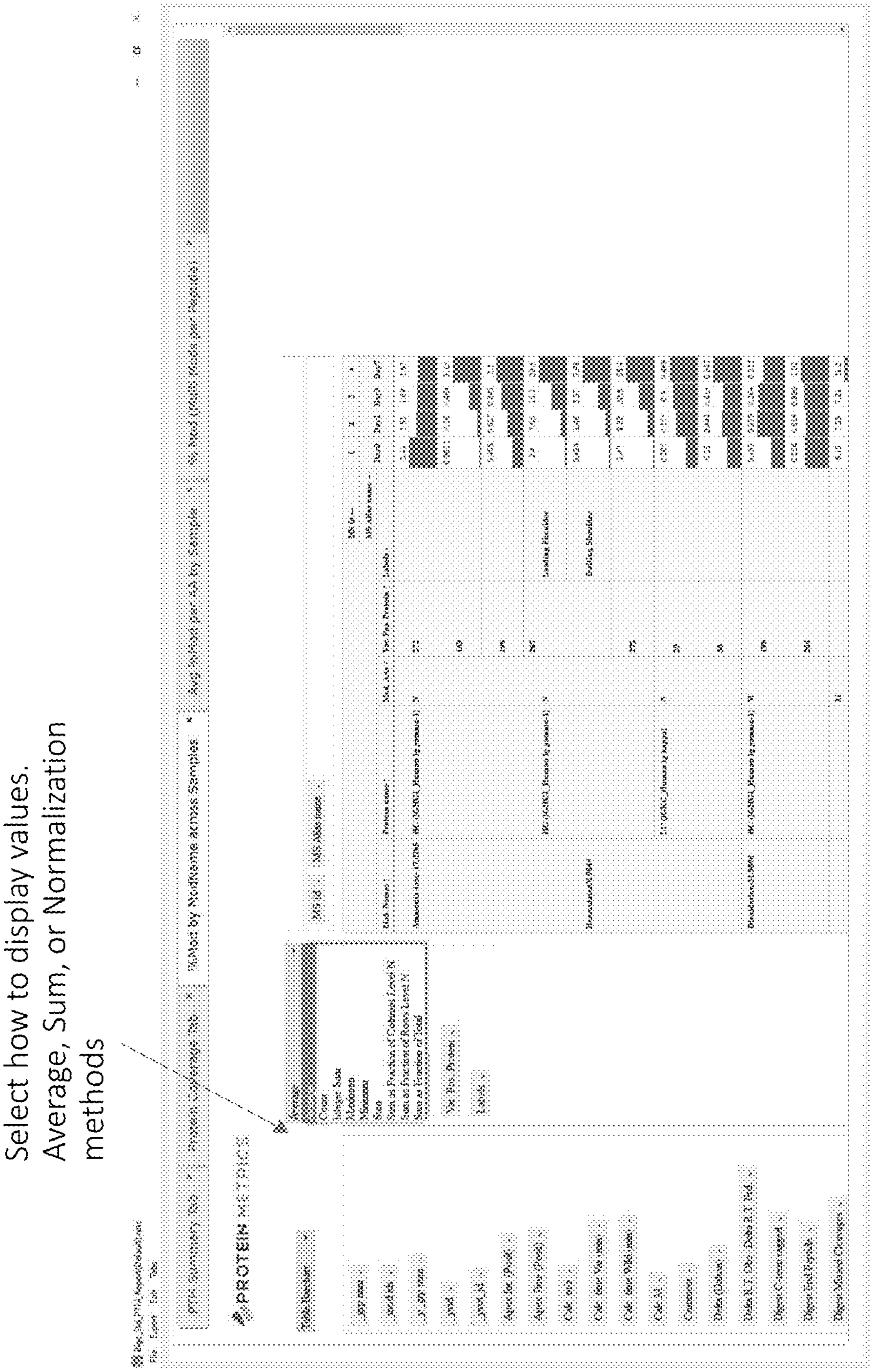
Figure 38I:
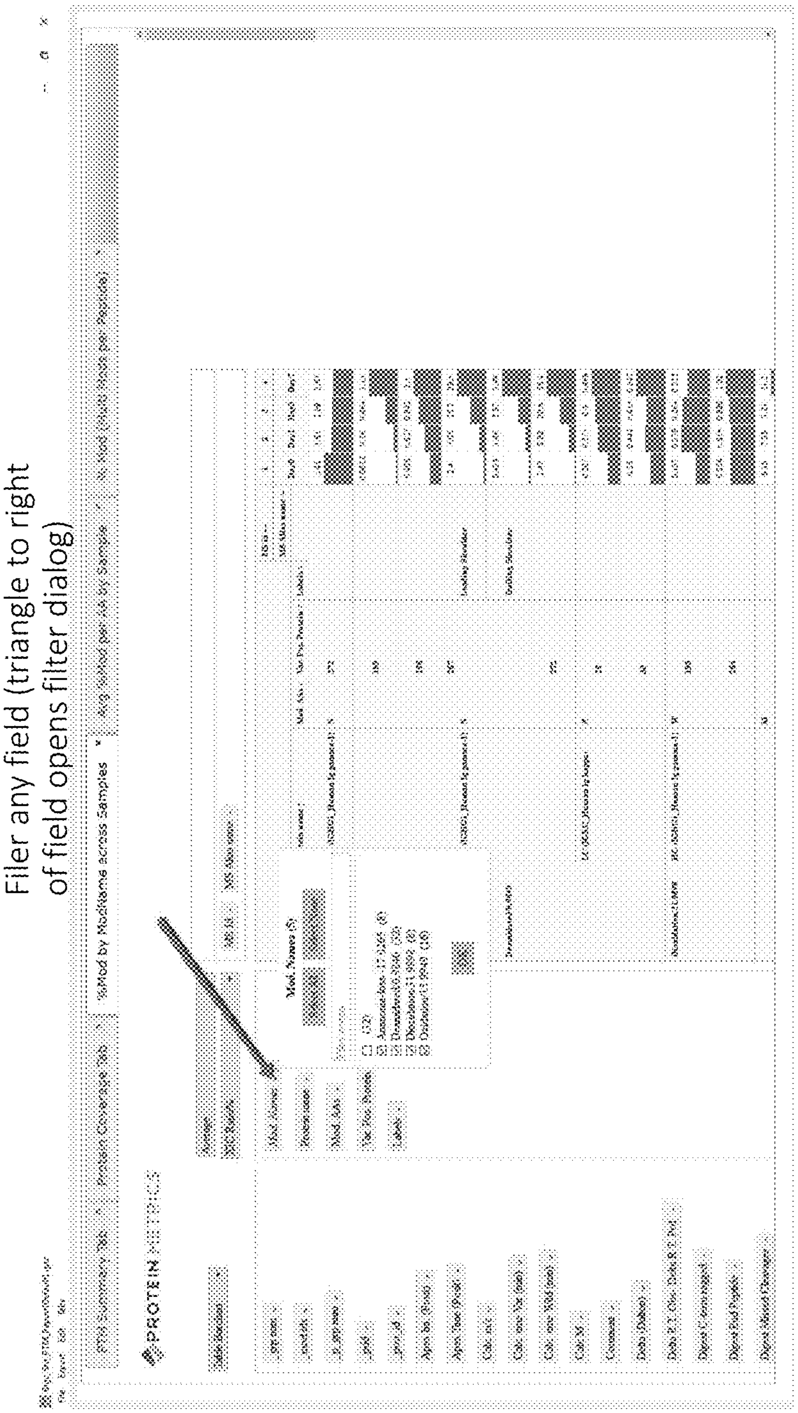
Figure 38J:
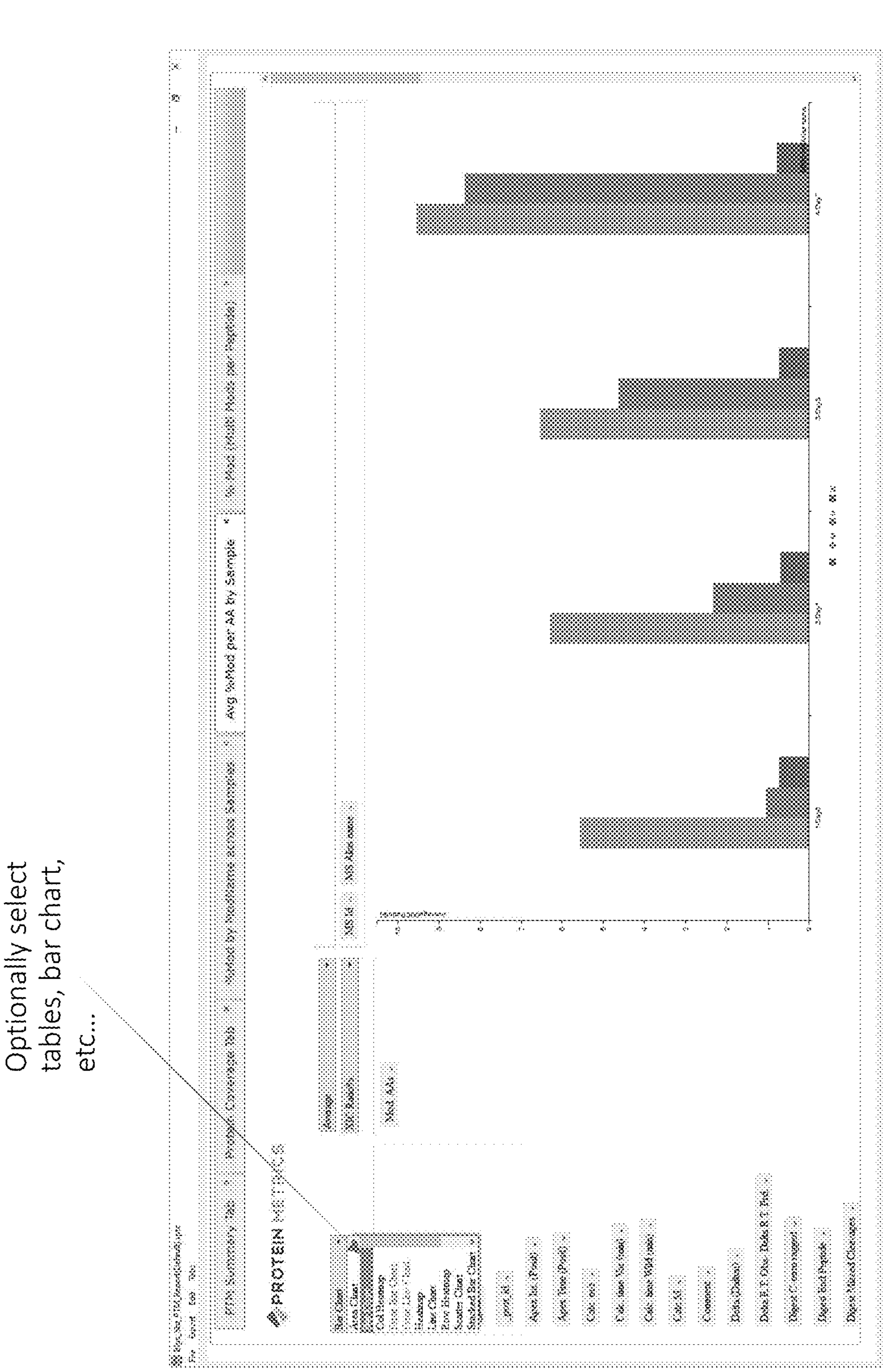
Figure 38K:
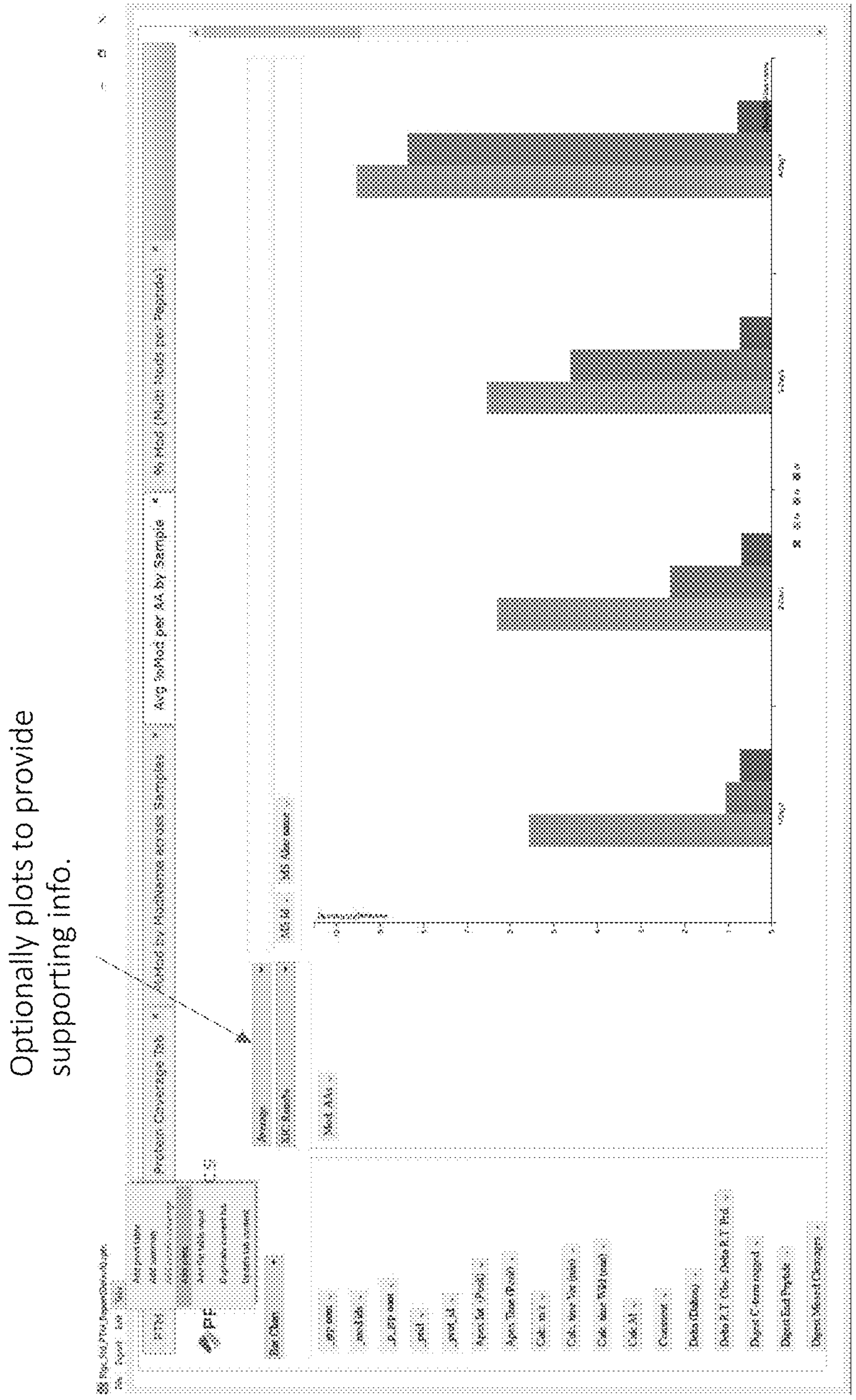
Figure 38L:
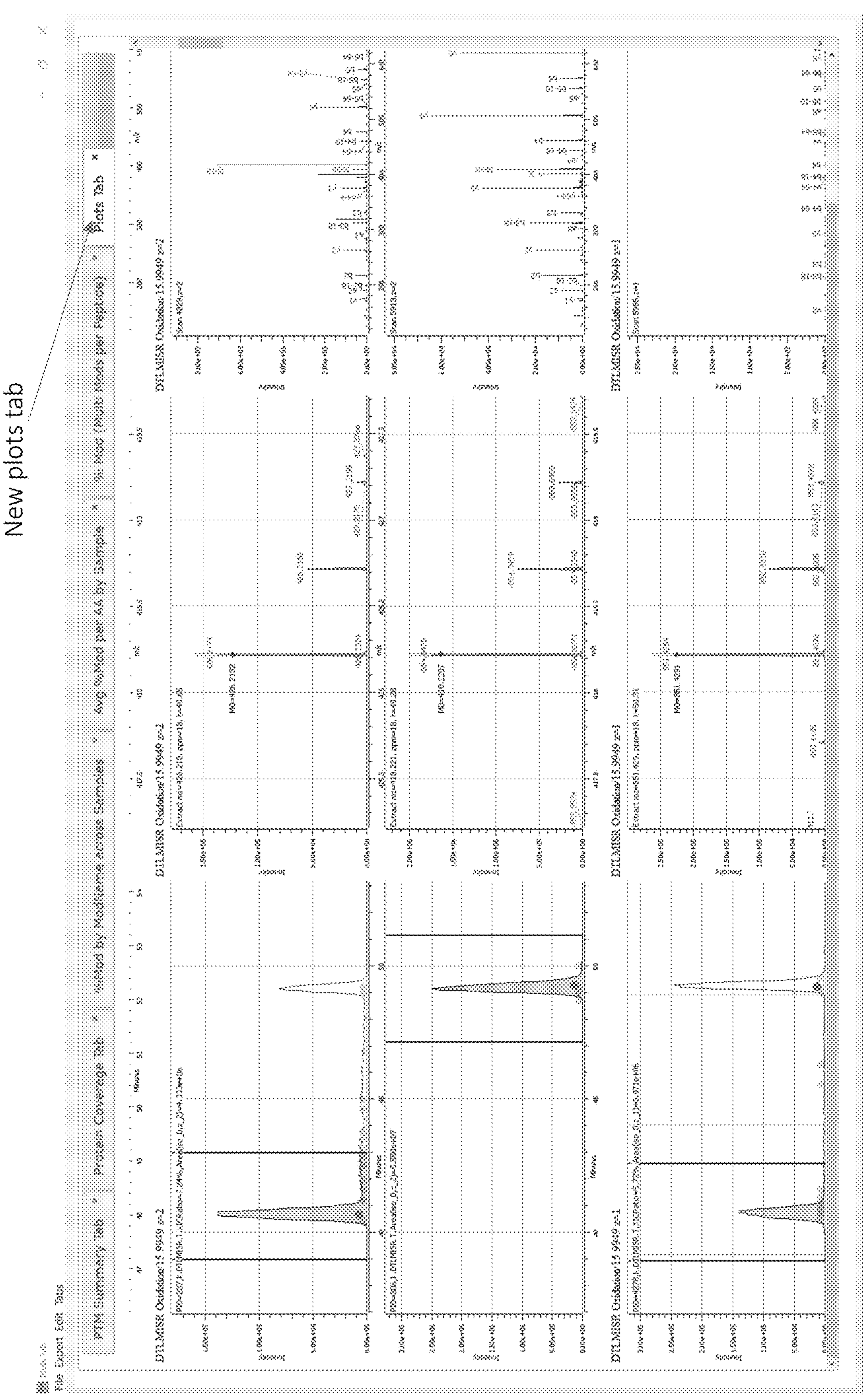
Figure 38M:
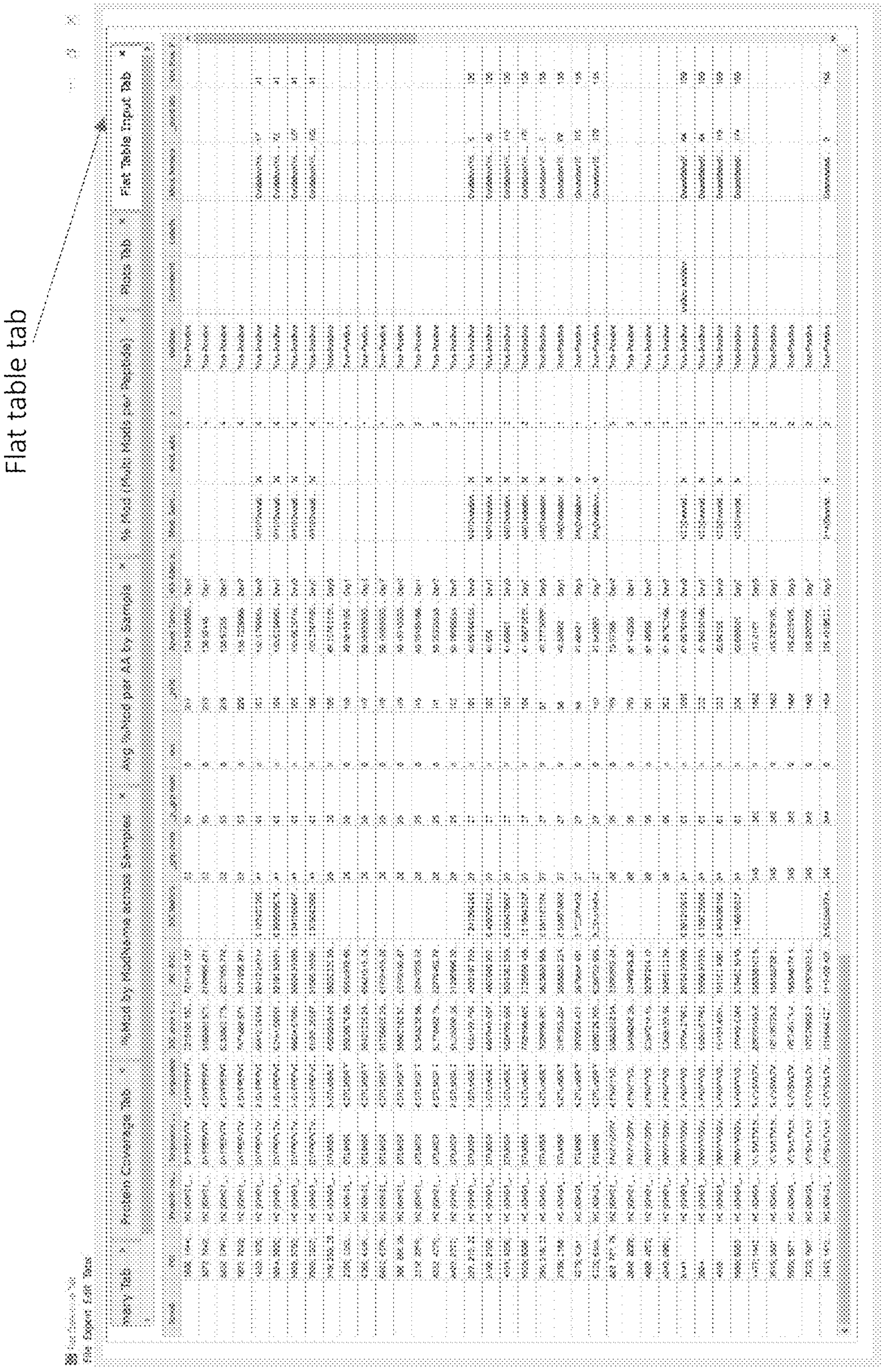
Figure 38N:
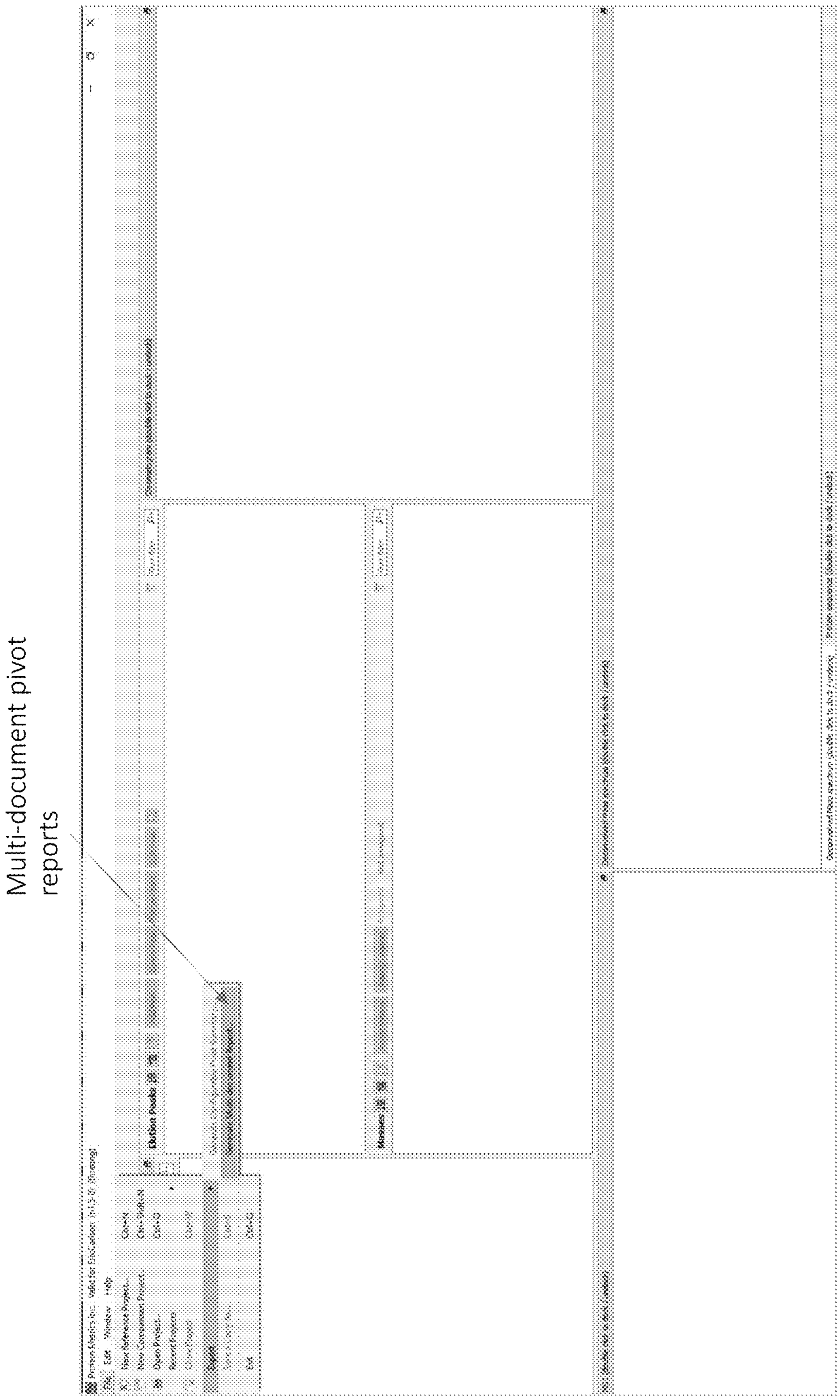
Figure 38O:
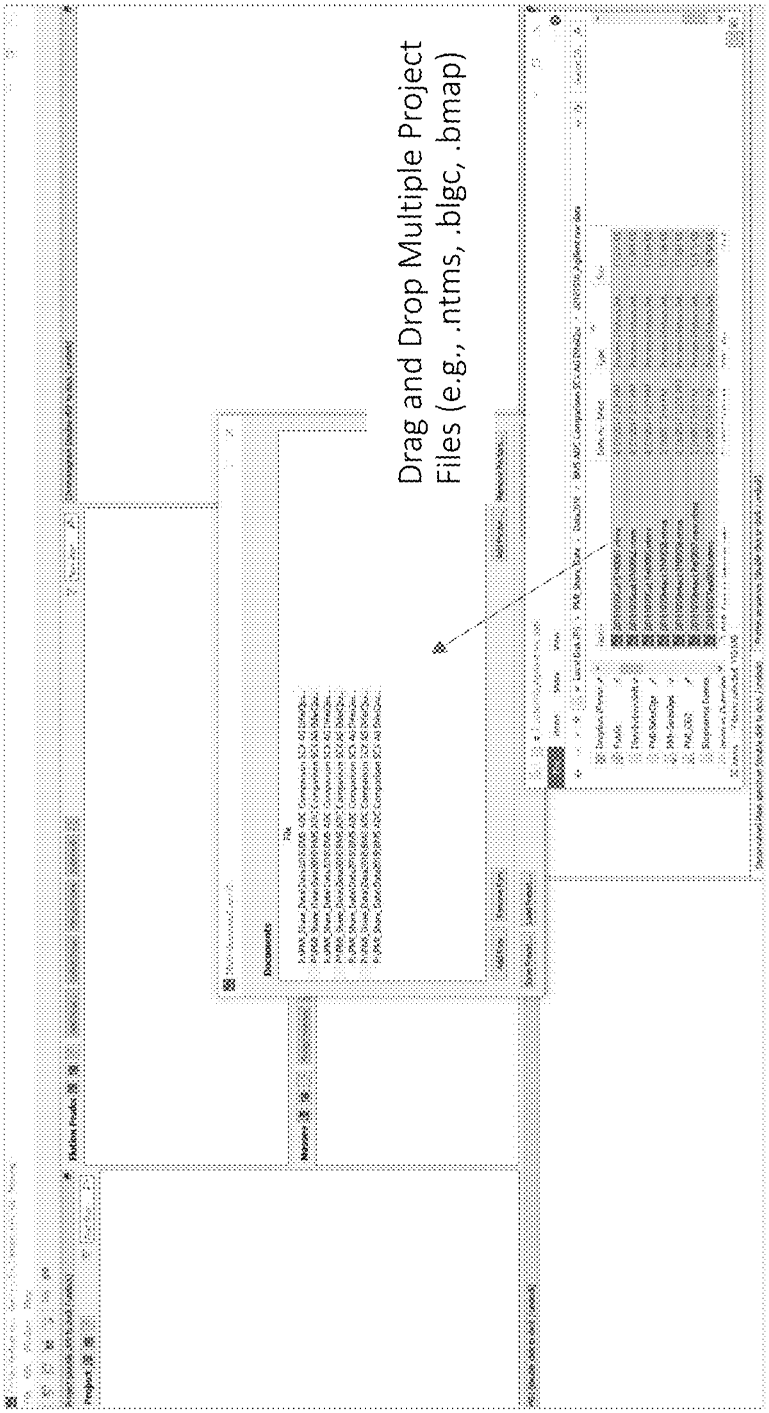
Figure 38P:
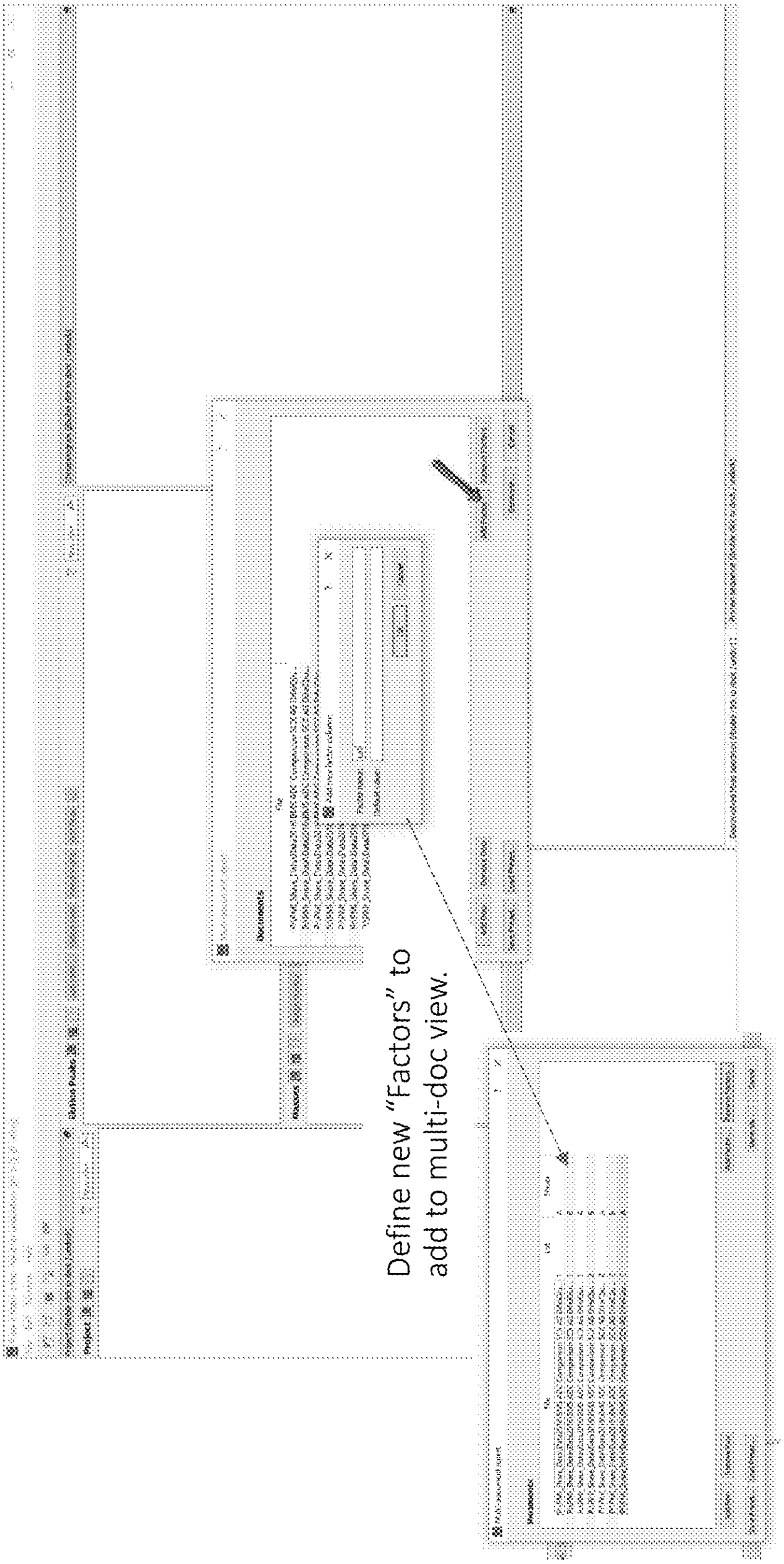

Referring to FIGS. 39B-39D, the report view component of the user interface can include one or more selectable tabs, which include one or more pivot tabs. In some embodiments, the tabs include default tabs, which can be generated automatically. For example, a summary tab, when selected, can be configured to display a description of the molecule of interest and mass spectrometry parameters, such as shown in FIG. 38B. In some cases, the summary tab (and/or other tabs) are customizable so as to display certain information, as shown in FIG. 31. Other default tabs can include: a coverage tab that, when selected, can be configured to display information related to the molecule of interest, such as shown in FIGS. 38C and 38D; a percent modification tab that, when selected, is configured to display information associated with modifications to the molecule of interest, such as shown in FIGS. 38E-381; and an average percent modification tab that, when selected, is configured to display the information associated with modifications averaged among multiple mass spectrometry data sets, such as shown in FIGS. 38J and 38K. According to some embodiments, the user may be able to create new pivot tabs that the user can us to generate a customized report, such as shown in FIGS. 38L and 38M. The names of any of the tabs may also be changed by the user.

Figure 38Q:
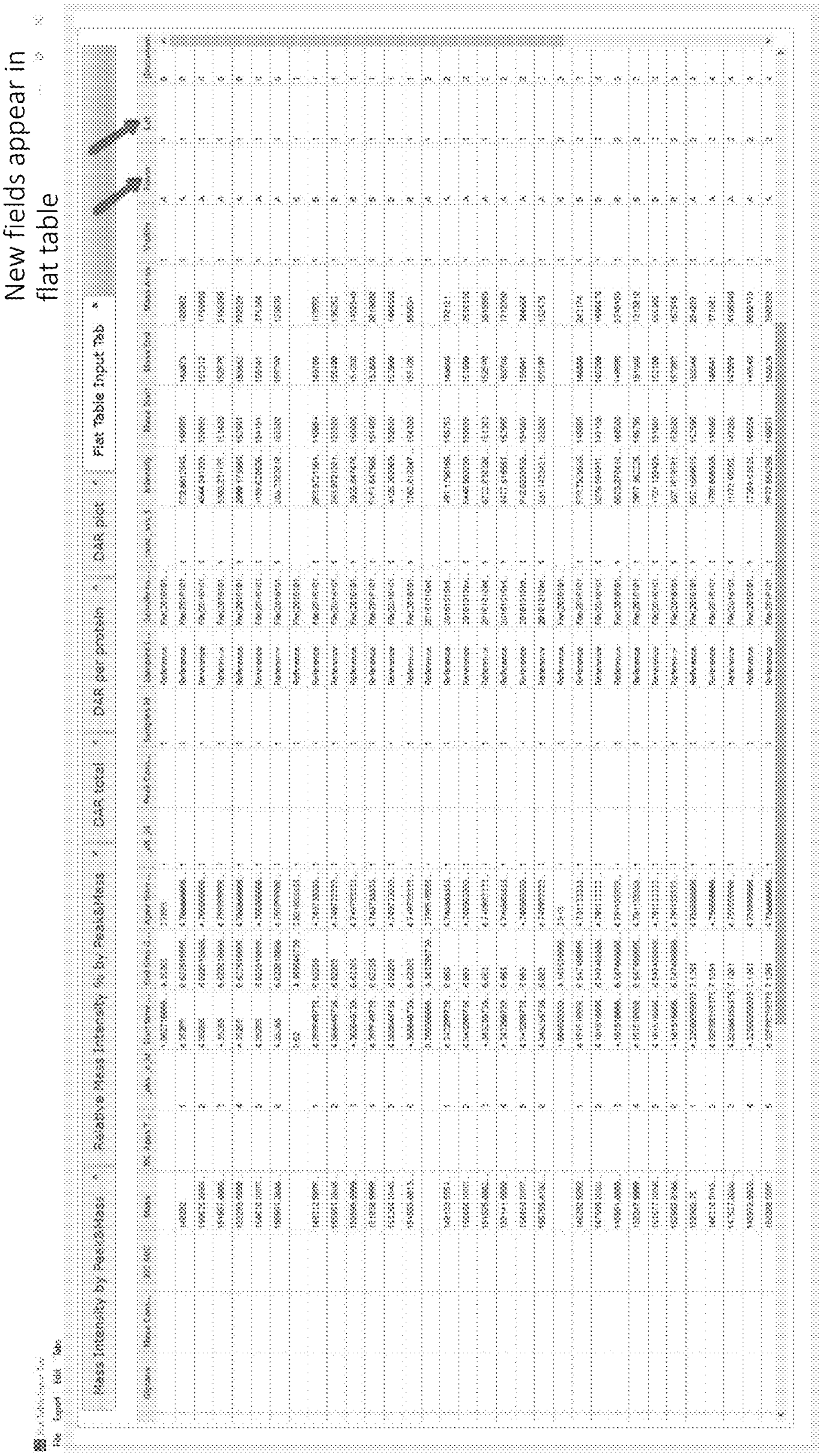
Figure 38R:
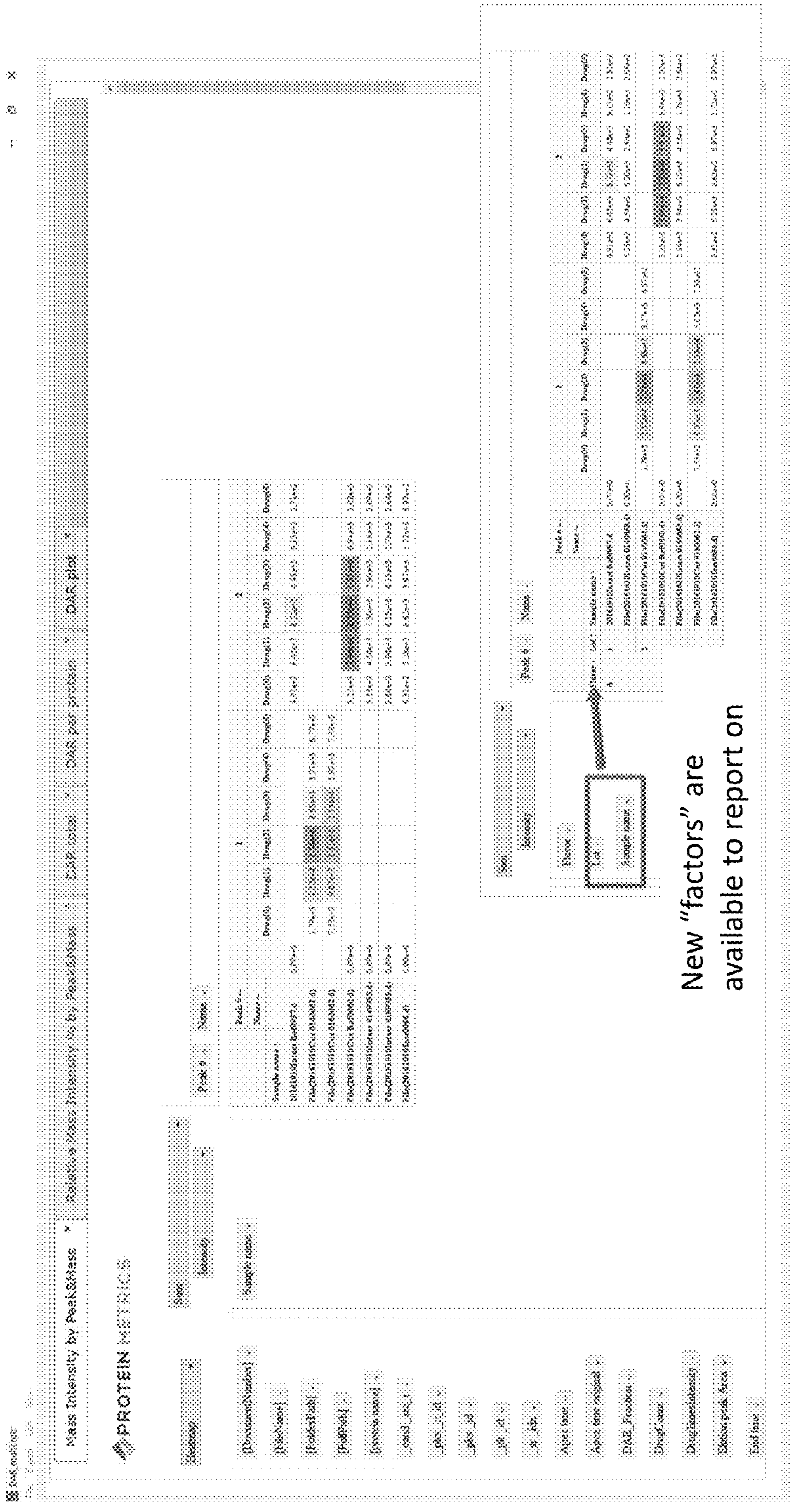

FIGS. 38N-38R illustrate an exemplary user interface process for generating one or more pivot reports from multiple projects. The multiple mass spectrometry data sets can be received as a single file or multiple files. In some cases, the multiple mass spectrometry data sets are concatenated into a single flat file. The table window and/or the spectrum window of the inspection view component may be populated with information from the concatenated data. The concatenated data can then be used to generate one or more pivot tables with one or more new fields indicating which project the data is associated with, such as shown in FIG. 38Q (e.g., new fields "flavor" and "lot"). With these new fields, the pivot tabs can be used to generate a unified report including data associated with all of the different projects, or a report including a subset of data associated with a subset of the different projects.

Figure 4:
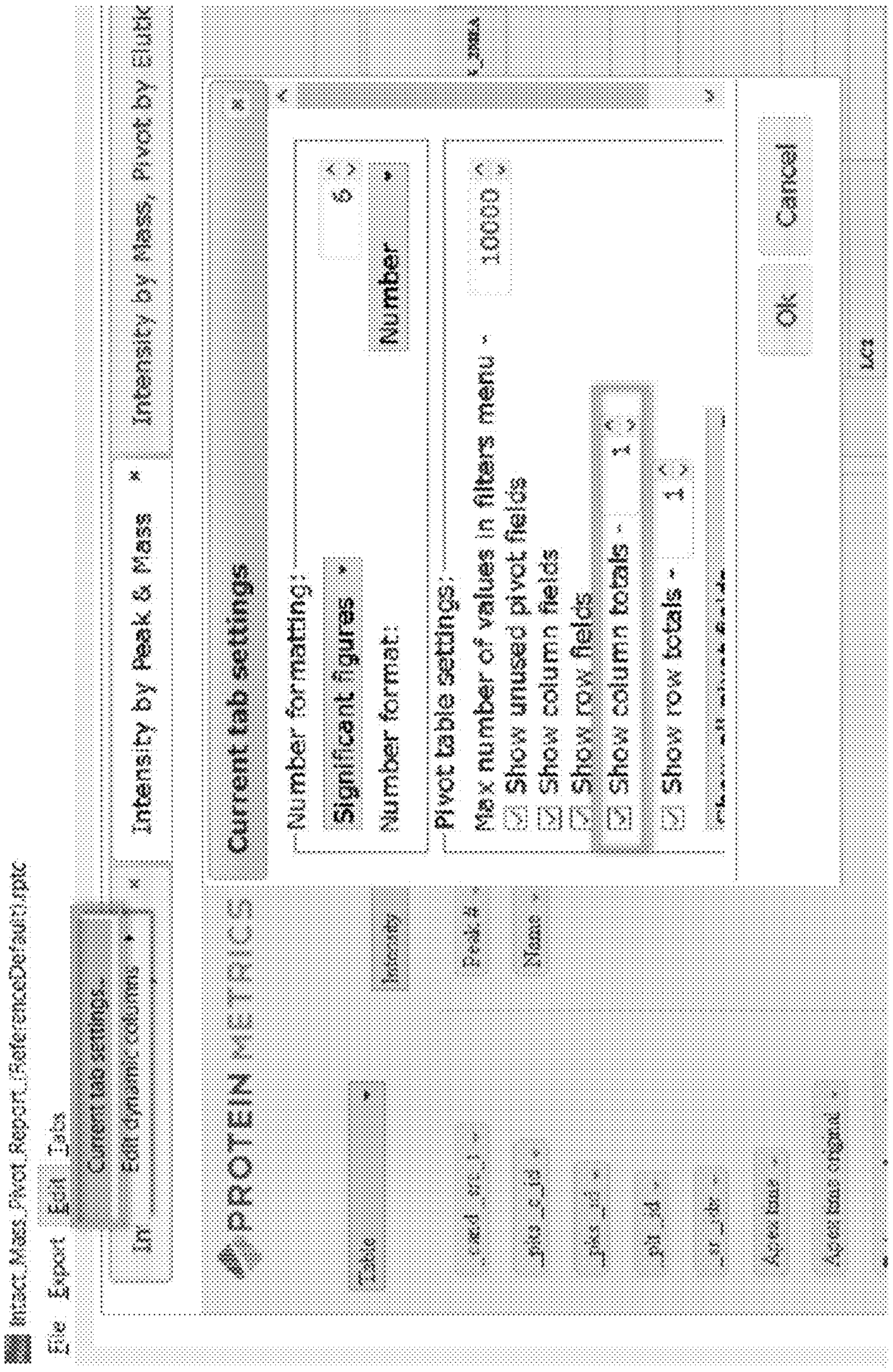
FIGS. 4 and 5 illustrate how a user can modify tab settings from the report view component of the user interface.
Figure 5:
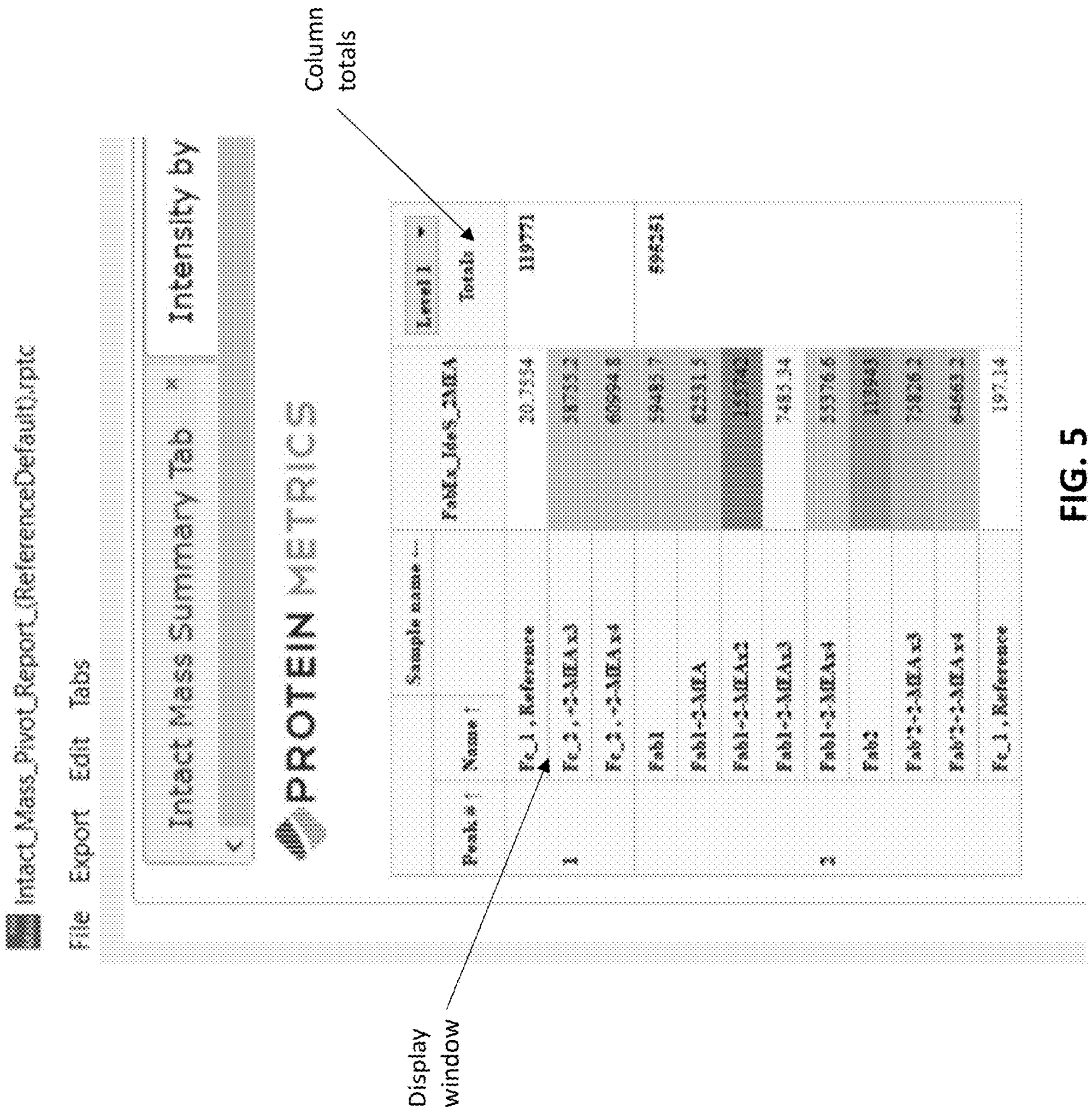
Figure 6:
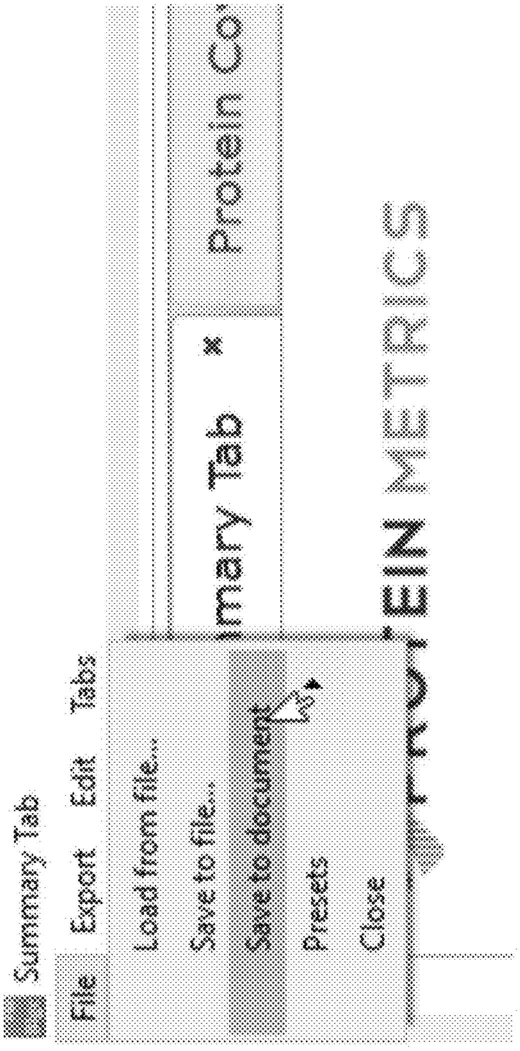
FIG. 6 illustrates how a user can save a current configuration from the report view component of the user interface.
Figure 7:
FIG. 7 illustrates how a user can choose to normalize results from the report view component of the user interface.

Modifications to any of the tabs may be saved by the user so that the user can access these modified configurations when generating new pivot reports (e.g., using other mass spectrometry data sets). For example, FIG. 4 shows how tab settings can be modified by accessing a current tab setting window as a drop down option in the report view configuration. Selectable tab settings may include choosing to show column totals, as well as other options. These setting will be reflected in the display window, as show in FIG. 5. FIG. 6 shows how a user can save a current configuration from the report view component. For example, a drop down menu may be accessible while in a selected tab, which give the user the option to save the current configuration into a document while the report view component is open. FIG. 7 shows how a user can choose to normalize results based on one or more of the existing values. For example, a drop down menu in the selected tab may provide options to "Normalize Column" over the default setting of "Sum of Fraction of Columns Level N".

At least some of the pivot tabs can include particular features so that the user can pick and choose which parameters are used to generate a report. For example, the selected pivot tabs in FIGS. 39B-39D include an active element window that can be configured to display a first subset of pivot functions, a display window that can be configured to display one or more of a report table (e.g., chart) and a report graph (e.g., bar graph or plot) based on the first subset of pivot functions, and a storage window that can be configured to display a second subset of pivot functions that is not displayed in the display window. The user may be able to control the data presented in the display window by moving (e.g., dragging and dropping) pivot functions between the active element window and the storage window. The user may also be able to choose how the values in the display window are displayed, such as show in FIG. 38H (e.g., by average, count, integer sum, maximum, minimum, sums, sums as a fraction of columns, sums as a fraction of rows, sums as a fraction of that total). The user may further be able to filter the first and/or second subset of pivot function by accessing a filter options window, as shown in FIG. 39C. In some embodiments, the filter options window is accessed by clicking (e.g., right clicking) one of the pivot functions. The filter options window can include a drop-down menu that lists data associated with the selected pivot function, and which the user can choose from. The filter options window is another way the user can further customize the table and/or graph displayed in the display window.

Figure 38S:
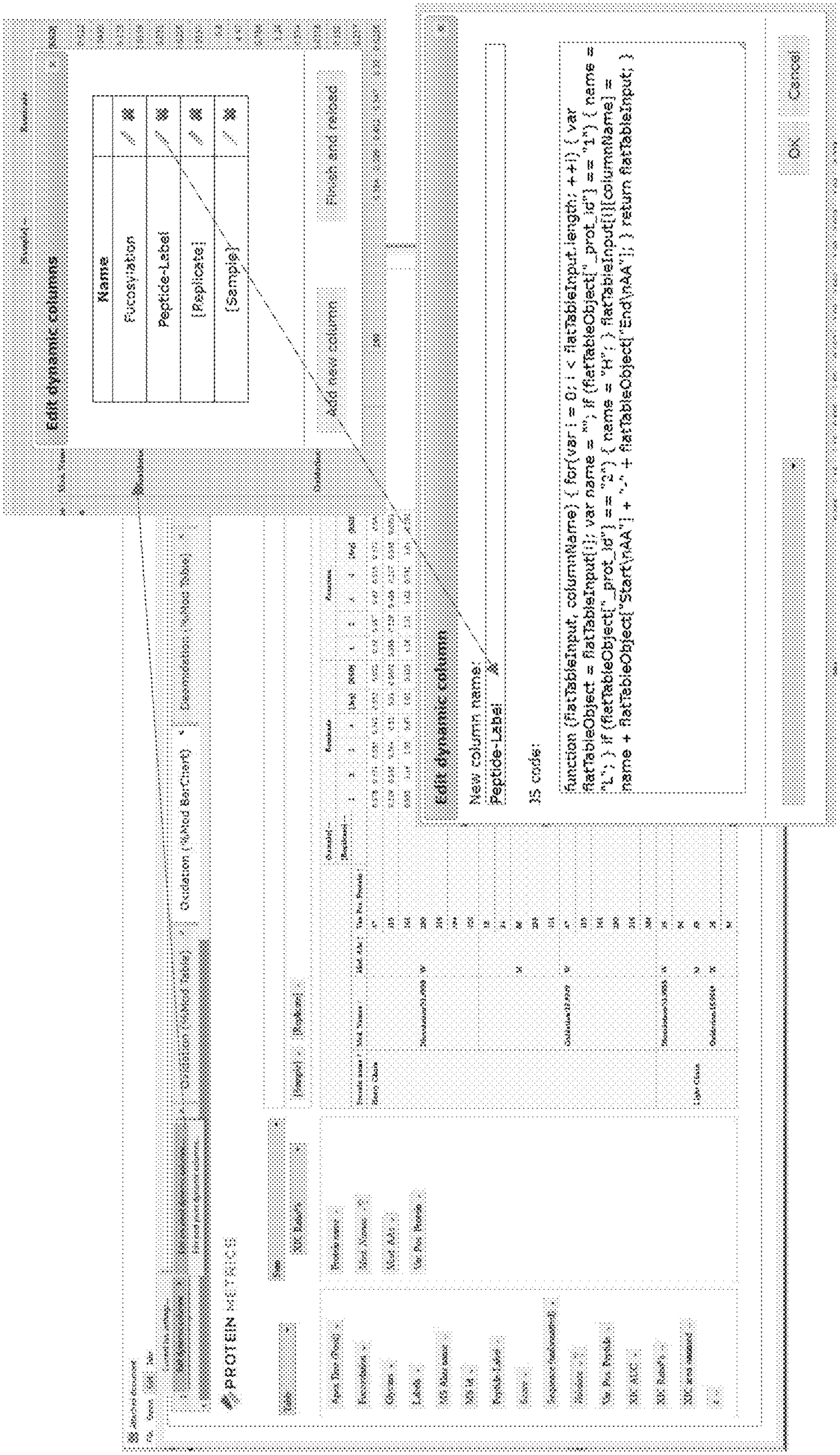
Figure 38T:
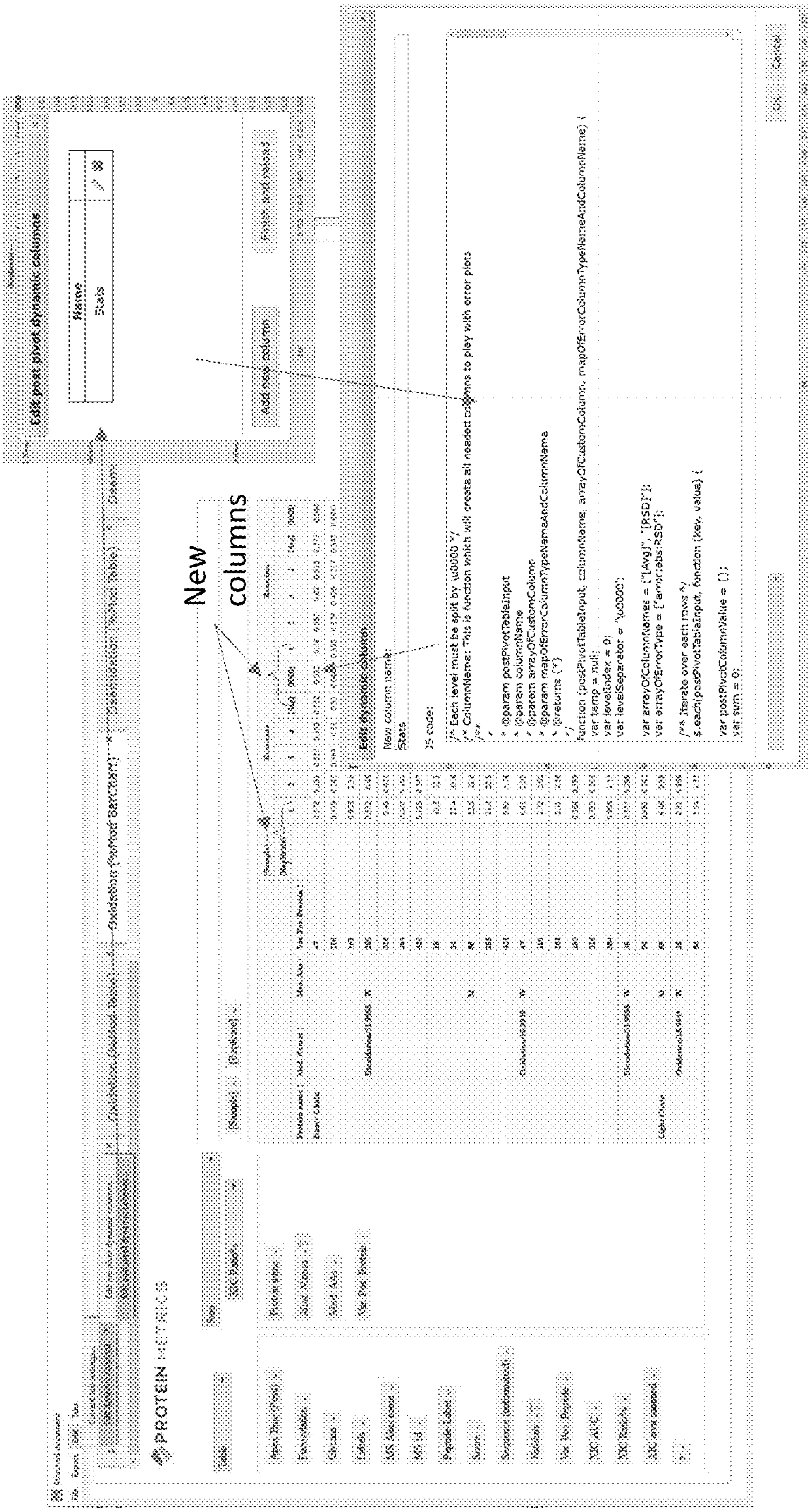
Figure 38U:
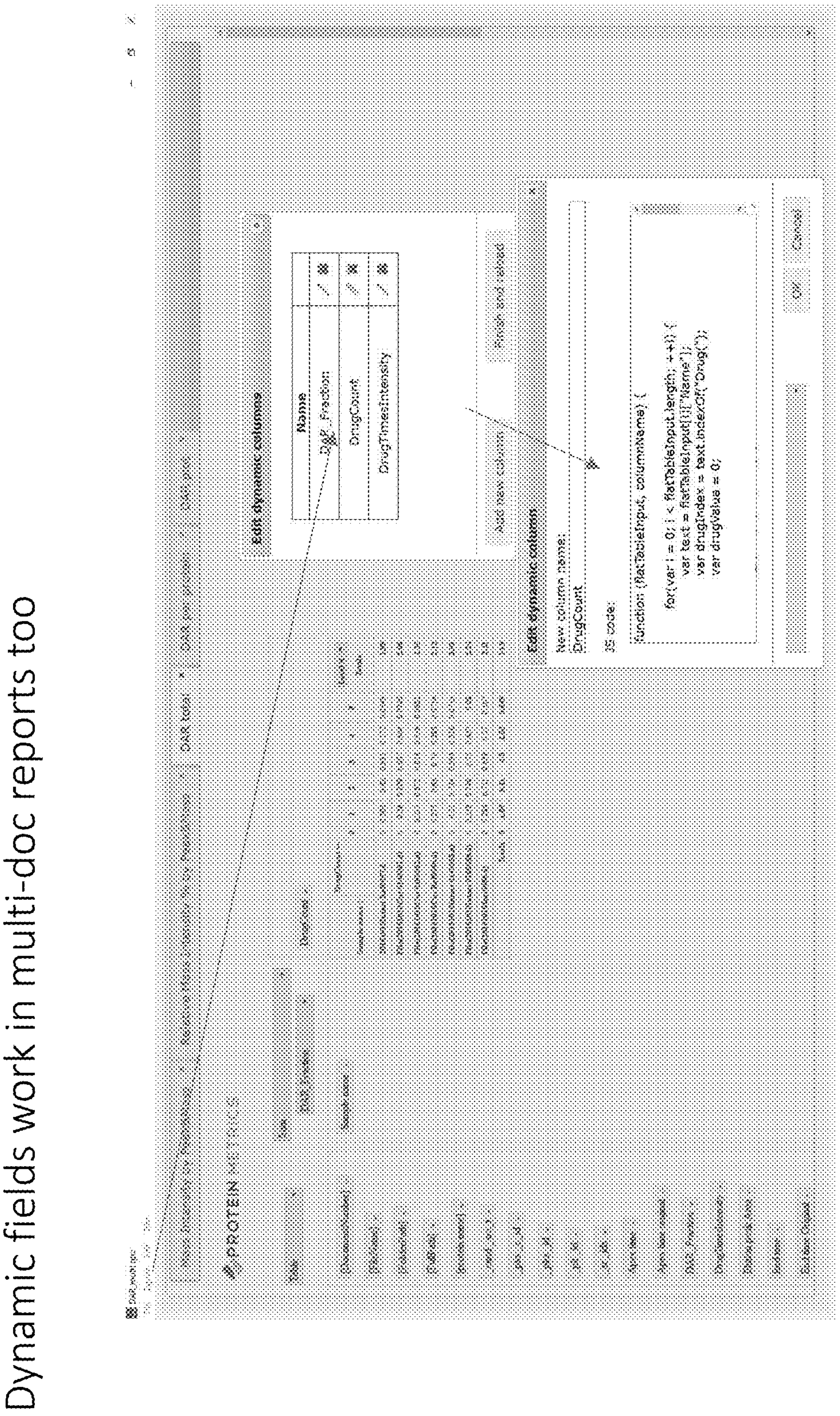

FIGS. 38S-38U show how various features in the pivot tabs can be dynamically used to create pivot reports. FIG. 38S shows how a drop down menu can provide pre-pivot modifications by accessing an Edit dynamic columns window, which enables the user to enter code (e.g., JavaScript) with customized calculations. These can provide pre-pivot dynamic columns in, for example, a flat table. FIG. 38T shows a drop down menu can provide post-pivot modifications by accessing an Edit post pivot dynamic columns window, which enables the user to enter code (e.g., JavaScript) with customized calculations. This post-pivot modification can create new columns in the display window of the pivot tab (e.g., new columns for average and relative standard deviation). FIG. 38U shows how the dynamic field editing can also be used with multi-document reports. For example, the Edit dynamic columns window can also be accessed from the Edit menu, similar to single document reports.

Figure 9:
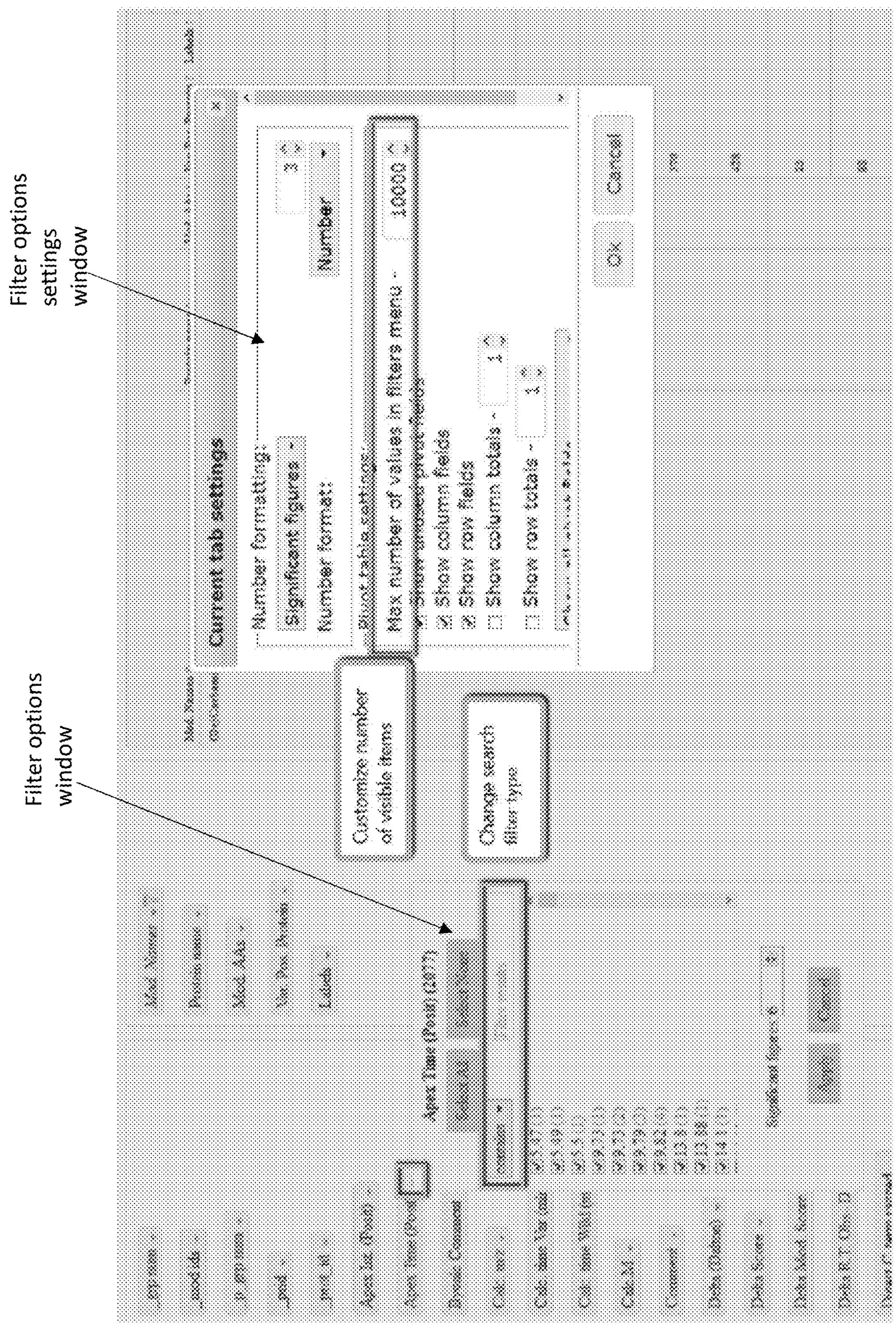
FIG. 9 illustrates how a user can modify filter options from the report view component of the user interface.
Figure 10:
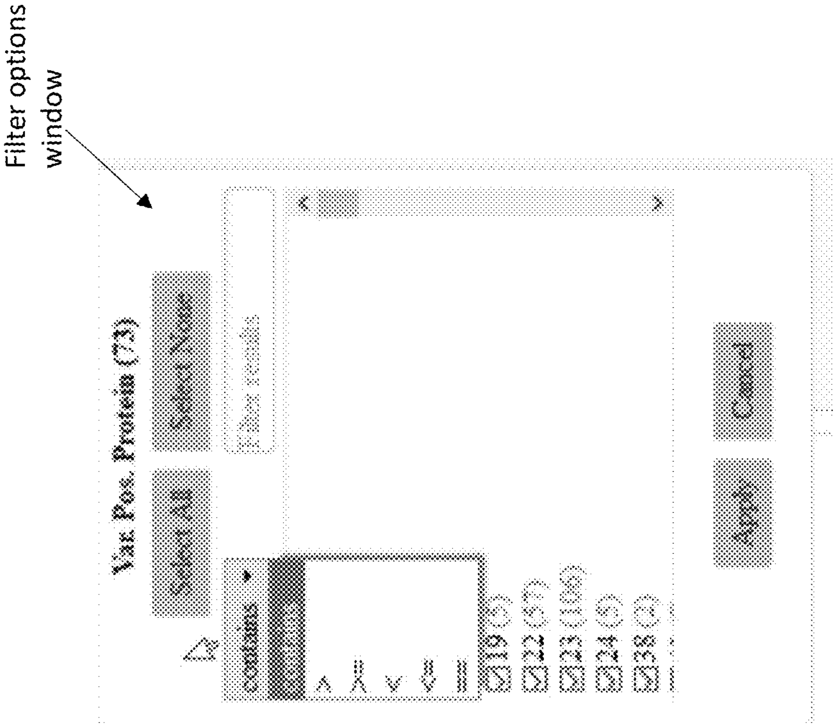
FIG. 10 illustrates how a user can filter values for reporting using numeric operands from the report view component of the user interface.

FIGS. 9, 10 and 381 show other examples of filter options windows. FIG. 9 shows an example of how a filter options window can be modified by accessing a filter options settings window, which can include a setting for adjusting the maximum number of values in the filter options window. In some embodiments, the filter options window is able to provide selections of more than 200 unique values. FIG. 10 shows an example filter options window that includes options for filtering of values using numeric operands (e.g., >, >=, <, <=, ==).

Returning to FIG. 39C, in some embodiments, the pivot functions that are filtered are distinguishable from pivot functions that are not filtered. For example, the filtered pivot functions may be indicated with a different font (e.g., italicized) compared to the unfiltered pivot functions (e.g., non-italicized). In some cases, the pivot functions selected in the active element window are saved (e.g., as an updated first subset of pivot functions associated with the selected pivot tab).

Figure 3:
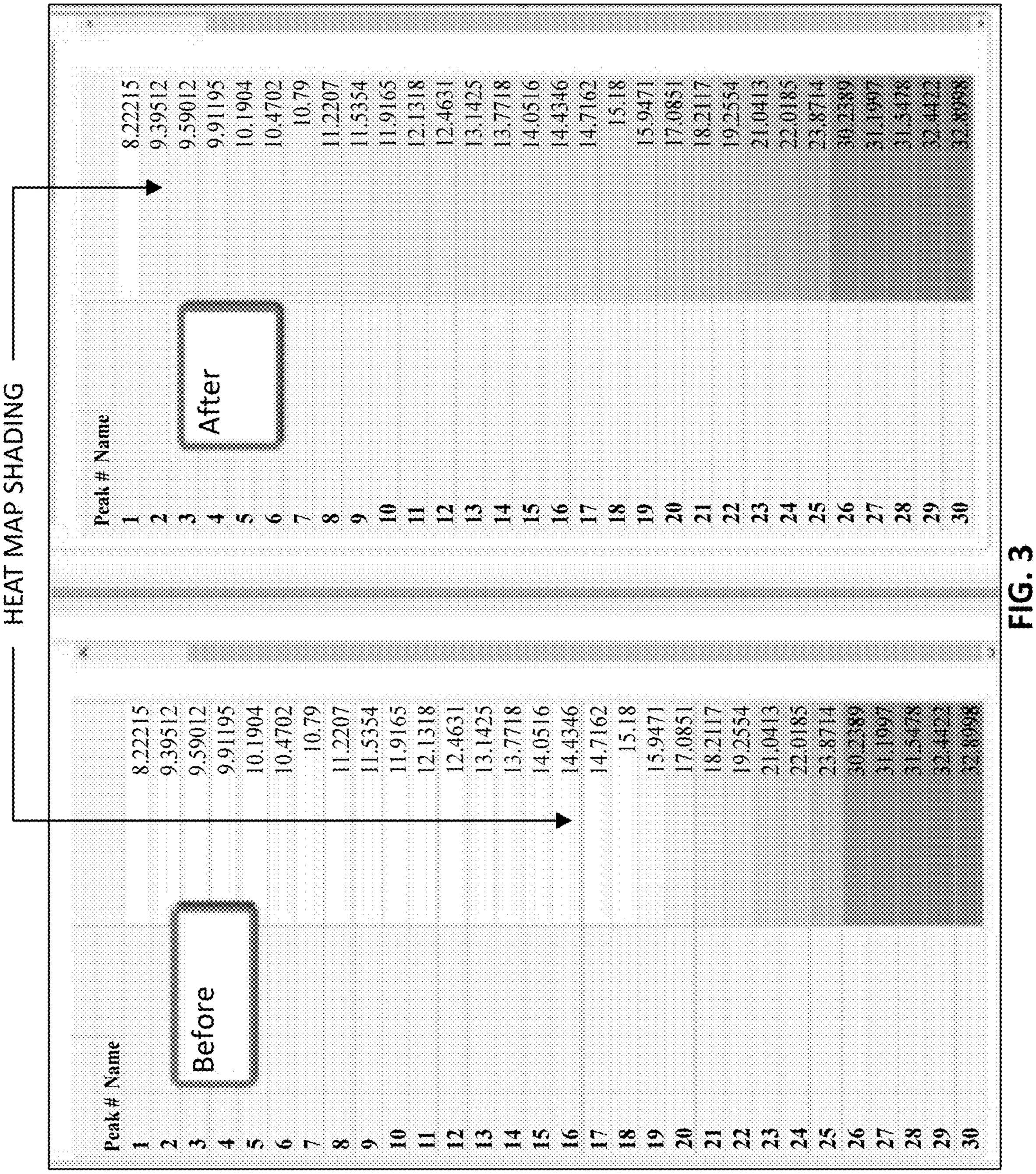
FIG. 3 illustrates a pivot report with charts having heat map shading.

The user may be able to choose the format in which the pivot functions selected in the active element window are displayed in the display window and in a report. For example, the user may choose to display one or more bar graphs (e.g., single or stacked bar graphs), one or more peak plots, one or more line graphs and/or one or more tables (e.g., charts) as described herein. In some embodiments, the tables can include heat map shading indicating, for example, the relative magnitudes of values in the table. To illustrate, FIG. 3 shows an exemplary report in a pivot tab with charts indicating data before and after an assay test. The before and after charts have a column of cells with values having lesser magnitude with lighter shaded cells and values having greater magnitude with darker shaded cells, and cells having values of intermediate magnitude shaded with varying shades therebetween. This type of heat map shading can help the user quickly identify patterns within the data. In some cases, the cells of a chart are provided in continuous (e.g., gradual) gradation of shades. In some cases, the various shadings are in one or more colors.

Figure 8:
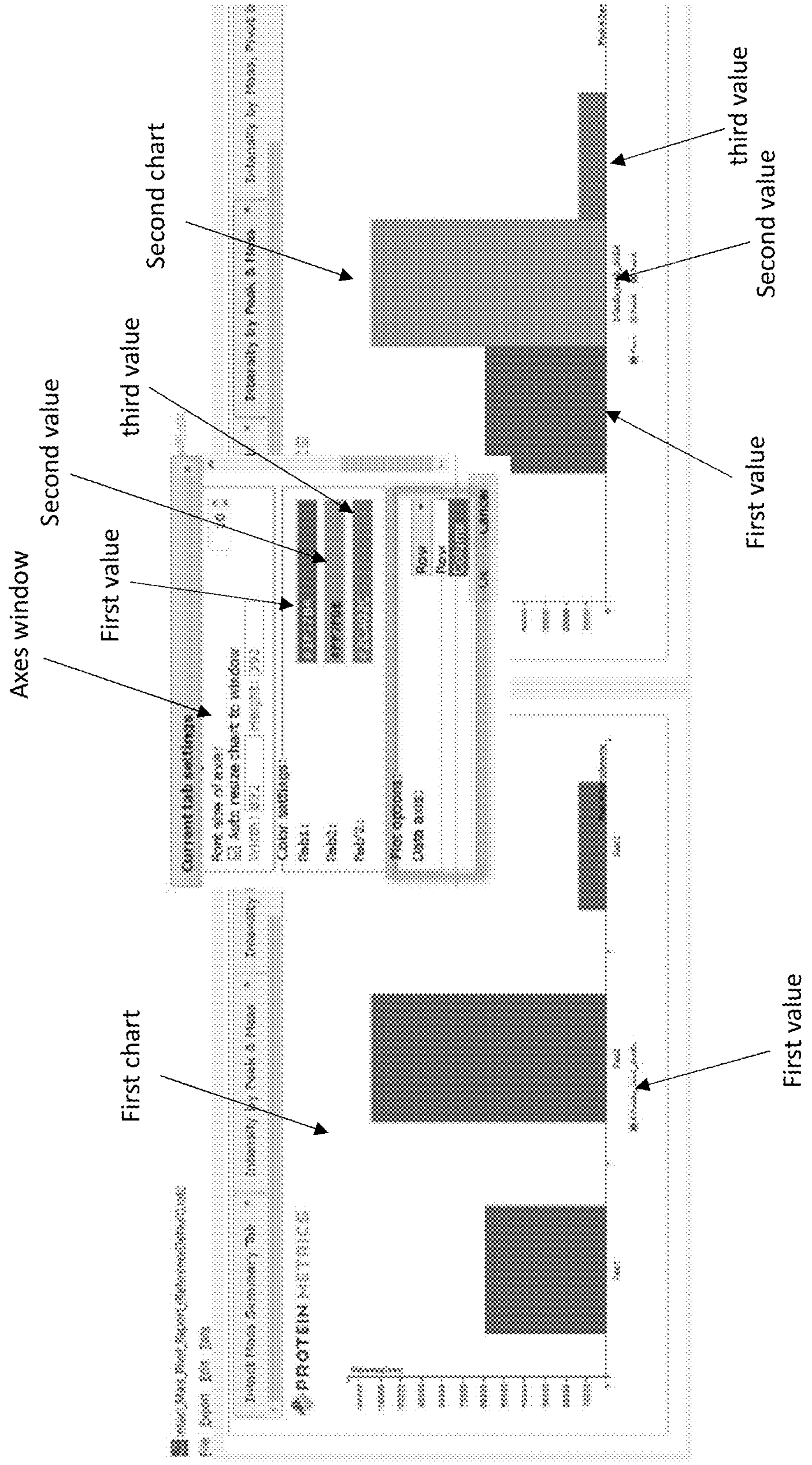
FIG. 8 illustrates how a user can manipulate the format of the report from the report view component of the user interface.

The user may be able to manipulate the format of the report, such as modifying the X and Y axes of a graph. To illustrate, FIG. 8 shows an exemplary report in a pivot tab indicating how X and Y of a chart can be modified. As shown, an axes window can be accessed by the user to change settings associated with X and Y axes of a bar chart. The axes window can be used, for example, to create a first chart including a first value along the X axes and a second chart indicating a first, second and third value along the X axes. The axes window can be also used to switch X and Y axes, as well as modify the size (e.g., width and height) of the charts.

Figure 35:
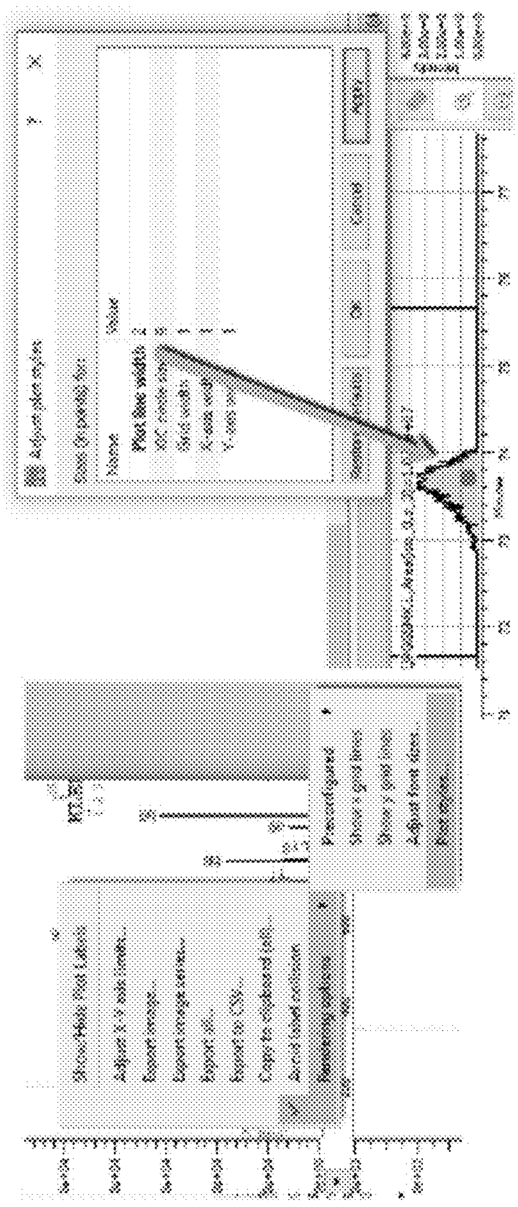
FIG. 35 illustrates how plot styles can be modified from the report view component.

The user may be able to manipulate plot style within a pivot tab. To illustrate, FIG. 35 shows an exemplary report in a pivot tab indicating how a plot style can be modified via a plot style adjustment window. The example of FIG. 35 shows how the line width of a peak can be increased or decreased. Other changeable plot style settings can include a circle indicator size, grid width, x-axis width and y-axis width. The peaks may also be labeled. These features may be used to highlight peaks associated with a molecule of interest. For example, a protein alias (e.g., labeled "HC" or "LC") may be specified during a project creation. The protein alias can then be used to, for example, render labels in a chromatogram plot.

The pivot tab(s) can be configured to dynamically display the selected information in the inspection view component. For example, one or more of the pivot tabs can dynamically reflect modifications that user made to the table of values and/or the graph with the mass-to-charge ratio peaks in the inspection view component (e.g., without having to close the inspection view component and/or the report view component). This may allow the user to quickly determine how selected data in the inspection view component effects the report view component. In this way, the user can quickly generate customized reports (e.g., pivot tables and/or graphs). In some cases, the user is able to switch (e.g., toggle) between the inspection view component and the report view based on user input with each modification. For example, the user may be able to access the report view component from the inspection view component (e.g., via report command button) and vice versa. In some embodiments, the inspection view component and the report view component are displayed in different windows such that the user can view them simultaneously.

According to some embodiments, the apparatus is configured to accept multiple mass spectrometry data sets from multiple mass spectrometry samples (also referred to as projects). The multiple projects may include data associated with the same molecule of interest or different molecules of interest. The ability to accept multiple projects may be useful, for example, for evaluating quality assurance of a product. For example, the multiple projects may be associated with different temperatures, days and/or lots, which may or may not result in different chemical characteristics of the samples. The apparatus and methods described herein may be used to help determine whether these sorts of factors are significant.

Figure 16:
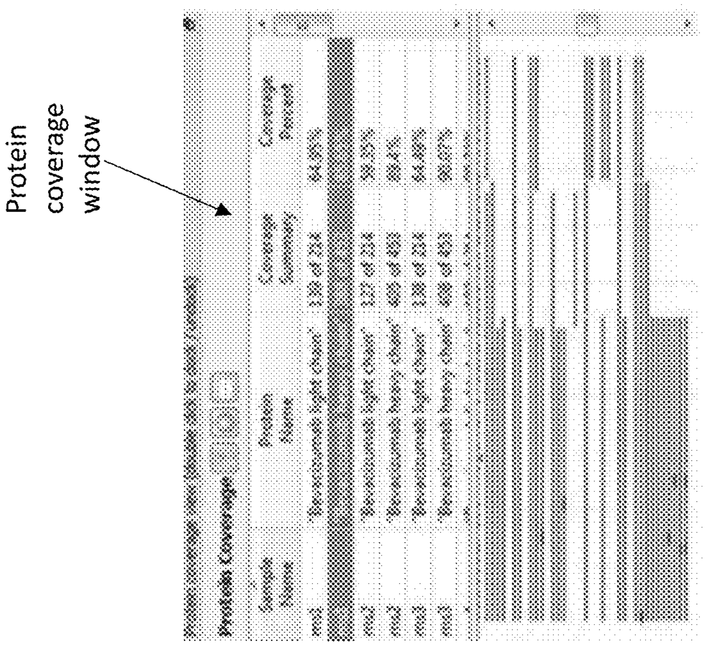
FIG. 16 illustrates a protein coverage window accessed by a user from a report view component of the user interface.

In some embodiments, the report view component has feature that allow a user the ability to calculate protein coverage per sample. For example FIG. 16 shows a protein coverage window accessed by a user, which includes a table indicating protein coverage per sample. This feature can be used to calculate the protein coverage per sample and create new parameters to display these values in tabular format. The user may also be able to export the protein coverage per sample on a per file basis or in a chain.

Figure 17:
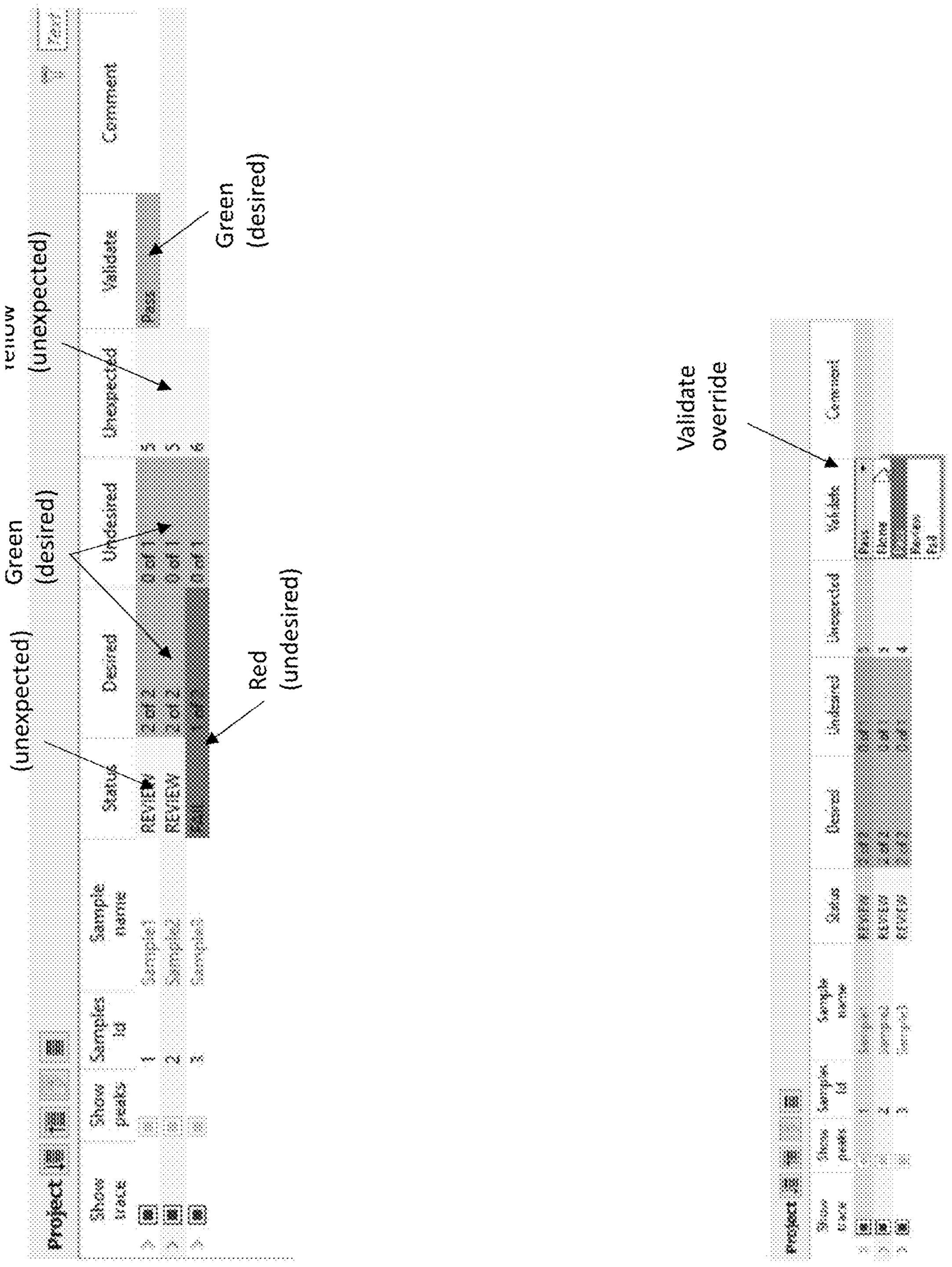
FIG. 17 illustrates how a report can be presented in a traffic light format from the report view component of the user interface.

FIG. 17 shows an example of how data can be presented in a traffic light format. In this example, the traffic light format show cells in a chart with various colors: red, green and yellow, where red indicates an undesired value, green indicates a desired value and yellow indicates an unexpected value. In one example, cells (e.g., columns) with all desired masses can be indicated with green (pass), and cells (e.g., columns) where one or more desired masses are not found can be indicated with red (fail). In another example, cells (e.g., columns) with no undesired masses can be indicated with green (pass), and all other cells (e.g., columns) can be indicated with red (fail). In another example, cells (e.g., columns) with no undesired masses can be indicated with green (pass), and cells (e.g., columns) having one or more unexpected masses can be indicated with "review". In another example, a first column of cells can be indicated with green (pass) status if all masses in that column (e.g., three) are green (pass), a second column of cells can be indicated with a "review" status if any of the masses in that column marked as "review", and a third column of cells can be indicated with red (fail) status if any of the masses in that column are red (fail). In some cases, a "validate" column can be used to override any automatic "status" column.

Figure 18:
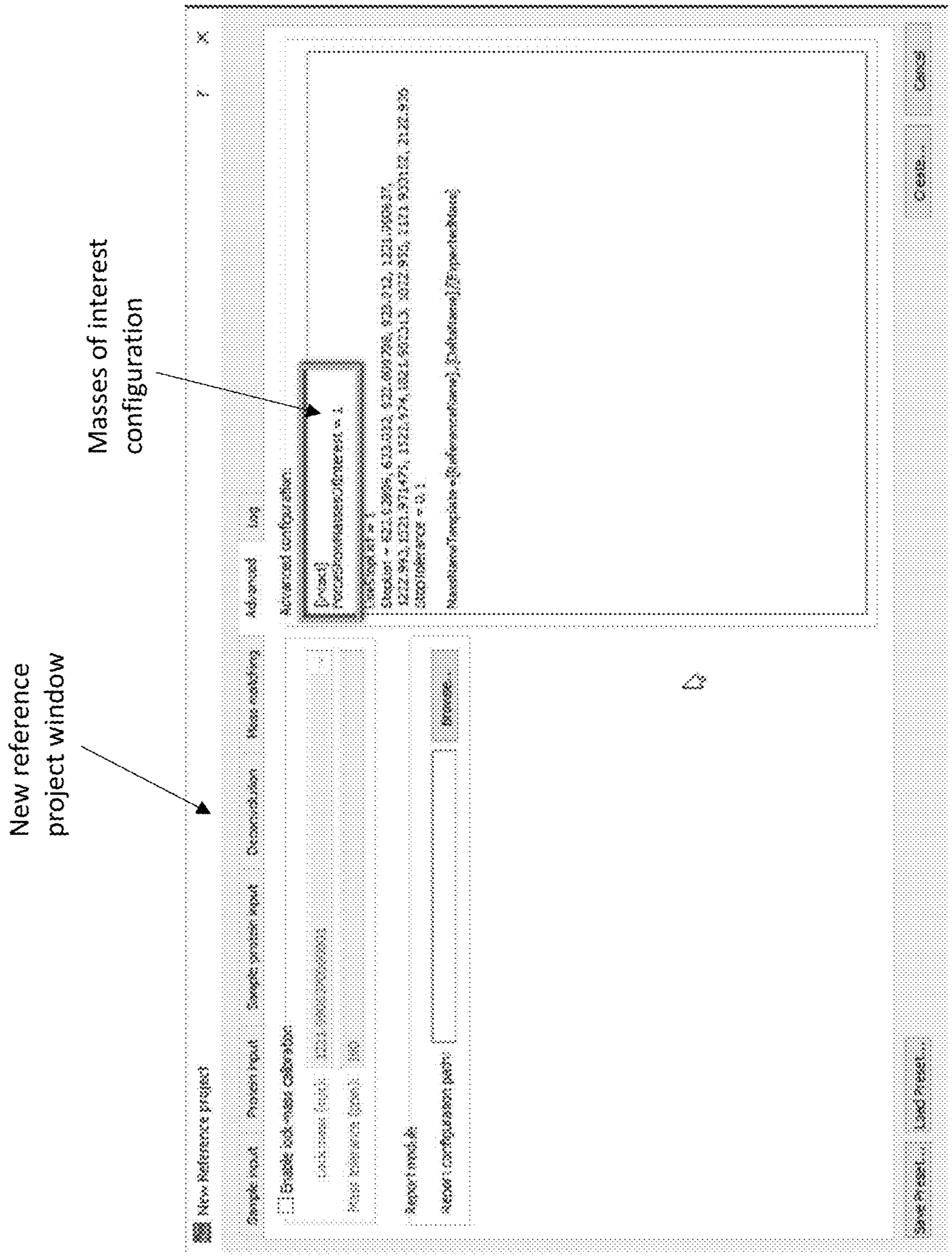
FIGS. 18 and 19 illustrate how a user can choose automatic assignment of reference masses from the report view component of the user interface.
Figure 19:
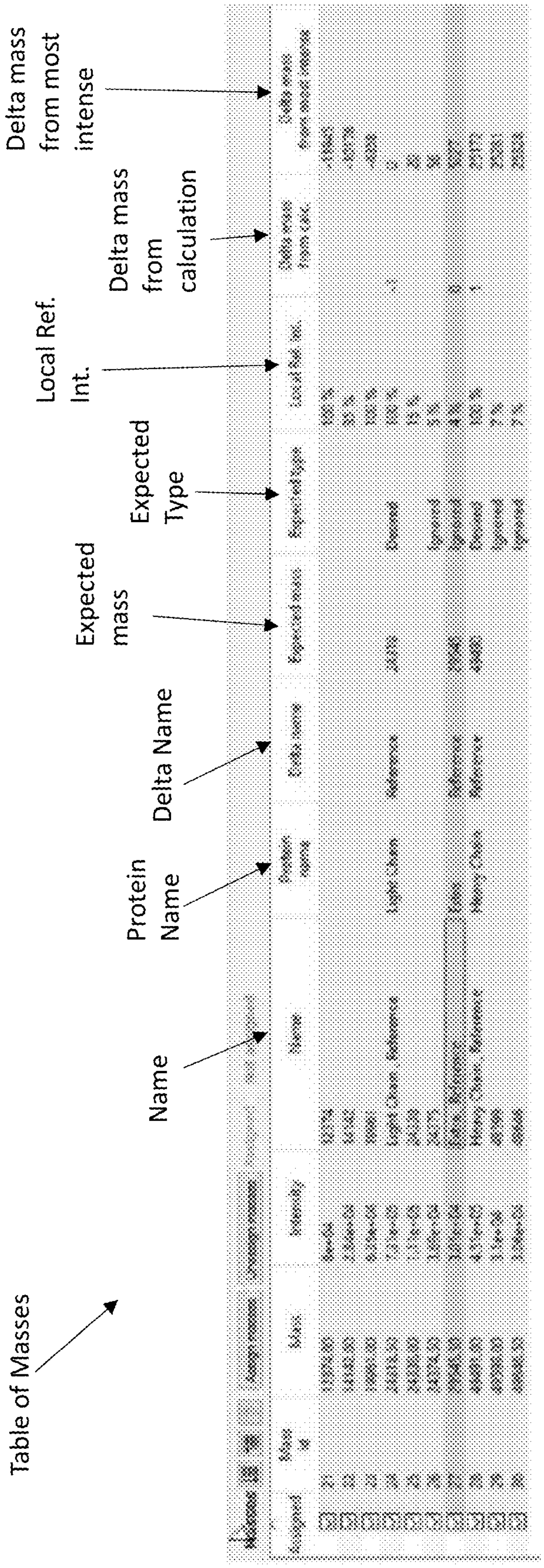

FIGS. 18 and 19 show an example of how a user can choose automatic assignment of reference masses. In FIG. 18, a new reference project is opened by the user from the report view component of the user interface, where the user choses the configuration of the masses of interest. FIG. 19 shows an example table of masses after the configuration for the masses of interest is chosen. The Name column can list the names of matching reference mass names and delta mass names. In cases where no match is found, the mass value will default to the rounded mass value configurable, for example, via a MassNameTemplate variable in an Advanced Configuration tab. The Protein Name column can list matching reference mass names. The Delta Name column can list matching delta mass names. The Expected Mass column can list the combined mass value. The Local Rel. Int. column can list the local relative intensity relative to neighboring masses, defined by a "Window for local base peak" option of the user interface. The Expected Type column can list the matching reference type (desired or undesired). If the local relative intensity is below the "minimum % of local base peak", it can be marked as "ignored". Otherwise, it can be marked as "unexpected". The Delta mass from calculation and Delta mass from most intense can be derived from the data.

Figure 20:
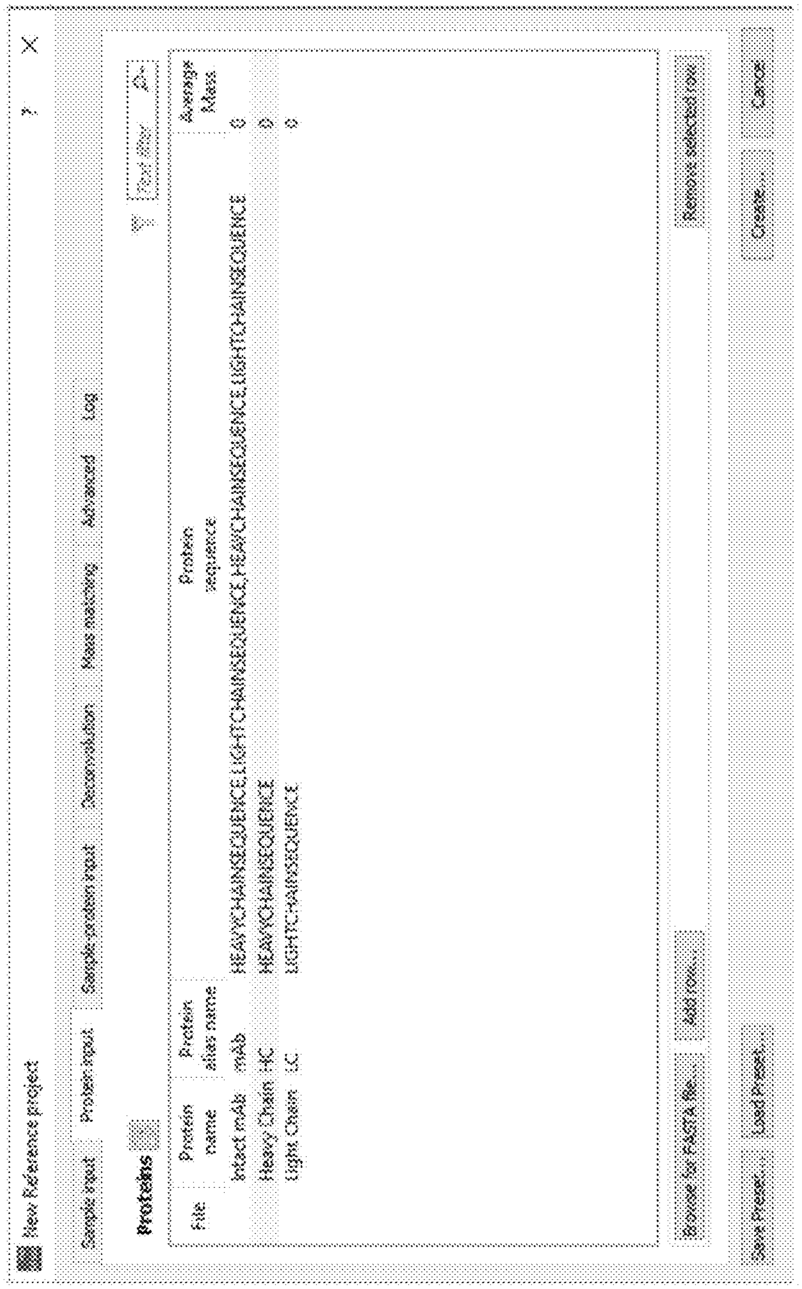
FIG. 20 illustrates how a user can calculate an average protein mass from the report view component of the user interface.

FIG. 20 shows an example of how a user can calculate an average protein mass from a sequence. The Protein input tab can list the proteins within a project, with a column indicating "Average Mass." If the value within this column is blank or 0, but the protein sequence column is filled, the average mass will be automatically calculated. The following rules may apply by default (but can be changed): (1) if the N-terminal residue is Q, it becomes proGlu, (2) if the C-terminal residue is K, it is clipped off, (3) all possible cysteine pairs are formed (as disulfide bonds). If there is an odd number of cysteines, the odd one out is left alone (not modified), and (4) atomic weights can be configured. Items (1), (2), and (4) default values can be changed by entering new values into the Advanced Configuration box (Advanced tab in project creation dialog). Item (3) is configured on a per-protein basis and is described below. Default settings for items (1), (20, and (4) are: [AtomicWeight]C=12.01079, H=1.007968, N=14.00669, 0=15.99937, S=32.06390; [ProteinAverageMassCalculation] PyroGiuNTermQ=1, ClipOffGermK=1. Combining chains for oligomers, and customizing number of disulfide bonds are possible with the following syntax: LCSEQUENCE,HCSEQUENCE,LCSEQUENCE,HCSEQUENCE|2. In this example, the entire protein complex has a total of 2 disulfides. To confirm the calculated mass, create an intact mass project, then go to Edit->Show project creation options>Protein Input tab.

Figure 21:
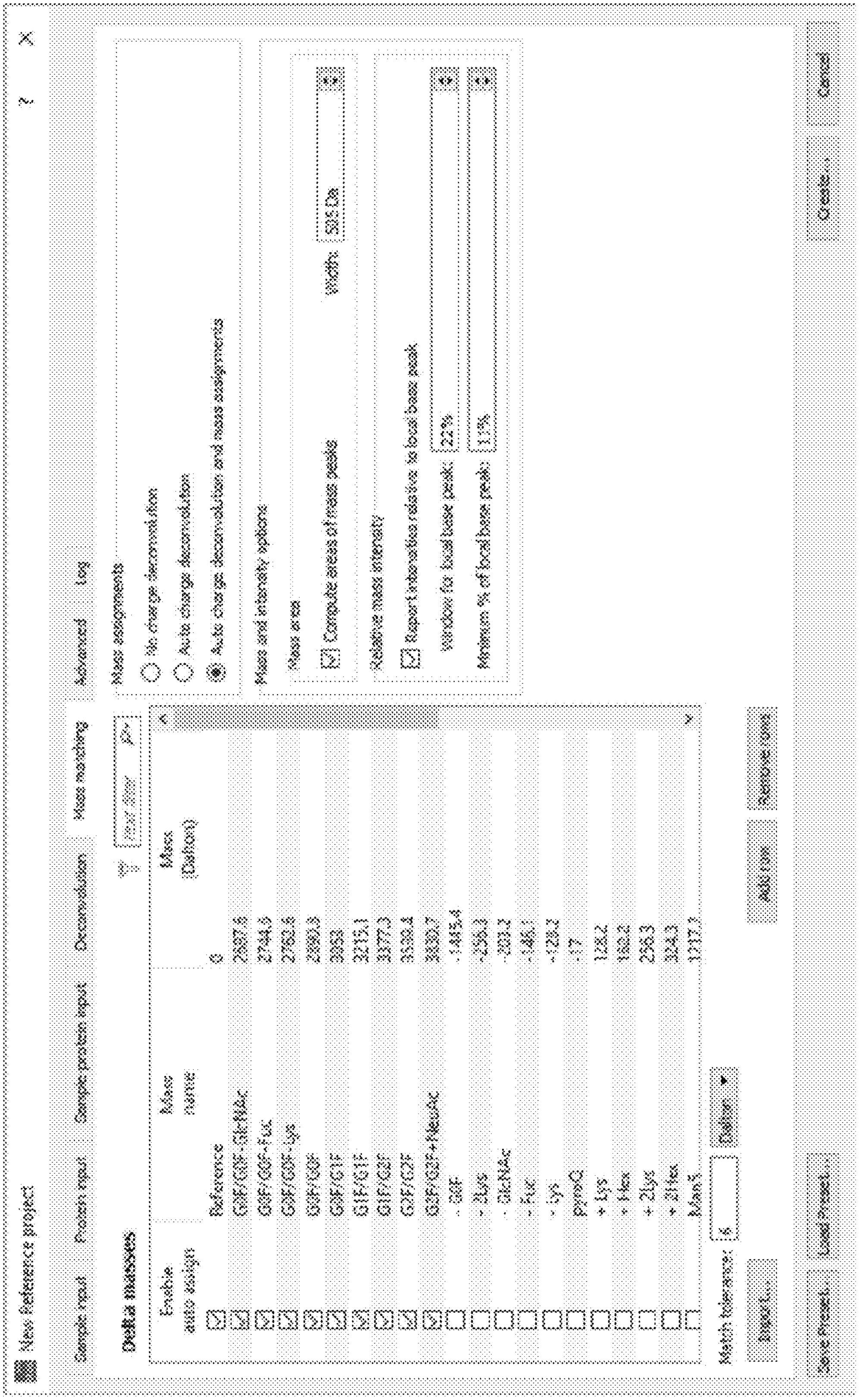
FIG. 21 illustrates how a user can control mass area computation during and after a project is created.

FIG. 21 shows an example of how mass area computation can be controlled during and after a project is created. The mass matching tab in a new reference project can provide the user the ability to control mass area computation and relative intensity reporting during and after project creation.

Figure 22A:
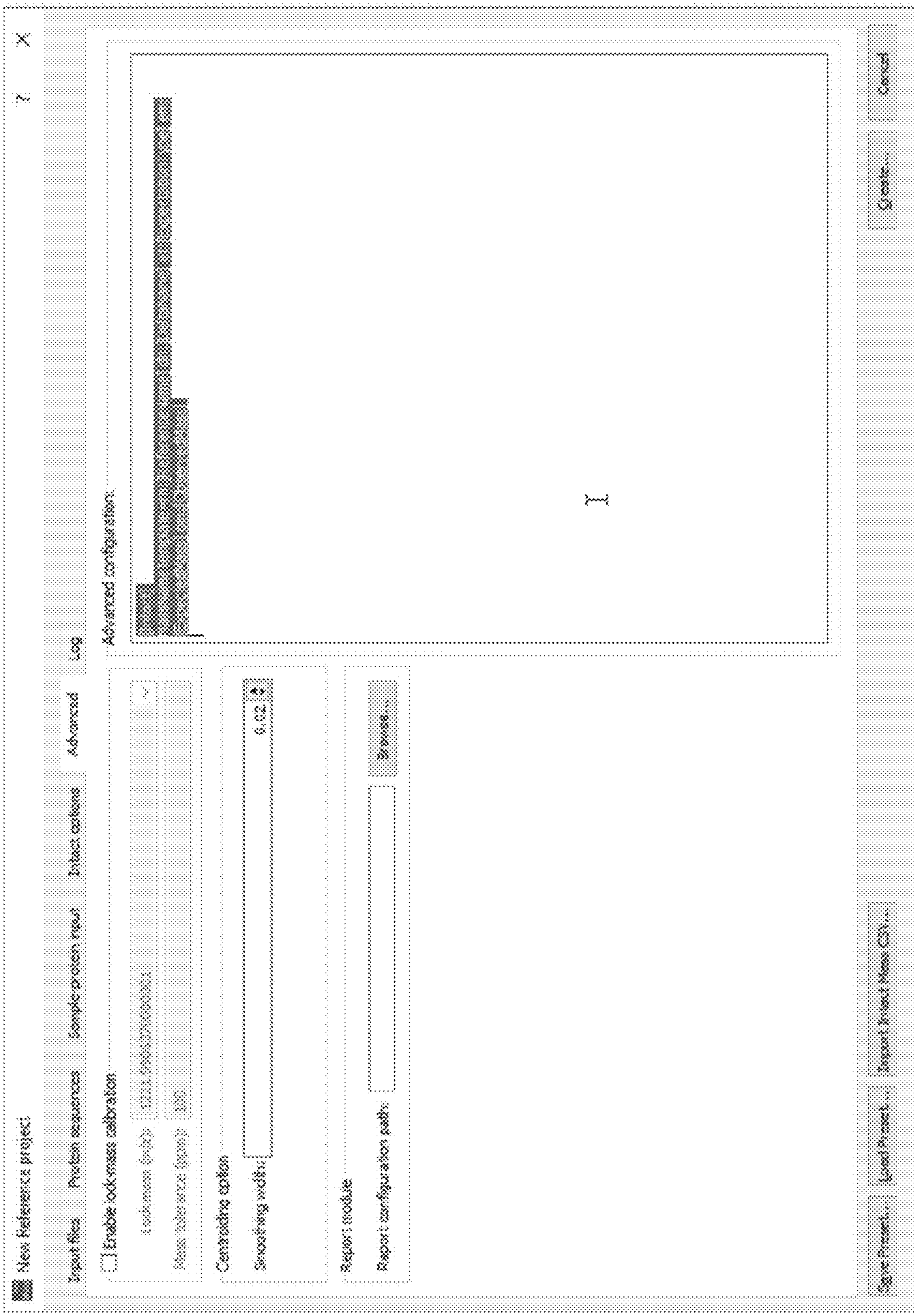
FIGS. 22A-22B illustrate how a user can create customized names.
Figure 22B:
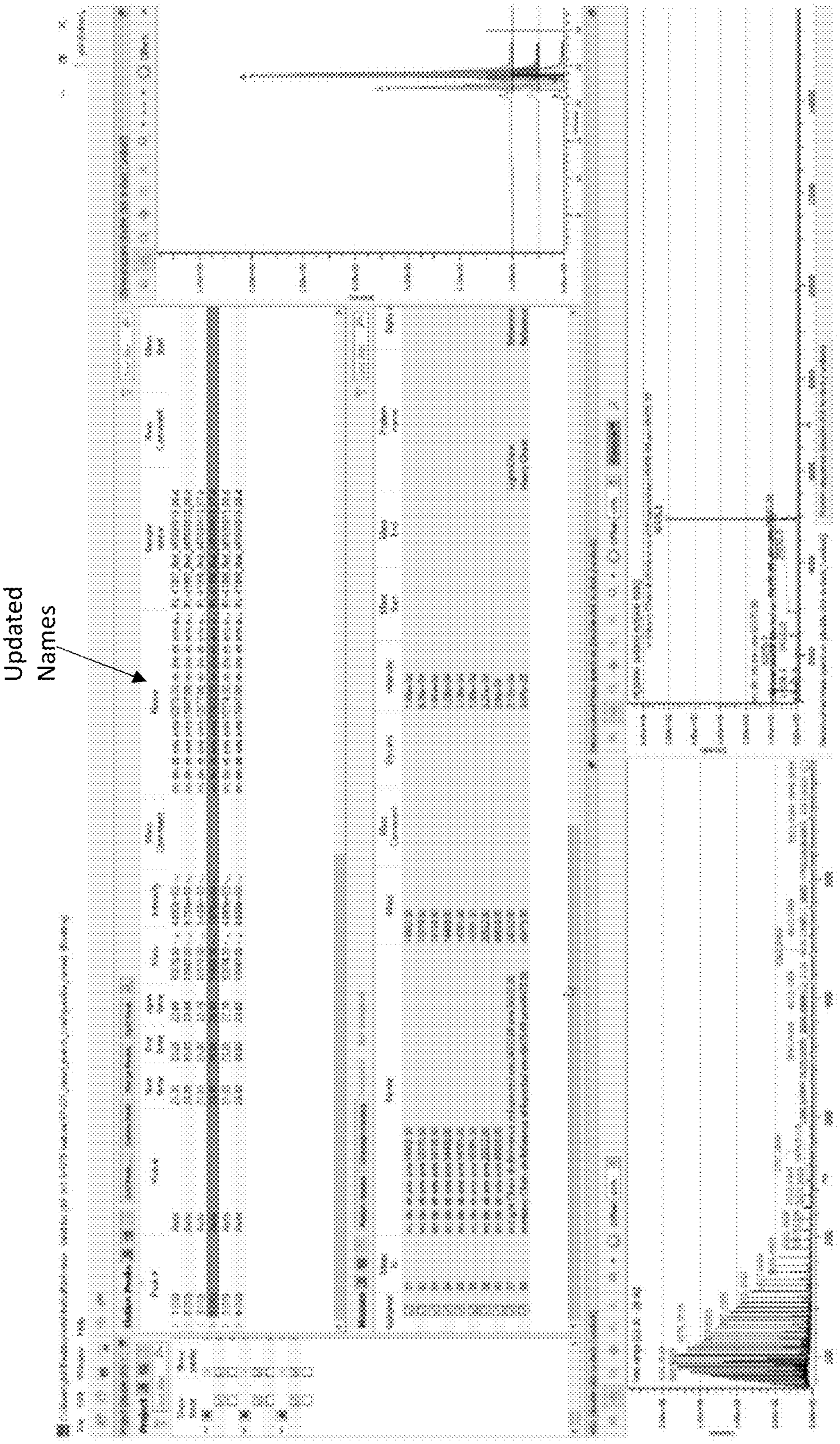
Figure 23:
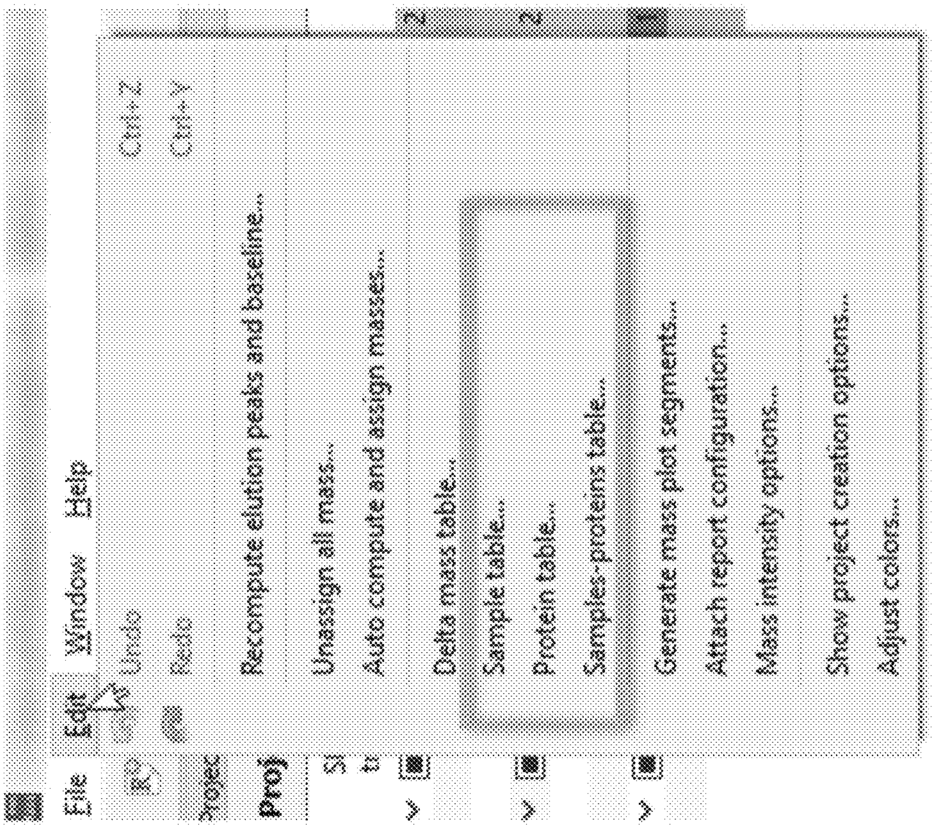
FIG. 23 illustrates how a user can retroactively edit the masses of the protein and delta masses.

FIGS. 22A-22B show an example of how a user can create customized names. For example, an editable Name column can be accessed in the Advanced tab of a new reference project, as shown in FIG. 22A. FIG. 22B shows how, if there is a match, the names will be populated FIG. 23 shows an example of how a user can retroactively edit the masses of the protein and delta masses from the report view component. A drop down menu can provide a number of ways to edit these masses in a sample table after a project has been created and updated in the windows of the report view component.

Figure 24:
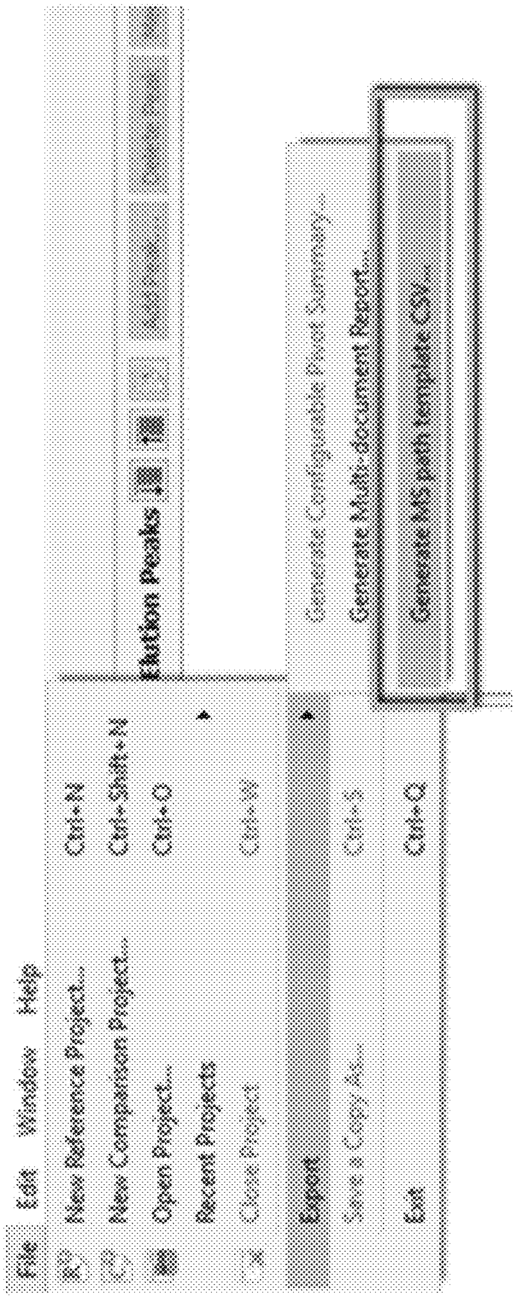
FIG. 24 illustrates how a user can choose export formats from the report view component.

FIG. 24 shows an example of how a user can choose an export format. A drop down menu can provide an Export option, with a selectable format, such as multi-document reports or MS data CSV.

Figure 25:
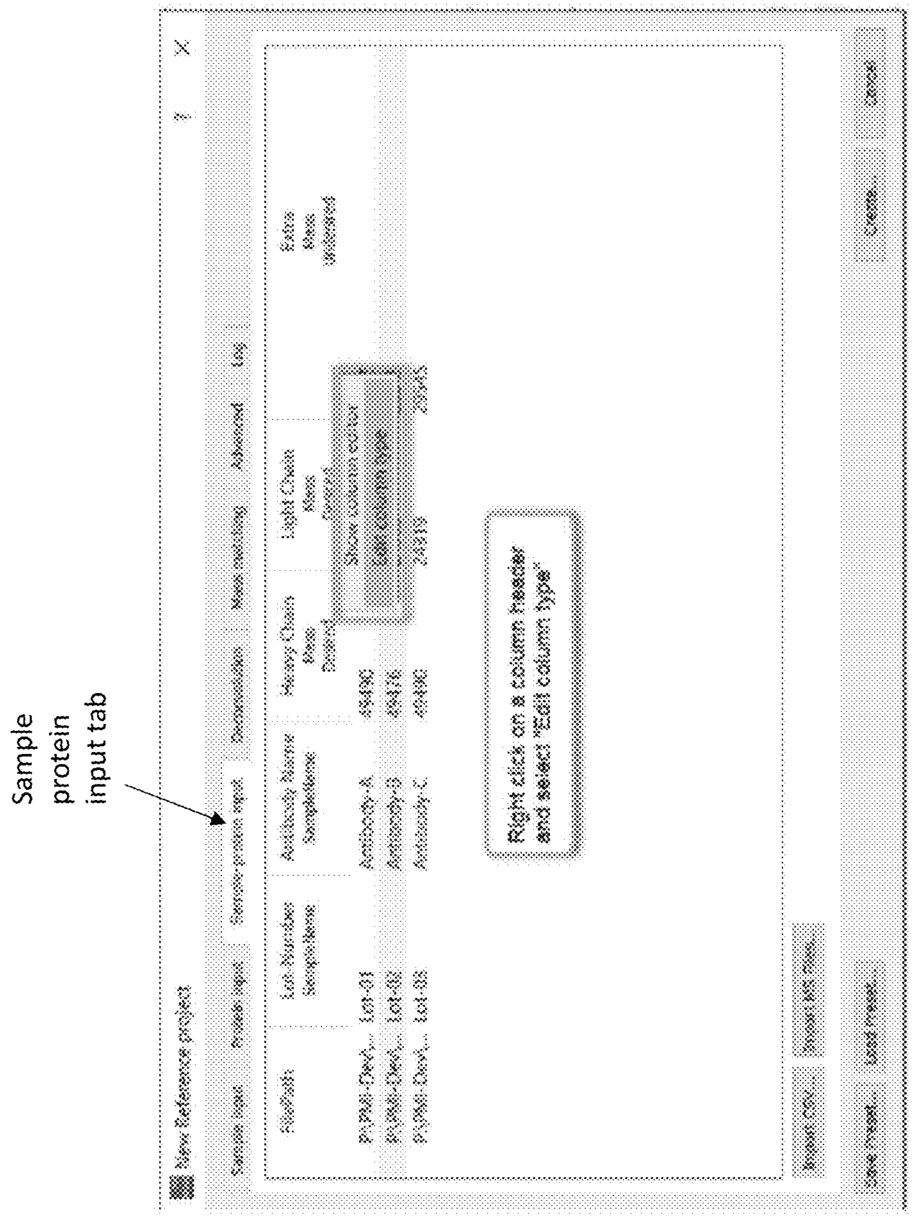
FIG. 25 illustrates how a user can choose column attributes of a report from the report view component.

FIG. 25 shows an example of how a user can choose column attributes of a report. In the new reference project window, a sample protein input tab can provide a way to modify column attributes during a project and/or after project creation. For example, the column can be right clicked to provide a drop down menu with an option to edit the column attributes.

Figure 26:
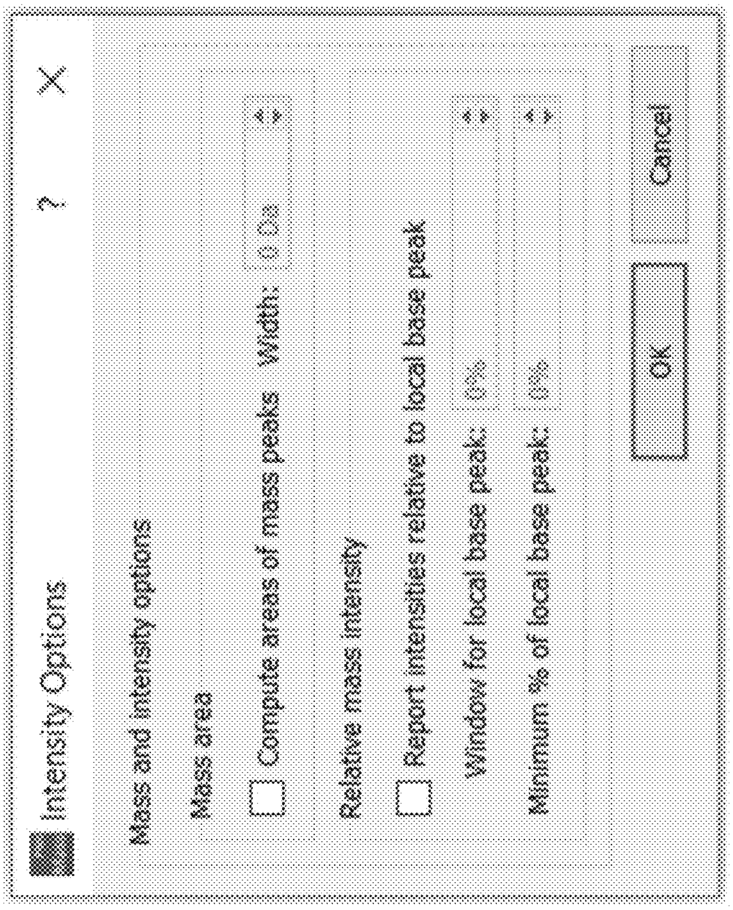
FIG. 26 illustrates how a user can choose relative intensities from the report view component.

FIG. 26 shows an example of how a user can choose relative intensities. An Intensity Options window can be accessed from the report view component, which provides the user the ability to choose the mass and intensity while the document is open (e.g., after project creation).

Figure 27:
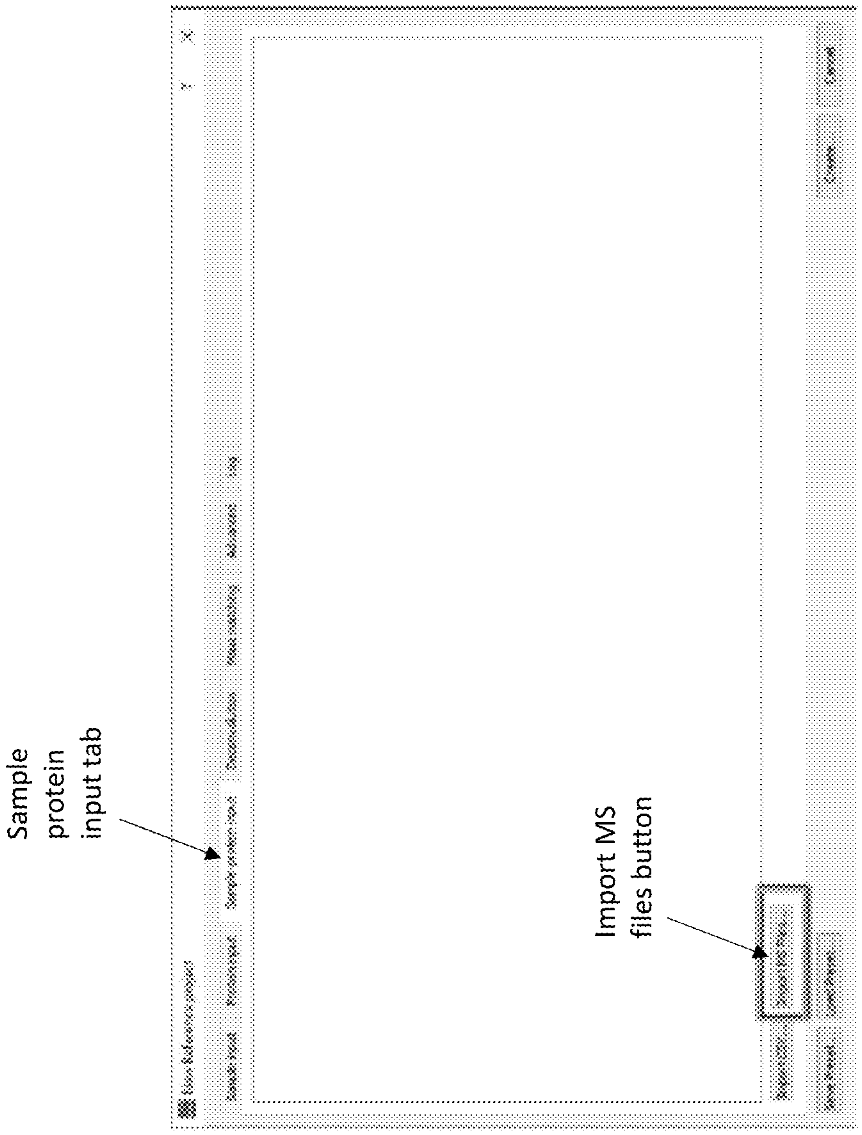
FIG. 27 illustrates how a user can import files from the report view component.

FIG. 27 shows an example of how a user can choose relative intensities during a project and/or after project creation. In the new reference project window under the sample protein input tab, an import MS files button can provide a way to import files during a project and/or after project creation.

Figure 28:
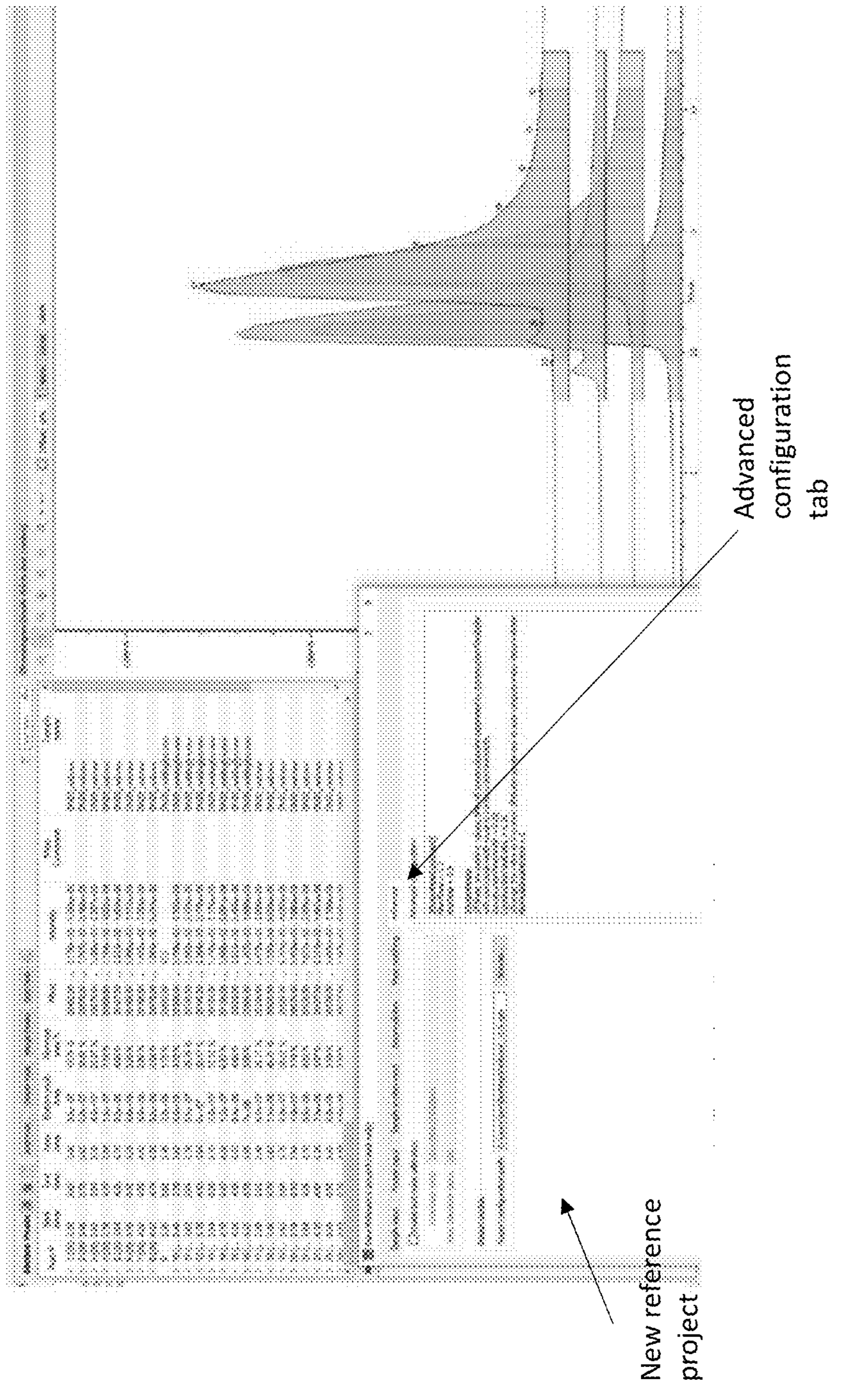
FIGS. 28 and 29 illustrate how a user can choose relative intensities from the report view component.
Figure 29:
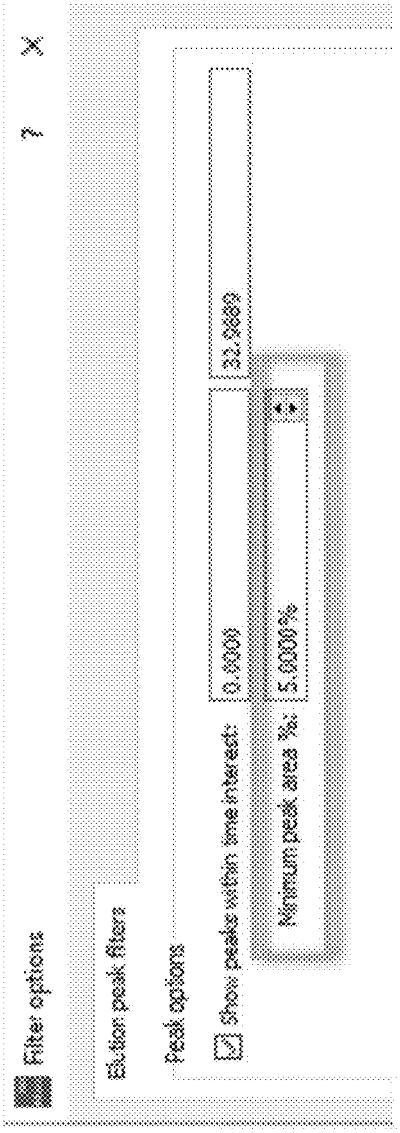

FIGS. 28 and 29 show an example of how a user can change the minimum peak area percentage intensities during a project and/or after project creation. The user may be able to restrict the start and end range windows via the "Advanced" configuration tab, as shown in FIG. 28, and FIG. 29 shows how a filter options window can be used to select the minimum peak area percentage.

Figure 30:
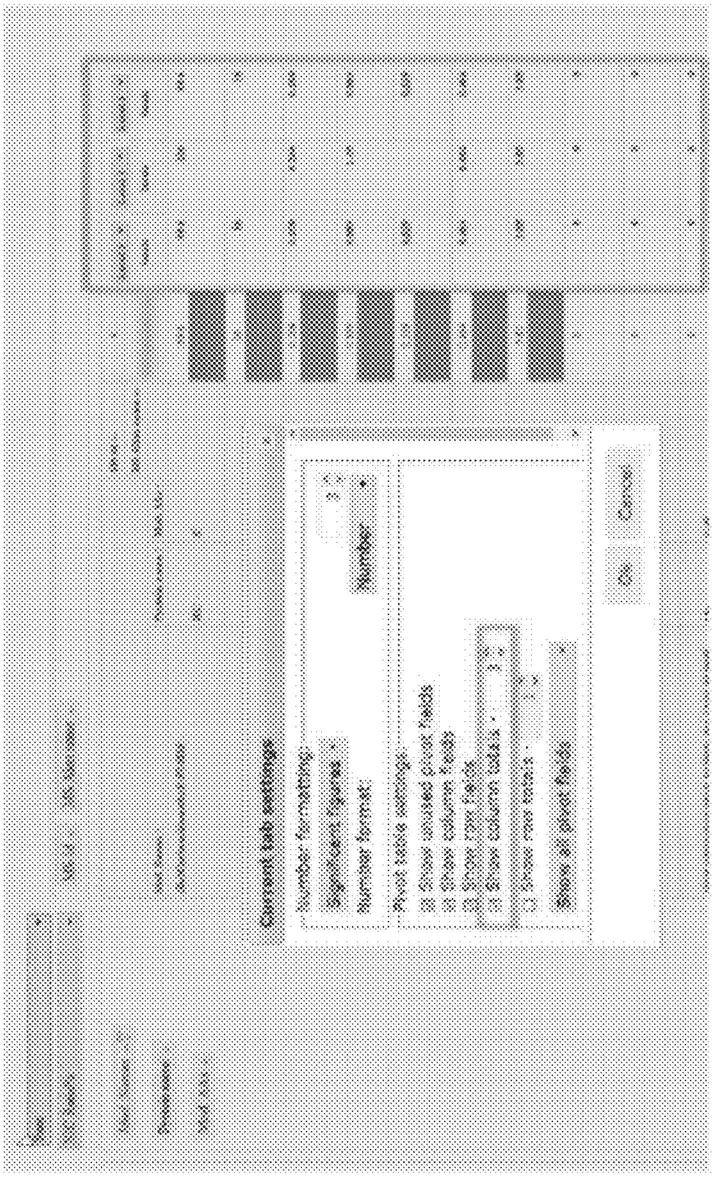
FIG. 30 illustrates how a user can select to allow multiple subtotals and other aggregates from the report view component.

FIG. 30 shows how a user can select to allow multiple subtotals and other aggregates with hierarchy.

FIG. 31 shows how a user can customize a summary tab of the report view component.

Figure 32:
FIG. 32 illustrates how a user can attach a pivot report to the document from the report view component.

FIG. 32 shows how a user can attach a pivot report to the document during and/or after project creation.

Figure 33:
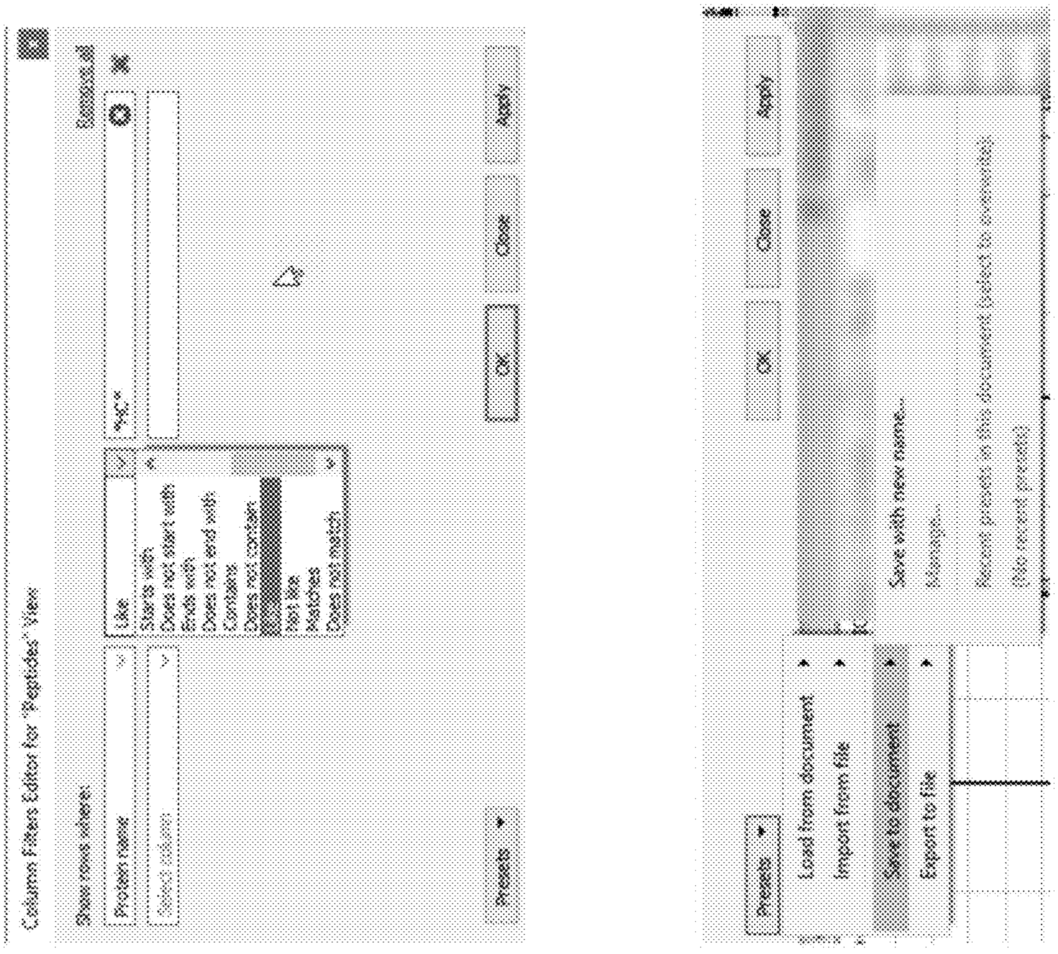
FIG. 33 illustrates how a user can directly read certain file types from the report view component.

FIG. 33 shows how a user can directly read certain file types during and/or after project creation.

Figure 34:
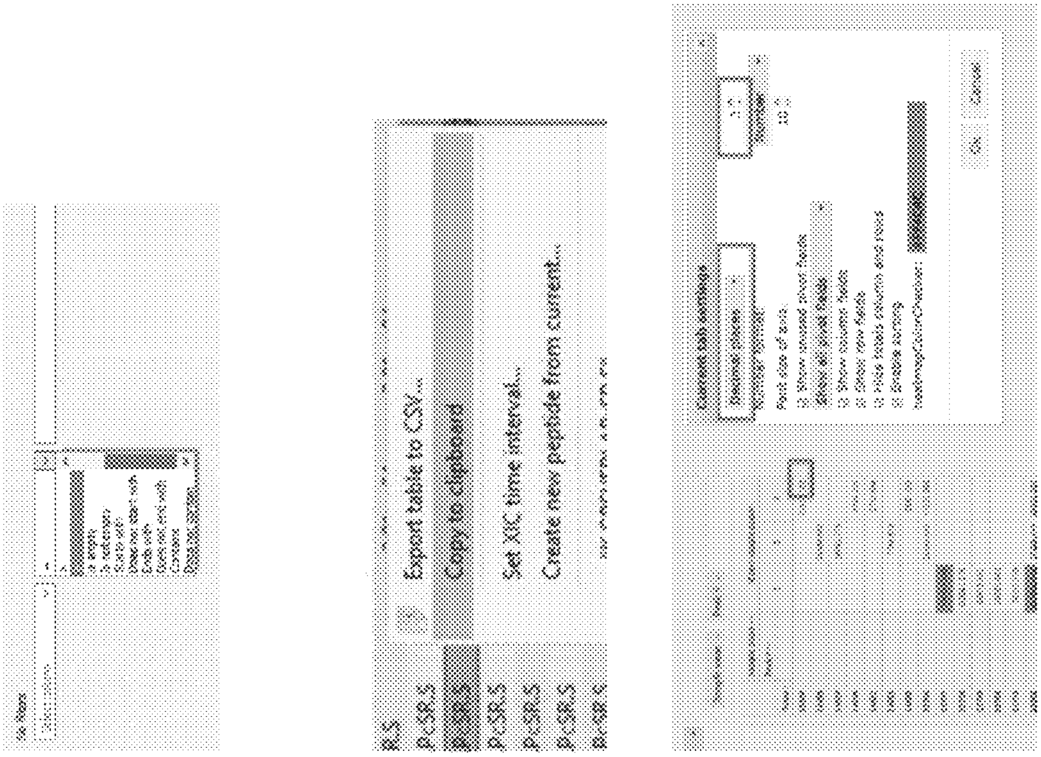
FIG. 34 illustrates how a user can filter out selected rows such that they are excluded from the pivot report from the report view component.

FIG. 34 shows how a user can filter out selected rows such that they are excluded from the pivot report during and/or after project creation.

FIG. 35 shows how plot styles can be modified from the report view component.

Figure 36:
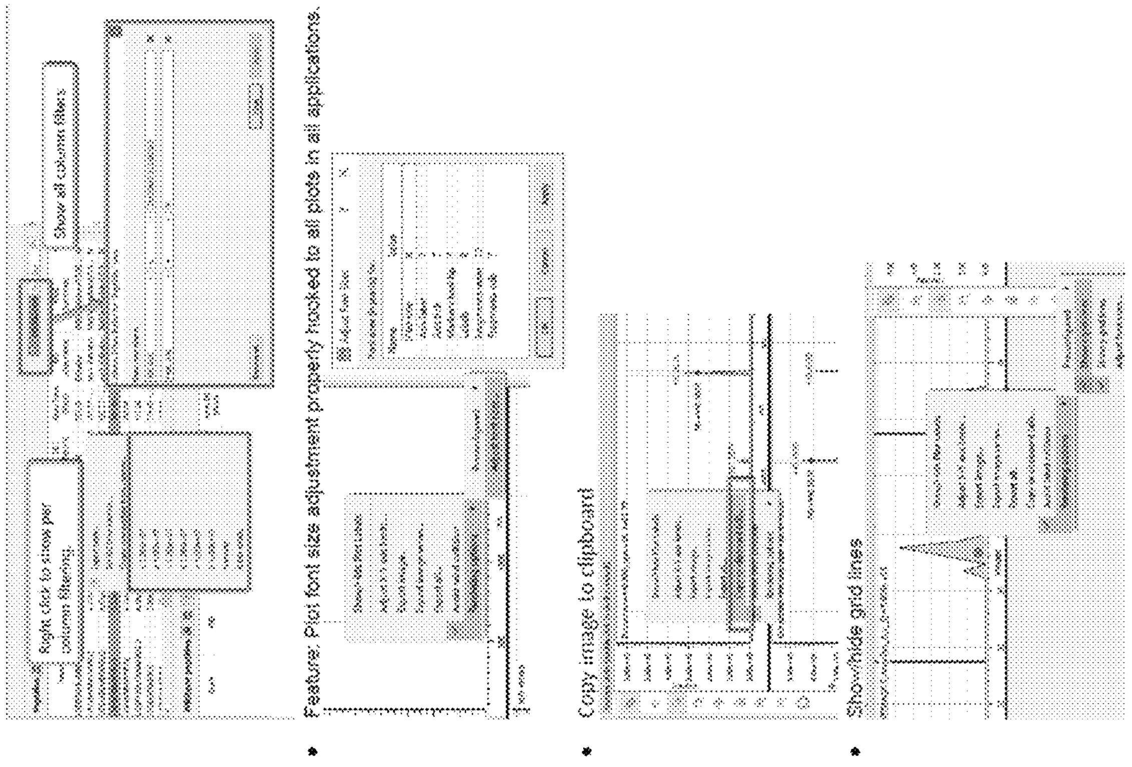
FIG. 36 illustrates how command line project creation and reporting can be modified from the report view component.

FIG. 36 shows how command line project creation and reporting can be modified during and/or after project creation.

Figure 37:
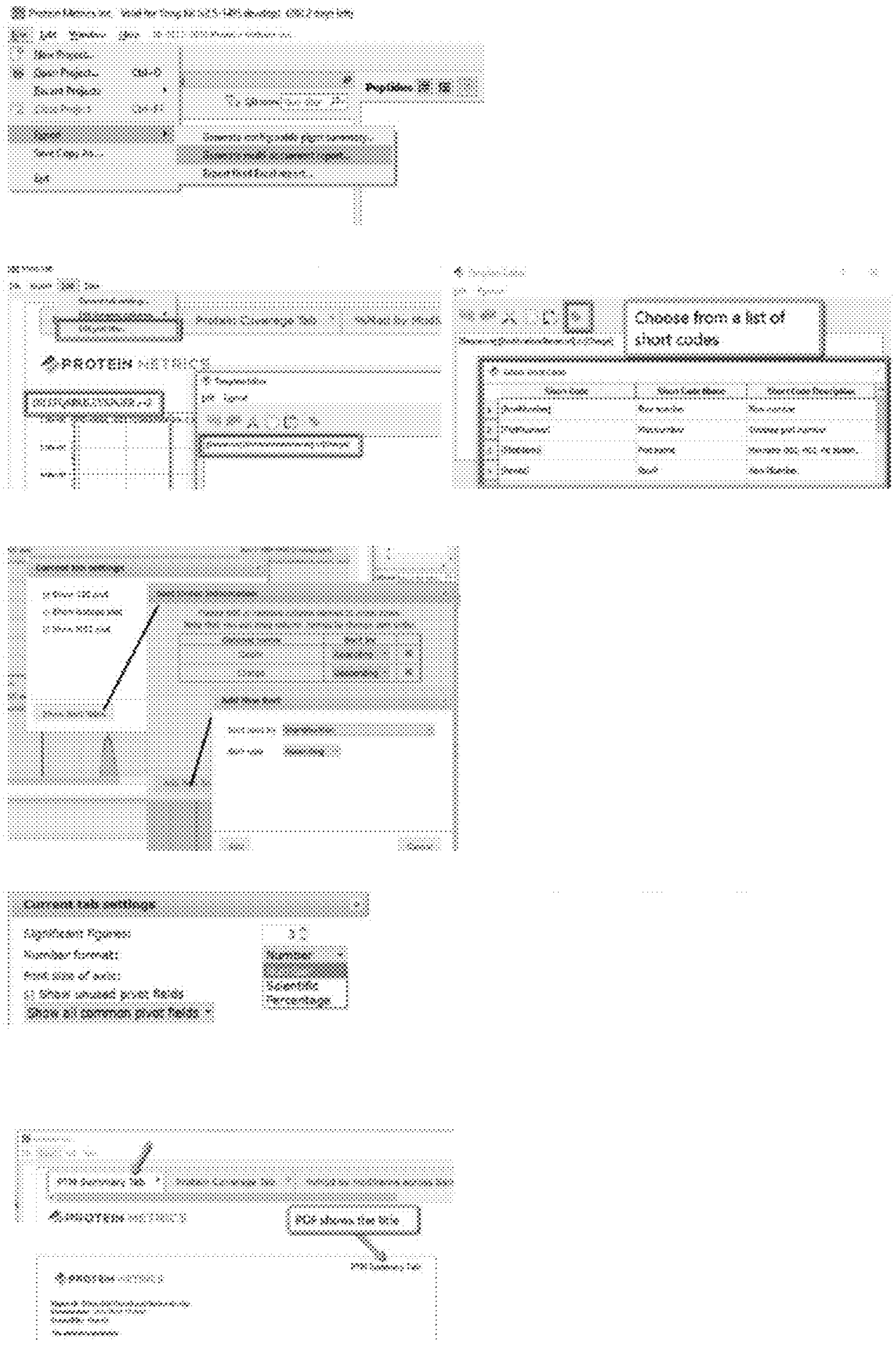
FIG. 37 illustrates how multiple documents can be used to create a pivot report.

FIG. 37 shows how multiple documents can be used to create a pivot report during and/or after project creation.

Other features of the user interface can include enhancements to complete assignments by default, such as to "Enable auto compute and auto-assign masses," such that masses will then be assigned automatically during project creation. Other features can include adding new user-defined columns for samples and adding the ability to access project table content as part of the pivot reports.

Figure 40:
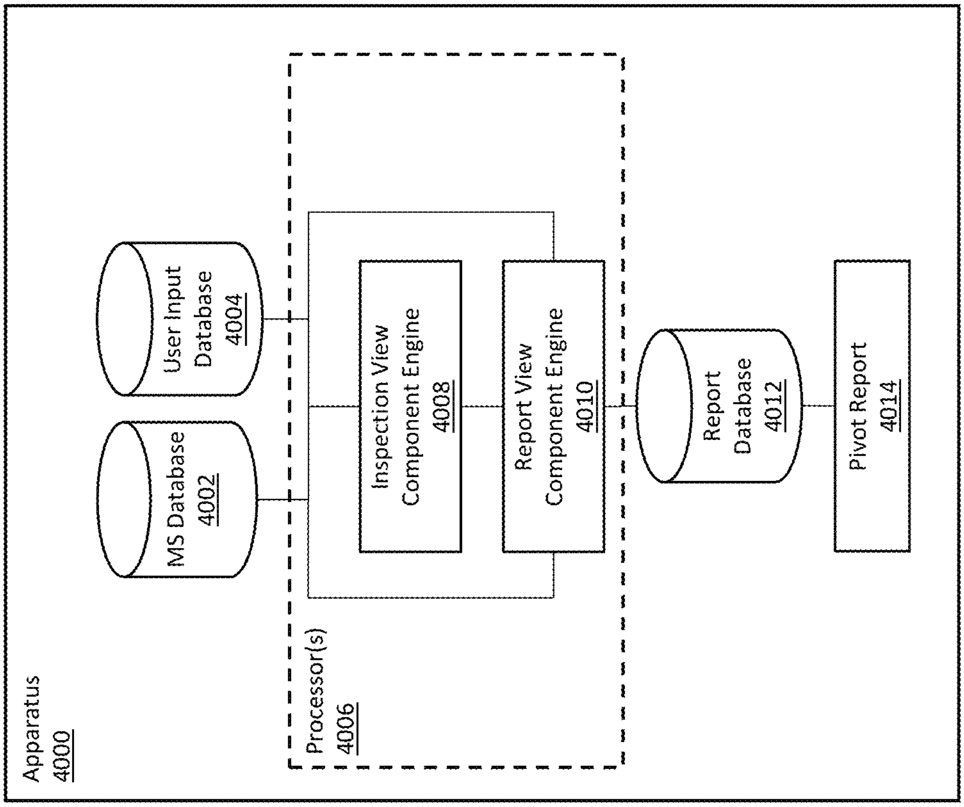
FIG. 40 illustrates an apparatus for dynamically analyzing and reporting mass spectrometry data.

FIG. 40 shows an apparatus for dynamically preparing reports from mass spectrometry data in accordance with some embodiments. Mass spectrometry (MS) data from one or more mass spectrometry data sets can be stored on one or more MS databases 4002 (memory locations). The MS data set(s) may include mass-to-charge ratios (m/z) peaks and peak intensities associated with a molecule of interest. For example, the MS data set(s) may be include data associated with an intact molecule of interest, fragments of the molecule of interest, modifications of the molecule of interest, and/or mass deltas associated with the molecule of interest.

One or more processors 4006 of the apparatus 4000 can include an inspection view component engine 4008 and a report view component engine 4010 to provide an inspection view component window and a report view component window, respectively, of the user interface. The inspection view component engine 4008 and/or the report view component engine 4010 can be configured accept user input from the user interface stored in a user input database 4004. The inspection view component engine 4008 can be operationally coupled to and dynamically interact with the report view component engine 4010 in response to the user input. The processor(s) can be configured to store data associated with reports in a report database 4012, which can be used to generate a pivot report 4012 summarizing all or a subset of MS data as defined by the user input.

As mentioned, any of the methods (including user interfaces) described herein may be implemented as software, hardware or firmware, and may be described as a non-transitory computer-readable storage medium storing a set of instructions capable of being executed by a processor (e.g., computer, tablet, smartphone, etc.), that when executed by the processor causes the processor to control perform any of the steps, including but not limited to: displaying, communicating with the user, analyzing, modifying parameters (including timing, frequency, intensity, etc.), determining, alerting, or the like.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

Throughout this specification and the claims which follow, unless the context requires otherwise, the word "comprise", and variations such as "comprises" and "comprising" means various components can be co-jointly employed in the methods and articles (e.g., compositions and apparatuses including device and methods). For example, the term "comprising" will be understood to imply the inclusion of any stated elements or steps but not the exclusion of any other elements or steps.

In general, any of the apparatuses and methods described herein should be understood to be inclusive, but all or a sub-set of the components and/or steps may alternatively be exclusive, and may be expressed as "consisting of" or alternatively "consisting essentially of" the various components, steps, sub-components or sub-steps.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer-implemented method for dynamically preparing reports associated with a molecule of interest, the method comprising:

displaying an inspection view component of a user interface including mass spectrometry (MS) data, the inspection view component further comprising:

a window including values associated with the molecule of interest, wherein the values associated with the molecule of interest are one or more of: mass values, mass-over-charge ratio (m/z) values, or values derived from mass-to-charge ratios, and data from one or more analytical techniques specific to the molecule of interest; and a spectrum window including a graph indicating peaks corresponding to the values associated with the molecule of interest;

displaying a report view on a user interface dashboard, the report view comprising one or more selectable pivot tabs, each of the one or more selectable pivot tabs including all or a subset of information from one or both of the values associated with the molecule of interest and the graph indicating peaks corresponding to the values associated with the molecule of interest; and dynamically modifying a selected pivot tab in response to a user modifying one or both of the values associated with the molecule of interest and the graph indicating peaks corresponding to the values associated with the molecule of interest.

2. The computer-implemented method of claim 1, wherein the one or more analytical techniques specific to the molecule of interest comprises chromatography data.

3. The computer-implemented method of claim 1, wherein the one or more analytical techniques specific to the molecule of interest comprises pH and/or $O_2$ levels, bioreactor sample data, clinical data, or charge variant data.

4. The computer-implemented method of claim 1, wherein the values associated with the molecule of interest include a m/z of at least one molecular species associated with the molecule of interest.

5. The computer-implemented method of claim 1, further comprising modifying one or both of the window including values associated with the molecule of interest and the graph indicating peaks corresponding to the values associated with the molecule of interest based on user input.

6. The computer-implemented method of claim 1, wherein the report view includes one or more selectable pivot functions for displaying all or the subset of information from one or both of the values associated with the molecule of interest and the graph indicating peaks corresponding to the values associated with the molecule of interest.

7. The computer-implemented method of claim 1, wherein the MS data includes one or more MS datasets, each MS dataset including MS data associated with a sample having the molecule of interest.

8. The computer-implemented method of claim 7, further comprising combining the one or more MS datasets into a single flat table.

9. The computer-implemented method of claim 8, wherein combining the one or more MS datasets into the single flat table includes concatenating the one or more MS datasets into the single flat table.

10. The computer-implemented method of claim 1, wherein dynamically modifying the selected pivot tab includes adjusting one or more of a table and a chart of the selected pivot tab.

11. The computer-implemented method of claim 10, further comprising saving a first subset of pivot functions contained in an active element window as associated with the selected pivot tab.

12. The computer-implemented method of claim 1, further comprising modifying one or both of the values associated with the molecule of interest and the graph indicating peaks corresponding to the values associated with the molecule of interest based on a user input.

13. The computer-implemented method of claim 1, wherein the report view of the user interface includes default tabs including one or more of:

a summary tab that, when selected, is configured to display a description of the molecule of interest and MS parameters;

a coverage tab that, when selected, is configured to display information related to the molecule of interest;

a percent modification tab that, when selected, is configured to display information associated with modifications to the molecule of interest; and an average percent modification tab that, when selected, is configured to display the information associated with modifications to the molecule of interest averaged among one or more MS datasets.

14. The method of claim 1, further comprising toggling between the inspection view component and the report view based on user input.

15. A non-transitory computer-readable medium with instructions stored thereon, that when executed by a processor, perform steps comprising:

displaying an inspection view component of a user interface including mass spectrometry (MS) data, the inspection view component further comprising:

a window including values associated with a molecule of interest, wherein the values associated with the molecule of interest are one or more of: mass values, mass-over-charge ratio (m/z) values, or values derived from mass-to-charge ratios, and data from one or more analytical techniques specific to the molecule of interest; and a spectrum window including a graph indicating peaks corresponding to the values associated with the molecule of interest;

displaying a report view on a user interface dashboard, the report view comprising one or more selectable pivot tabs, each of the one or more selectable pivot tabs including all or a subset of information from one or both of the values associated with the molecule of interest and the graph indicating peaks corresponding to the values associated with the molecule of interest; and dynamically modifying a selected pivot tab in response to a user modifying one or both of the values associated with the molecule of interest and the graph indicating peaks corresponding to the values associated with the molecule of interest.

16. The non-transitory computer-readable medium of claim 15, wherein the instructions further comprise instructions to apply one or more filters to the MS data.

17. The non-transitory computer-readable medium of claim 15, wherein displaying the report view includes displaying one or more new fields associated with different MS datasets from different MS samples.

18. The non-transitory computer-readable medium of claim 15, further comprising selecting one or more of the peaks or selecting a range of m/z values around one or more of the peaks based on user input.

19. The non-transitory computer-readable medium of claim 15, wherein the instructions further comprise instructions to display a chromatogram based on the MS data in the inspection view component of the user interface.

20. The non-transitory computer-readable medium of claim 15, wherein the instructions further comprise instructions to adjust an order or arrangement of information displayed in the report view of the user interface.

21. The non-transitory computer-readable medium of claim 15, wherein the selected pivot tab includes:

an active element window configured to display a first subset of pivot functions;

a display window configured to display one or more of a report table and a report graph based on the first subset of pivot functions; and a storage window configured to display a second subset of pivot functions that is not displayed in the display window.

* * * * *